United States Patent
Win et al.

(10) Patent No.: US 12,202,612 B2
(45) Date of Patent: Jan. 21, 2025

(54) AUTOROTATING AERIAL DEVICE, METHOD OF FORMING THE AUTOROTATING AERIAL DEVICE AND AN AUTOROTATING AERIAL SYSTEM

(71) Applicant: Singapore University of Technology and Design, Singapore (SG)

(72) Inventors: Shane Kyi Hla Win, Singapore (SG); Luke Soe Thura Win, Singapore (SG); Shaohui Foong, Singapore (SG); Gim Song Soh, Singapore (SG)

(73) Assignee: Singapore University of Technology and Design (SG)

( * ) Notice: Subject to any disclaimer, the term of this patent is extended or adjusted under 35 U.S.C. 154(b) by 109 days.

(21) Appl. No.: 17/998,679

(22) PCT Filed: May 11, 2021

(86) PCT No.: PCT/SG2021/050259
§ 371 (c)(1),
(2) Date: Nov. 14, 2022

(87) PCT Pub. No.: WO2021/230817
PCT Pub. Date: Nov. 18, 2021

(65) Prior Publication Data
US 2023/0348075 A1    Nov. 2, 2023

(30) Foreign Application Priority Data
May 12, 2020 (SG) .............. 10202004386S

(51) Int. Cl.
B64D 19/02 (2006.01)
B64U 30/12 (2023.01)
(Continued)

(52) U.S. Cl.
CPC .............. *B64D 19/02* (2013.01); *B64U 30/12* (2023.01); *B64U 10/13* (2023.01); *B64U 10/25* (2023.01); *B64U 2101/30* (2023.01)

(58) Field of Classification Search
CPC .......... B64D 19/02; F42B 10/56; F42B 10/58; B64C 27/026; B64C 27/025;
(Continued)

(56) References Cited

U.S. PATENT DOCUMENTS 2,852,210 A * 9/1958 Dietrich .................. B64C 13/00
    244/82
3,820,743 A    6/1974 Young
(Continued)

FOREIGN PATENT DOCUMENTS

CA    2986526 A1    1/2019
CN    108762288 A    11/2018
(Continued)

OTHER PUBLICATIONS

Obradovic, B., et al. "A Multi-Scale Simulation Methodology for the Samarai Monocopter micro-UAV", In American Institute of Aeronautics and Astronautics (AIAA) Modeling and Simulation Technologies Conference, Aug. 13, 2012, at p. 5012 (pp. 1-12).
(Continued)

*Primary Examiner* — Christopher D Hutchens

(57) ABSTRACT

Disclosed herein is are systems, devices, and methods for an autorotating aerial device which includes a housing member having disposed thereon an actuator and a controller configured to control the actuator. The device also includes a wing member coupled to the actuator, the wing member including a main wing portion and a flap portion adjustable with respect to the main wing portion. The controller is configured to control the actuator to switch the autorotating aerial device between a diving mode of operation and an
(Continued)

autorotating mode of operation based on adjusting an angle of attack of the flap portion, the angle of attack being with respect to a lateral axis along the main wing portion.

16 Claims, 54 Drawing Sheets

(51) Int. Cl.
  B64U 10/13      (2023.01)
  B64U 10/25      (2023.01)
  B64U 101/30     (2023.01)
(58) Field of Classification Search
  CPC ............... B64C 27/022; B64C 27/615; B64C 2027/7266; A63H 33/185
  USPC .......................................................... 446/36
  See application file for complete search history.

(56) References Cited

U.S. PATENT DOCUMENTS

| | | | | |
|---|---|---|---|---|
| 3,915,414 | A * | 10/1975 | Shoulders | B64C 27/00 244/180 |
| 6,168,379 | B1 | 1/2001 | Bauer | |
| 7,569,945 | B2 | 8/2009 | Pedersen | |
| 8,079,546 | B2 * | 12/2011 | Barrows | B64D 19/02 102/388 |
| 8,366,055 | B2 | 2/2013 | Ulrich et al. | |
| 9,266,609 | B1 * | 2/2016 | Kunz | B64C 29/0008 |
| 2008/0203222 | A1 * | 8/2008 | Johnson | B64C 27/10 244/99.2 |
| 2010/0178167 | A1 * | 7/2010 | Janker | B64C 27/615 416/31 |
| 2010/0324754 | A1 * | 12/2010 | Barrows | B64D 19/02 701/3 |
| 2012/0328441 | A1 * | 12/2012 | Fogarty | A63H 33/18 416/204 R |
| 2019/0031342 | A1 | 1/2019 | Mitchell et al. | |
| 2020/0055585 | A1 * | 2/2020 | Hung | B64U 10/25 |

FOREIGN PATENT DOCUMENTS

| | | |
|---|---|---|
| CN | 209441637 U | 9/2019 |
| CN | 110386248 A | 10/2019 |
| CN | 110633857 A | 12/2019 |

OTHER PUBLICATIONS

Fregene, K., et al., "Dynamics and control of a biomimetic single-wing nano air vehicle", In Proceedings of the 2010 American Control Conference, IEEE, Jun. 30, 2010, pp. 51-56.
Santamaria, D., et al., "Towards autonomous autorotation landing for small size unmanned helicopters", Journal of Intelligent & Robotic Systems, 69, Sep. 6, 2012, vol. 69, pp. 171-180.
Galantai, V. P., et al., "Bio-inspired wing morphing for unmanned aerial vehicles using intelligent materials", International Journal of Mechanics and Materials in Design, Nov. 12, 2012, vol. 8, pp. 71-79.
Low, J. E., et al., "Design and dynamic analysis of a transformable hovering rotorcraft (thor)", In 2017 IEEE International Conference on Robotics and Automation (ICRA), May 29, 2017, pp. 6389-6396.
Abdulrahim, M., "Flight performance characteristics of a biologically-inspired morphing aircraft", In 43rd AIAA aerospace sciences meeting and exhibit, Jan. 10, 2005, at p. 345 (pp. 1 to 15).
Win, S. K. H., et al., "Direction Controlled Descent of Samara Autorotating Wings (SAW) with n-Wings*", Research supported by the SUTD-MIT International Design Centre (IDC) and by the Temasek Laboratories Defence Innovation Research Programme (DIRP) IGDSP15020141, IEEE, 2018 IEEE International Conference on Robotics and Automation (ICRA), May 21, 2018, pp. 6553-6559.
Sufiyan, D., et al., "A reinforcement learning approach for control of a nature-inspired aerial vehicle", 2019 International Conference on Robotics and Automation (ICRA), IEEE, May 20, 2019, pp. 6030-6036.
Win, S. K. H., et al., "Design, modelling and control of collaborative samara autorotating wings (SAW)", International journal of intelligent robotics and applications, May 11, 2019, pp. 144-157.
Lopez, C. A., et al., "Dynamics and stability of an autorotating rotor/wing unmanned aircraft", Journal of guidance, control, and dynamics, Mar. 2, 2004, vol. 27, No. 2, pp. 258-270.
Win, S. K. H., et al., "The effects of chordwise wing optimization of single-winged samara in autorotation," in 2017 IEEE Int. Conf. on Advanced Intell. Mechatronics, IEEE, Jul. 3, 2017, pp. 815-820.
Win, S. K. H., et al., "Dynamics and control of a collaborative and separating descent of samara autorotating wings", IEEE, Robotics and Automation Letters, Jul. 2019, vol. 4, Issue 3, pp. 3067-3074.
Win, S. K. H., et al., "Design optimization of flap configuration in samara autorotating wing with multi-functional aerodynamic structure," Proceedings of the 2019 IEEE/ASME Int. Conf. on Advanced Intell. Mechatronics, IEEE, Jul. 8, 2019, pp. 1359-1364.
Kellas, A. "The guided samara: design and development of a controllable single-bladed autorotating vehicle", Masters Thesis, Massachusetts Institute of Technology, Sep. 2007.
Pounds, P. E. I., et al., "Integrated electro-aeromechanical structures for low-cost, self-deploying environment sensors and disposable uavs", 2013 IEEE Int. Conf. on Robot. and Autom.(ICRA), May 6, 2013, pp. 4459-4466.
Kahn, A. et al., "Navigation, guidance and control for the cicada expendable micro air vehicle", American Institute of Aeronautics and Astronautics, AIAA Guidance, Navigation and Control Conference, Aug. 13, 2012, pp. 1-14.
Kroo, I., "Single-winged autorotating brake for sensor deployment on mars", Final Report for NASA NCC2-5058, Jan. 1995, 49 pages.
Mitchell, J., et al., "Design of a novel auto-rotating uav platform for underground mine cavity surveying", Robert M. Buchan Department of Mining Graduate Theses, Queens Adaptive Technology Center, 2017, 10 pages.
Win, S. K. H., et al., "An agile samara-inspired single-actuator aerial robot capable of autorotation and diving", IEEE Transactions on Robotics, 1552-3098, 2021, 14 pages.
Win, S. K. H., et al., "Concurrent Optimization of Mechanical Design and Control for Flapless Samara-Inspired Autorotating Aerial Robot", In 2020 IEEE/ASME International Conference on Advanced Intelligent Mechatronics (AIM), IEEE, Jul. 6, 2020, pp. 855-861.
Ortega-Jimenez et al., "Superb autorotator: rapid decelerations in impulsively launched samaras," Journal of the Royal Society Interface, Jan. 2, 2019, vol. 16, issue 150, 5 pages.
Ulrich, E. R., et al., "Control model for robotic samara: Dynamics about a coordinated helical turn", 2010 American Control Conference, AACC, Jun. 30, 2010, pp. 45-50.
Houghton, J., et al., "Fly-by-wire control of a monocopter," Massachusetts Institute of Technology, Project Report, May 13, 2008, 36 pages.
Fregene, K. et al., "Dynamics and control of a biomimetic single-wing nano air vehicle", at the 2010 American Control Conf., AACC, Jun. 30, 2010, pp. 51-56.
Leishman, G. J., "Principles of Helicopter Aerodynamics", Cambridge University Press, 2006, chapter 3, pp. 115-119.
Wick, B. H., "Study of the subsonic forces and moments on an inclined plate of infinite span", National Advisory Committee for Aeronautics, NACA TN-3221, Jun. 1954, 26 pages.
Hughes, P. C., "Spacecraft attitude dynamics", Dover Publications 2012, excerpt from chapter 3, pp. 55-60.
Hedayatpour, M., et al., "Revised propeller dynamics and energy-optimal hovering in a monospinner," in Proceedings of the 4th International Conference of Control, Dynamic Systems and Robotics (CDSR'17), Aug. 21, 2017, pp. 135-1 to 135-8.
Bai, S., et al., "Design and take-off flight of a samara-inspired revolving-wing robot," at IEEE/RSJ International Conference on Intelligent Robots and Systems, Nov. 4, 2019, pp. 6070-6076.

(56) References Cited

OTHER PUBLICATIONS

Zhang, et al., "Design, modeling and control of a flying vehicle with a single moving part that can be positioned anywhere in space", Mechatronics 61, Jul. 3, 2019, pp. 117-130.

Varshney, K., et al., "The kinematics of falling maple seeds and the initial transition to a helical motion", Nonlinearity, IOP Publishing, 2012, vol. 25, Issue 1, pp. C1-C8.

Yasuda, K., et al., "The autorotation boundary in the flight of samaras," J. of Theoretical Biology, Academic Press Limited, 1997, vol. 185, Issue 3, pp. 313-320.

Pounds, P., et al., "Automatic distribution of disposable self-deploying sensor modules," Conference Paper at International Symposium on Experimental Robotics (ISER), Jun. 2014, 10 pages.

* cited by examiner

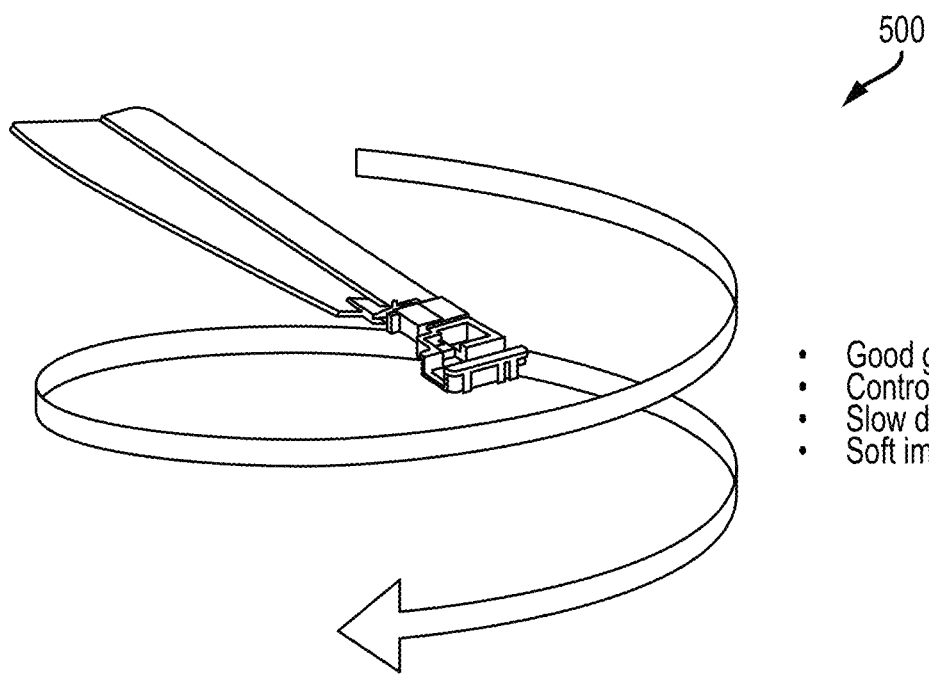
Autorotating Mode (A-Mode)
- Good glide slope
- Controlled direction
- Slow descent rate
- Soft impact landing
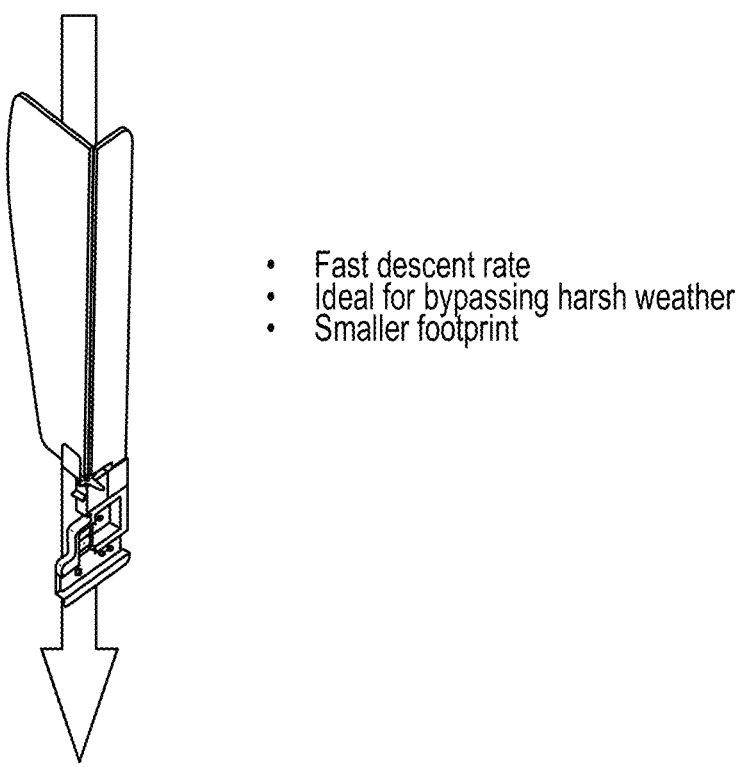
Driving Mode (D-Mode)
- Fast descent rate
- Ideal for bypassing harsh weather
- Smaller footprint
FIG. 5A

Table 3
TABLE OF SIMULATION PARAMETERS

| PARAMETERS | |
|---|---|
| Environment | $\rho_{air} = 1.225\text{kg/m}^3$, $g = -9.81\text{m/s}$ |
| Initial conditions | $V_Z = 0\text{m/s}$, $\Omega_Z = -18.8\text{rad/s}$ |
| Objective fn coeffs | $\kappa_1 = 100$, $\kappa_2 = 500$, $\kappa_3 = 200$, $\kappa_4 = 1$ |
| | $\beta_1 = 1$, $\beta_2 = 10$, $\beta_3 = 400$ |
| Others | $n_1 = 3000$, $n_2 = 40000$, $t_s = 0s$, $t_f = 40s$ |
| | $n_3 = 10000$, $n_4 = 40000$, $t_{s2} = 10s$, $t_{f2} = 40s$ |
| | $n_{be} = 12$, $c_{min} = 30\text{mm}$, $c_{max} = 120\text{mm}$ |
| OPTIMIZED DESIGN VARIABLES | |
| Polynomial coeffs | $C_1 = -0.0325$, $C_2 = 0.4175$, $C_3 = 2.1997$, |
| | $C_4 = 58.5336$ |
| Chord lengths (mm) | $c_1 = 61.1$, $c_2 = 64.3$, $c_3 = 68.0$, $c_4 = 71.9$ |
| | $c_5 = 75.9$, $c_6 = 79.7$, $c_7 = 83.2$, $c_8 = 86.2$ |
| | $c_9 = 88.5$, $c_{10} = 89.8$, $c_{11} = 90.0$, $c_{12} = 88.9$ |
| Radius (mm) | $dr = 23$, $R = 276$ |
| Others | $\gamma_a = 0.1887\text{rad}$, $m = 58\text{g}$ |
| | $L_x = 368\text{mm}$, $L_y = 131\text{mm}$, $L_z = 44\text{mm}$ |
| OPTIMIZED CONTROL VARIABLES | |
| Control vars | $\gamma_o = -0.1345$, $\epsilon = 0.2010$, $\gamma_{amp} = 0.1188$ |
| Others | $\lambda_c = 0$ |

FIG. 10

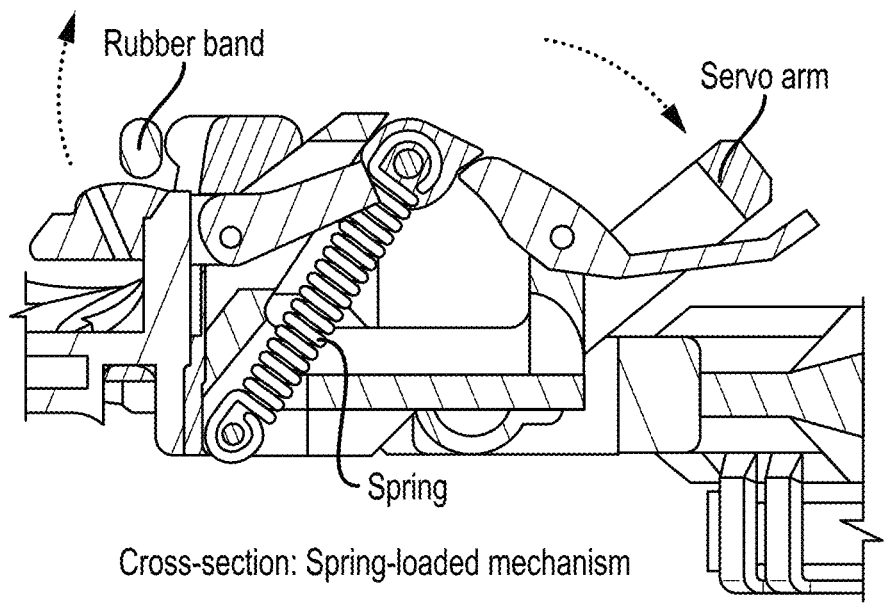
Cross-section: Spring-loaded mechanism
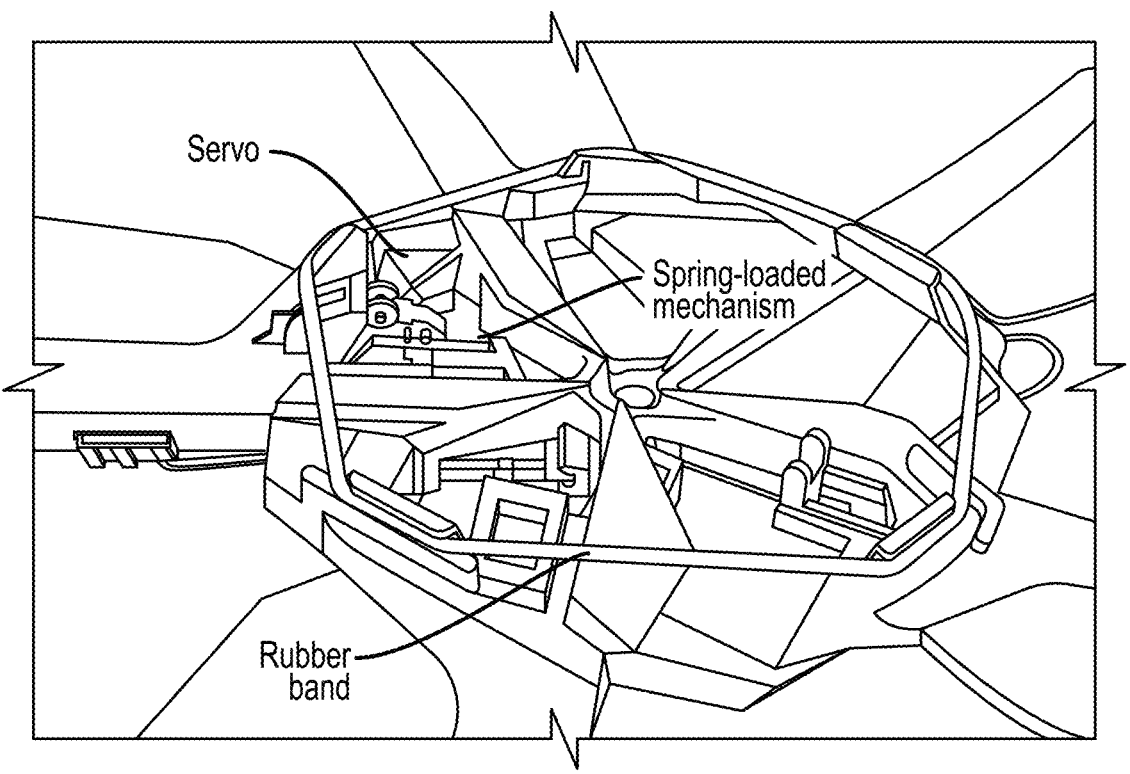
FIG. 24C

Table 6 TABLE OF SIMULATION PARAMETERS

| PARAMETERS | |
|---|---|
| Environment | $\rho_{air} = 1.225 \text{kg/m}^3$, $g = -9.81 \text{m/s}$ |
| Initial conditions | $V_Z = 0 \text{m/s}$, $\Omega_Z = -18.85 \text{rad/s}$ |
| Objective fn coeffs | $\kappa_1 = 50$, $\kappa_2 = 20$, $\kappa_3 = 20$, $\kappa_4 = 350$, $\kappa_5 = 800$ |
| Others | $n_1 = 3000$, $n_2 = 9999$, $n_3 = 2000$, $n_4 = 10000$, $n_5 = 40000$ $t_s = 10\text{s}$, $t_f = 40\text{s}$ $n_{be} = 12$ |
| OPTIMIZED DESIGN VARIABLES | |
| Parameters | $P_x = 25\text{mm}$, $P_y = 5\text{mm}$, $\Theta = 106°$, $T_o = 0.0761\text{N}$, $T_{amp} = 0.3104\text{N}$, $\epsilon = -0.0087$ |
| Others | $\gamma = 0.174 \text{rad}$, $m = 68\text{g}$ $L_x = 350\text{mm}$, $L_y = 177\text{mm}$, $L_z = 39\text{mm}$ |

FIG. 31

|  | | Thruster Config | |
|---|---|---|---|
| Control Strategy | | Optimized | Arbitrary |
| Square Cyclic | O1 | [25, 5, 106]<br>GS = 40.91°<br>$t_c$ = 16.83s | A1   [10, 360, 0]<br>GS = 41.15°<br>$t_c$ = 29.75s |
| Sine Cyclic | O2 | [25, 5, 106]<br>GS = 58.90°<br>$t_c$ = 26.88s | A2   [10, 360, 0]<br>GS = 60.33°<br>$t_c$ = 39.98s |

AUTOROTATING AERIAL DEVICE, METHOD OF FORMING THE AUTOROTATING AERIAL DEVICE AND AN AUTOROTATING AERIAL SYSTEM

CROSS-REFERENCE TO RELATED APPLICATION(S)

This application is a national stage of PCT Application No. PCT/SG2021/050259 filed on May 11, 2021 that claims the benefit of priority of Singapore Patent Application No. 10202004386S, filed on 12 May 2020, the content of both of which are hereby incorporated by reference in their entirety for all purposes.

TECHNICAL FIELD

The disclosure herein generally relates to an autorotating aerial device, a method of forming the autorotating aerial device and an autorotating aerial system.

BACKGROUND

In many areas such as military, research, wildlife and disaster rescue efforts, it is helpful to deploy large numbers of lightweight sensors or payloads to desired locations as quickly as possible. In some use cases, the covertness of the deployment is critical to the success of the mission. These sensors or payloads can be air-deployed using an aircraft or an unmanned aerial vehicle (UAV). The conventional way to deploy sensors is either by hard-landing of ruggedized sensors or by the use of an arrest device such as a parachute or a guided parafoil. The drawback with the former is the high cost of manufacturing ruggedized sensors and the inflexibility of the flight path for deployment aircraft. With the latter, the challenge lies with the intricate packaging of the parafoil whose canopy must not collapse for a successful drop.

Bio-inspired robotics, the imitation of nature's models, systems and elements, has often helped to solve complex human problems. There have been some notable attempts at lightweight sensor delivery using samara-inspired methods. A research work by Kellas, "The guided samara: design and development of a controllable single-bladed autorotating vehicle," Master's thesis, Massachusetts Institute of Technology, 2007, described an autorotating device with a controllable vertical fin mounted at the wingtip. Trajectory controlled drop tests were inconclusive due to poor weather, short drop distance and technical difficulties. Another work featured a samara-inspired device with an integrated electro-mechanical structure. This work focused on low-cost and easy manufacturing of the device, lacking trajectory control. Other works have explored using autorotation or samara-inspired designs, but none had the element of trajectory or directional control. This likely indicates that research interest in single-winged autorotating devices may be limited, largely due to the many challenges involved in designing a readily-autorotating platform and lack of appropriate testing facilities while possible results do not appear very appealing or rewarding. Another work byUS Naval Research Laboratory features a disposable sensor-carrying platform, CICADA as described in A. Kahn and D. Edwards, "Navigation, guidance and control for the cicada expendable micro air vehicle," in *AIAA Guidance, Navigation, and Control Conf.*, 2012, p. 4536, with navigation, guidance and flight control, but using a fixed-wing platform. Other payload delivery or surveillance solutions are also in the form of fixed-wing type micro air vehicles but they use on-board propulsion system for sustained flights.

A need therefore exists to provide an autorotating aerial device that seeks to overcome, or at least ameliorate, one or more of the deficiencies of conventional autorotating aerial device, and more particularly, providing an improved autorotating aerial device, such as having improved control of trajectory direction and descent speed in various environmental conditions. It is against this background that the present invention has been developed.

SUMMARY

According to a first aspect, there is provided an autorotating aerial device that includes a housing member having disposed thereon an actuator and a controller configured to control the actuator. The autorotating aerial device also includes a wing member coupled to the actuator, the wing member comprising a main wing portion and a flap portion adjustable with respect to the main wing portion, wherein the controller is configured to control the actuator to switch the autorotating aerial device between a diving mode of operation and an autorotating mode of operation based on adjusting an angle of attack of the flap portion, the angle of attack being with respect to a lateral axis along the main wing portion.

According to a second aspect, there is provided a method of forming an autorotating aerial device, the method includes providing a housing member having disposed thereon an actuator and a controller configured to control the actuator. The method also includes providing a wing member comprising a main wing portion and a flap portion adjustable with respect to the main wing portion. The method also includes coupling the wing member to the actuator, wherein the controller is configured to control the actuator to switch the autorotating aerial device between a diving mode of operation and an autorotating mode of operation based on adjusting an angle of attack of the flap portion, the angle of attack being with respect to a lateral axis along the main wing portion.

According to third aspect, there is provided an autorotating aerial system, the system includes two or more autorotating aerial devices, each autorotating aerial device according to the first aspect coupled together at a coupling hub, wherein for said each autorotating aerial device, the actuator of the autorotating aerial device is configured to release the autorotating aerial device from the coupling hub in response to a trigger.

BRIEF DESCRIPTION OF THE DRAWINGS

Described embodiments will be better understood and readily apparent to one of ordinary skill in the art from the following written description, by way of example only, and in conjunction with the drawings, in which:

FIG. 5A illustrates two different modes of operation of the autorotating aerial device according to various example embodiments;

FIG. 10 shows a table illustrating optimized data values according to various example embodiments;

FIG. 24C shows a spring loaded mechanism according to various example embodiments;

FIG. 31 shows a table of initial conditions for genetic algorithm according to various example embodiments;

DETAILED DESCRIPTION

Various embodiments provide an autorotating aerial device, a method of forming the autorotating aerial device and an autorotating aerial system comprising two or more of the autorotating aerial devices.

Figure 1:
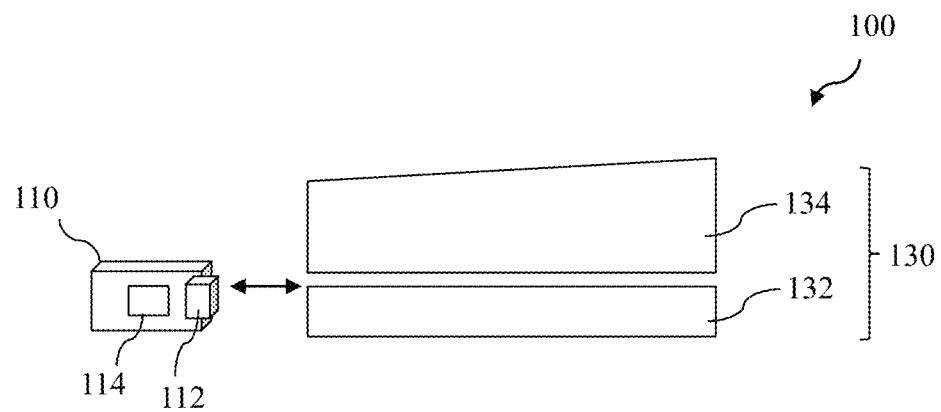
FIG. 1 depicts a schematic drawing of an autorotating aerial device according to various embodiments.

FIG. 1 depicts a schematic drawing of an autorotating aerial device 100 (which may also be herein interchangeably referred to as a wing device or simply as a wing or samara autorotating wing) according to various embodiments. The autorotating aerial device 100 comprises: a housing member 110 having disposed (e.g., arranged or affixed) thereon an actuator 112 and a controller 114 configured to control the actuator; and a wing member 130 coupled to the actuator, the wing member comprising a main wing portion 132 and a flap portion 134 adjustable with respect to the main wing portion. In particular, the controller is configured to control the actuator to switch the autorotating aerial device between a diving mode of operation and an autorotating mode of operation based on adjusting an angle of attack of the flap portion, the angle of attack being with respect to a lateral axis along the main wing portion. Accordingly, the autorotating aerial device may advantageously include bi-directional flight transition (autorotating and diving) and have trajectory control by using only one actuator. Further, various embodiments may employ autorotation to slow down vertical descent of the autorotating aerial device by a single-flap mechanism to achieve trajectory control during the autorotation. Accordingly, the autorotating aerial device 100 may have improved control of trajectory direction and descent speed in various environmental conditions, including vertical descent, diving, quick recovery and soft landing.

The housing member 110 may accommodate electronic components and battery of the autorotating aerial device 100, while the wing member 130 may be a light-weight wing structure creates the aerodynamic lift and torque required to initiate and sustain autorotation. In various embodiments, the autorotating aerial device 100 may be single-actuator system. In other words, only one actuator is used for the autorotating aerial device and associated to the wing member. For example, the actuator incorporated in the autorotating aerial device may have a good range of actuation, fast actuation speed and light weight. The autorotating aerial device may be provided with agility of a decent glide slope with directional control, diving and autorotation modes, using a single actuator. Accordingly, the autorotating aerial device may advantageously actively switch between the autorotating mode of operation and the diving mode of operation, at any part of the descent, achieved by the use of a single actuator on board. Accordingly, the autorotating aerial device 100 may have improved control of trajectory direction and descent speed in various environmental conditions.

In various embodiments, the above-mentioned control the actuator to switch the autorotating aerial device between the diving mode of operation and the autorotating mode of operation comprises adjusting the angle of attack of the flap portion beyond (or above) a critical angle of attack for the diving mode of operation and adjusting the angle of attack of the flap portion below the critical angle of attack for the autorotating mode of operation. The critical angle of attack denotes the switch (or transition) between diving and autorotation of the autorotating aerial device 100. For example, when the flap portion is adjusted such that the angle of attack (or flap angle) is beyond the critical angle of attack, the autorotating aerial device is in the diving mode of operation, and when the flap portion is adjusted such that the angle of attack is below the critical angle of attack, the autorotating aerial device is in the autorotating mode of operation.

The critical angle of attack may be defined based on a predetermined maximum drop velocity for autorotation, $V_{max}$. The autorotating aerial device 100 may be considered stalling when its drop speed is beyond $V_{max}$ as the wing member is unable to produce useful aerodynamic forces. Accordingly, when the flap portion is actuated such that the angle of attack is beyond the critical angle of attack, the wing member may stall and is unable to remain in autorotation. The autorotating aerial device may then enter the diving mode of operation. In a non-limiting example, the maximum drop velocity for autorotation, $V_{max}$ may be defined to be about −5 m/s. The drop speed of the autorotating aerial device may increase sharply after this point.

In various embodiments, the critical angle of attack is about 70° for a positive angle (e.g., above 0°) with respect to the lateral axis along the main wing portion and about −60° for a negative angle (e.g., below 0°) with respect to the lateral axis along the main wing portion.

In various embodiments, the actuator 112 is controllable to adjust the angle of attack of the flap portion 134 to an angle in a range of from more than about 70° to about 180° for a positive angle (e.g., above 0°) with respect to the lateral axis along the main wing portion or from less than about −60° to about −180° for a negative angle (e.g., below 0°) with respect to the lateral axis along the main wing portion to initiate the diving mode of operation of the autorotating device. In various other embodiments, the actuator 112 is controllable to adjust the angle of attack of the flap portion 134 to an angle in a range of from more than about 70° to about 90° for a positive angle (e.g., above 0°) with respect to the lateral axis along the main wing portion or from less than about −60° to about −90° for a negative angle (e.g., below 0°) with respect to the lateral axis along the main wing portion to initiate the diving mode of operation of the autorotating device. For example, the wing member 130 may be completely stalled when the angle of attack of the flap portion is adjusted to about 90° for a positive angle with respect to the lateral axis along the main wing portion or to about −90° for a negative angle with respect to the lateral axis along the main wing portion. Upon being stalled, the autorotating aerial device 100 may enter the diving mode of operation. In various embodiments, the autorotating aerial device 100 may achieve maximum diving speeds when the angle of attack of the flap portion is adjusted to about 90° with respect to the lateral axis along the main wing portion or to about −90° with respect to the lateral axis along the main wing portion.

In various embodiments, in the autorotating mode of operation, the controller 114 is further configured to control the actuator 112 to control a pitch angle of the flap portion 134 based on a square cyclic control.

In various embodiments, the main wing portion 132 comprises a leading edge and a trailing edge, wherein the flap portion 134 is arranged along a length of the trailing edge of the main wing portion.

In various embodiments, the main wing portion 132 is formed of wood and the flap portion 134 is formed of a solid foam material.

In various embodiments, the actuator 112 is a servo configured to adjust the angle of attack of the flap portion 134 with respect to the lateral axis along the main wing portion 132.

In various embodiments, the actuator 112 is further configured to be removably coupled to a coupling hub, wherein the coupling hub is configured to couple respective housing members of two or more autorotating aerial devices for collaborative autorotation.

In various embodiments, the housing member 110 further having disposed thereon a magnetometer, a global positioning system, a receiver, a voltage regulator, an inertial measurement unit and a battery.

In various embodiments, the housing member 110 further comprises a memory, and the controller 114 is communicatively coupled to the memory and configured to control the actuator 112 to switch the autorotating aerial device between the diving mode of operation and the autorotating mode of operation based on adjusting the angle of attack of the flap portion.

As described, the autorotating aerial device 100 may have two different flight modes, i.e., the autorotating mode of operation and the diving mode of operation, with a good glide angle (e.g., an average glide angle of 28.9°) in the autorotating mode of operation. In various embodiments, the bi-directional transition between the two modes and directional control may be achieved by using only a single actuator. Accordingly, the autorotating aerial device may actively switch between the autorotating mode of operation and the diving mode of operation, at any part of the descent, achieved by the use of a single actuator on board according to various example embodiments. The autorotating aerial device according to various embodiments overcomes challenges in conventional samara-like craft which is inclined to autorotate from any possible initial conditions.

Further, in order to minimize the glide angle, the autorotating aerial device 100 includes a design optimization along with a new cyclic control strategy for directional control of the autorotating descent.

Accordingly, various embodiments provide a lightweight, robust and steerable autorotating aerial device and autorotating aerial system which may be used for aerial deployment of miniature or lightweight sensors or payloads, for example, in tough environmental conditions.

Figure 2:
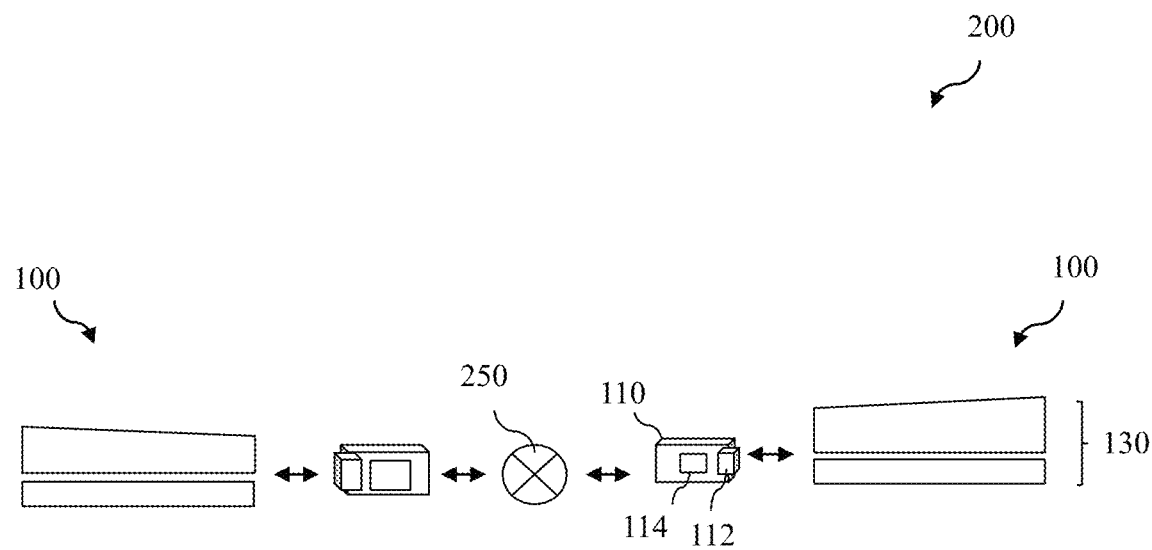
FIG. 2 depicts a schematic drawing of an autorotating aerial system according to various embodiments.

FIG. 2 depicts a schematic drawing of an autorotating aerial system 200 according to various embodiments. The autorotating aerial system may comprise two or more autorotating aerial devices, each autorotating aerial device according to the above-mentioned autorotating aerial device coupled together at a coupling hub 250; and wherein for said each autorotating aerial device, the actuator is configured to release the autorotating aerial device from the coupling hub in response to a trigger.

In various embodiments, the actuator is configured to release the two or more autorotating aerial devices from the coupling hub simultaneously.

In various embodiments, the coupling hub comprises a spring loaded mechanism disposed on the housing member of said each autorotating aerial device, respectively, for interlocking corresponding housing members of the two or more autorotating aerial devices.

Figure 3:
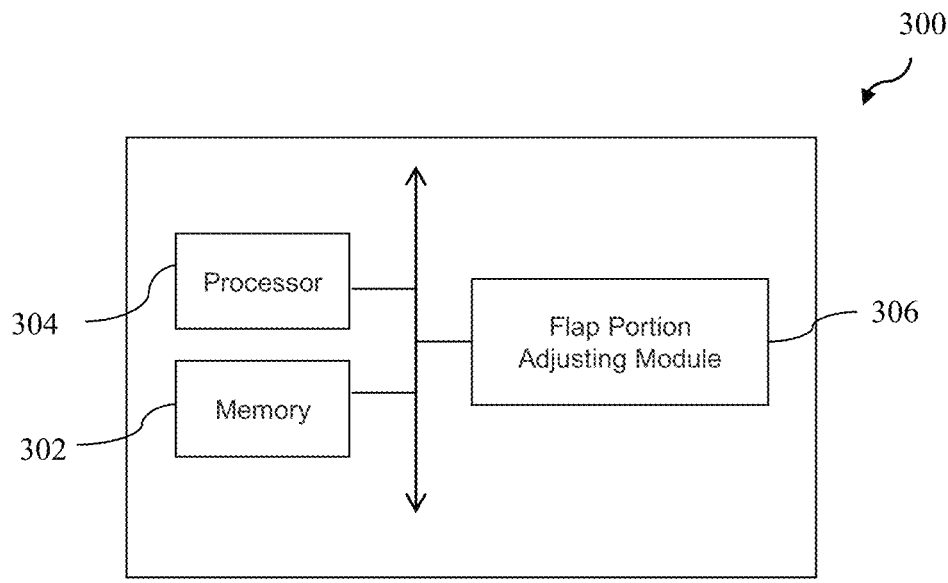
FIG. 3 depicts a schematic block diagram of a system for controlling the autorotating aerial device between a diving mode of operation and an autorotating mode of operation according to various embodiments.

FIG. 3 depicts a schematic block diagram of a system 300 for controlling the autorotating aerial device between a diving mode of operation and an autorotating mode of operation based on adjusting an angle of attack of the flap portion of the autorotating aerial device according to various embodiments, such as the flap portion 134 of the autorotating aerial device 100 as described hereinbefore with reference to FIG. 1 according to various embodiments. The system 300 comprises a memory 302, and a processor 304 (e.g., corresponding to the controller as described hereinbefore) communicatively coupled to the memory 302 and configured to: control the actuator to switch the autorotating aerial device between a diving mode of operation and an autorotating mode of operation based on adjusting the angle of attack of the flap portion, as described hereinbefore with reference to FIG. 1 according to various embodiments.

It will be appreciated by a person skilled in the art that the processor may be configured to perform the required functions or operations through set(s) of instructions (e.g., software module(s)) executable by the processor 304 to perform the required functions or operations. Accordingly, as shown in FIG. 3, the system 300 may comprise a flap portion adjusting module (or a flap portion adjusting circuit) 306 configured to: control the actuator to switch the autorotating aerial device between a diving mode of operation and an autorotating mode of operation based on adjusting an angle of attack of the flap portion, as described hereinbefore with reference to FIG. 1 according to various first embodiments.

It will be appreciated by a person skilled in the art that the above-mentioned module may be realized by or implemented as one functional module (e.g., a circuit or a software program) as desired or as appropriate. For example, the flap portion adjusting module 306 may be realized as an executable software program (e.g., software application or simply referred to as an "app"), which for example may be stored in the memory 302 and executable by the processor 304 to perform the functions/operations as described herein according to various embodiments.

For example, in various embodiments, the memory 302 may have stored therein the flap portion adjusting module 306 as described hereinbefore according to various embodiments, which are executable by the processor 304 to perform the corresponding functions/operations as described herein.

A computing system, a controller (e.g., microcontroller) or any other system providing a processing capability may be provided according to various embodiments in the present disclosure. For example, the system 300 described hereinbefore may include a processor (or controller) 304 and a computer-readable storage medium (or memory) 302 which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions which will be described in more detail below may also be understood as a "circuit" in accordance with various alternative embodiments. Similarly, a "module" may be a portion of a system according to various embodiments and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "determining", "optimizing", "obtaining", "controlling", or the like, refer to the actions and processes of a computer system, or similar electronic device, that manipulates and transforms data represented as physical quantities within the computer system into other data similarly represented as physical quantities within the computer system or other information storage.

The present specification also discloses a system (e.g., which may also be embodied as a device or an apparatus) for performing the operations/functions of various steps of methods described herein. Such a system may be specially constructed for the required purposes.

In addition, the present specification also at least implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure. For example, it will be appreciated by a person skilled in the art that the flap portion adjusting module 306 may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, one or more of the steps of a computer program/module or method described herein may be performed in parallel rather than sequentially. Such a computer program may be stored on any computer readable medium. The computer readable medium may include storage devices such as magnetic or optical disks, memory chips, or other storage devices suitable for interfacing with a computer processor. The computer program when loaded and executed on such a computer processor effectively results in an apparatus or device that implements one or more steps of the methods described herein.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

Figure 4:
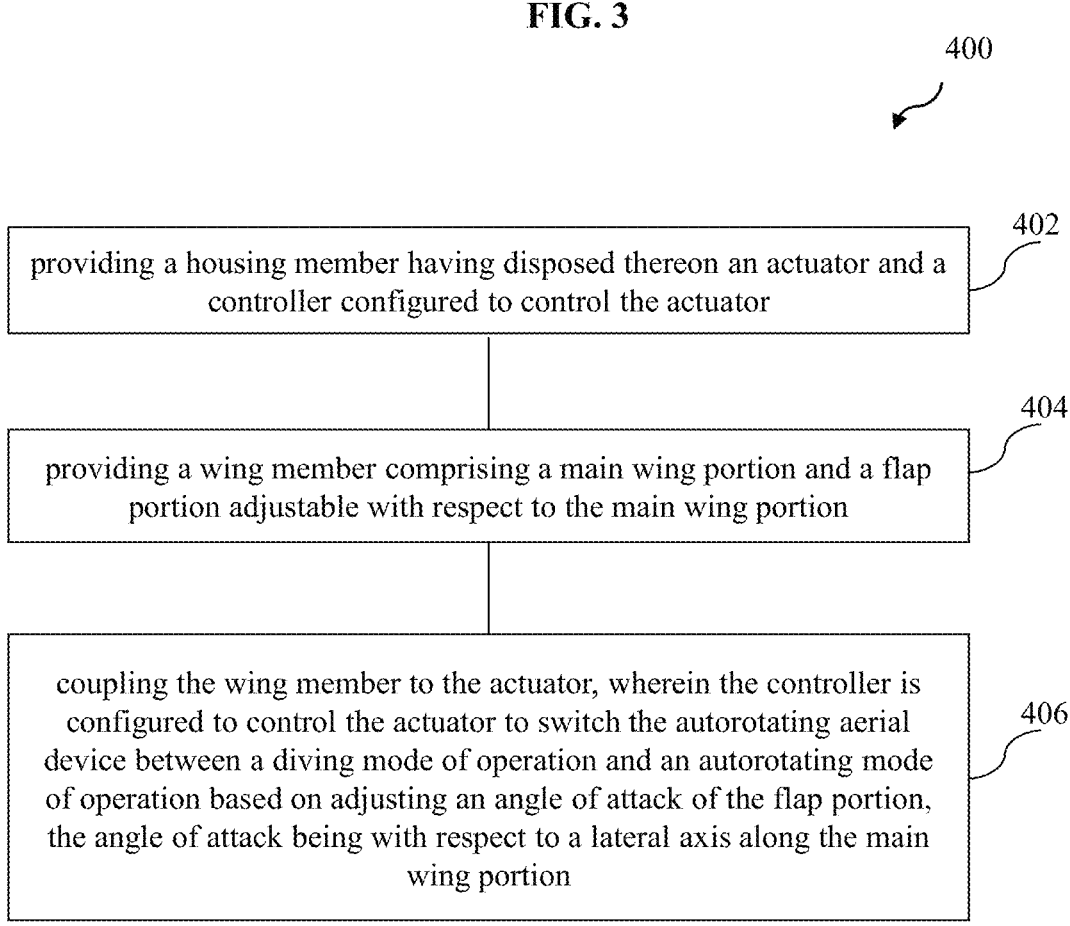
FIG. 4 depicts a schematic flow diagram of a method of forming an autorotating aerial device, such as the autorotating aerial device as described herein with reference to FIG. 1 according to various embodiments.

FIG. 4 depicts a schematic flow diagram of a method 400 of forming an autorotating aerial device, such as the autorotating aerial device 100 as described herein with reference to FIG. 1. The method 400 comprises: providing (at 402) a housing member having disposed thereon an actuator and a controller configured to control the actuator; providing (at 404) a wing member comprising a main wing portion and a flap portion adjustable with respect to the main wing portion; and coupling (at 406) the wing member to the actuator. The controller is configured to control the actuator to switch the autorotating aerial device between a diving mode of operation and an autorotating mode of operation based on adjusting an angle of attack of the flap portion, the angle of attack being with respect to a lateral axis along the main wing portion.

In various embodiments, the method 400 is for forming the autorotating aerial device 100 as described hereinbefore with reference to FIG. 1, therefore, the method 400 may further include various steps corresponding to providing or forming various configurations and/or components/elements of the autorotating aerial device 100 as described herein according to various embodiments, and thus such corresponding steps need not be repeated with respect to the method 400 for clarity and conciseness. In other words, various embodiments described herein in context of the autorotating aerial device 100 is analogously or correspondingly valid for the method 400 (e.g., for forming the autorotating aerial device 100 having various configurations and/or components/elements as described herein according to various embodiments), and vice versa.

In various embodiments, the above-mentioned providing a wing member comprises: decomposing the flap portion into a plurality of blade elements; determining, for each blade element of the plurality of blade elements, an optimized chord length, optimized chord width and optimized flap angle based on a multi-component objective optimization function including a plurality of components relating to the drop speed, rotation rate and undesired oscillations and using genetic algorithm optimization; and forming the flap portion based the optimized chord length and optimized chord width of each blade element and the optimized flap angle.

In various embodiments, the plurality of components of the multi-component objective optimization function comprise a first component relating to rotation speed, a second component relating to drop speed, a third component relating to a penalty function for undesired oscillations, and a fourth component relating to distance deviation.

It will be appreciated by a person skilled in the art that various steps of the method 400 presented in FIG. 4 may be performed concurrently or simultaneously, rather than sequentially, as appropriate or as desired.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In order that the disclosure may be readily understood and put into practical effect, various example embodiments of the disclosure will be described hereinafter by way of examples only and not limitations. It will be appreciated by a person skilled in the art that the example embodiments set forth herein are not limiting and practical application may be embodied in various different forms or configurations. Rather, these example embodiments are provided so that this disclosure will be thorough and complete, and will fully convey the scope of the disclosure to those skilled in the art.

Various example embodiments provide an autorotating aerial device (which may be interchangeably be referred to herein as a diving Samara Autorotating Wing (dSAW), autorotating craft or simply wing device) and method to overcome shortcomings in conventional autorotating aerial devices such as a conventional Samara Autorotating Wing (e.g., SAW+) which although is able to enter autorotation quickly regardless of initial launch conditions and has demonstrated directional control, however, is easily influenced by tough environmental conditions such as strong gusts of wind. In order to eliminate this weakness, two methods are disclosed in the improved Samara Autorotating Wing according to various embodiments including a new flight mode, diving mode of operation (which may be interchangeably referred to herein as the Diving Mode (D-Mode)) in addition to the autorotating mode of operation, and an improved or better glide angle in the autorotating mode of operation. The latter involves optimizing the design parameters and improving the cyclic control technique for the device. Accordingly, in order to minimize its glide angle, a design optimization methodology is presented for the diving Samara Autorotating Wing, along with a new cyclic control strategy for directional control of autorotating descent in the autorotating mode of operation of the device. The dynamic model, simulated in a six degrees-of-freedom environment using Blade Element Theory, is integrated with Genetic Algorithm to derive parameters for the wing geometry, flap angle for autorotation and the proposed cyclic control.

In various example demonstrations, the physical device autorotates at a descent velocity of 1.43 m/s and rotation speed 4.17 Hz, and is able to transit to diving mode of operation in an average duration of 272 ms to increase its descent velocity by at least 17.6 times. Further, at any point during the dive, it is able to transit back into autorotation in an average duration of 327 ms. Semi-outdoor experiments were used to investigate the bi-directional transitions and verify the glide angle (e.g., 28.9°) which is much improved from the conventional SAW+ (e.g., 58.4°). As a demonstration of a real-life deployment scenario and environmental conditions, the autorotating aerial devices were dropped from a fixed-wing UAV at a suburban test site.

Figure 5B:
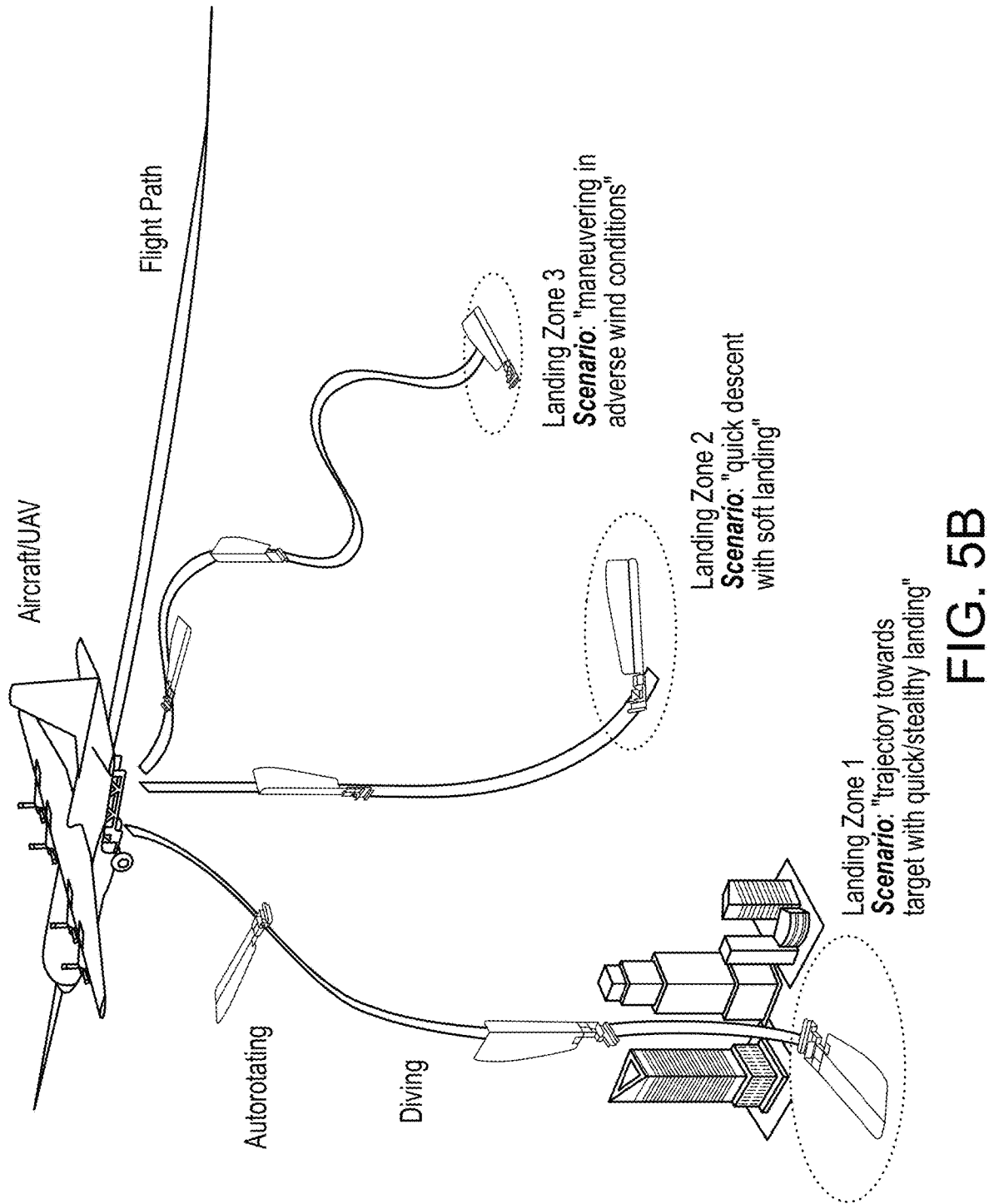
FIG. 5B illustrates an aircraft or UAV that can deploy multiple units of the autorotating aerial device according to various example embodiments.

When environmental elements are violent, the improved Samara Autorotating Wing or diving-SAW, according to various example embodiments can increase its descent speed significantly by diving, thus being less influenced by lateral wind. D-Mode can also be used for a fast and stealthy descent and deployment of payloads. FIG. 5A illustrates two different modes of operation of the autorotating aerial device according to various example embodiments. More particularly, FIG. 5A illustrates the autorotating mode of operation (A-Mode) and the diving mode of operation (D-Mode), both which encompass different strengths. These two modes enhance the capability of the autorotating aerial device, making it suitable for more complex mission profiles and weather conditions. With the versatility of two flight modes, dSAW is capable of lightweight payload delivery in challenging scenarios. FIG. 5B illustrates an aircraft or UAV that can deploy multiple units of dSAW, which can head towards their target destinations, using autorotating or diving modes according to the mission profile.

In nature, a number of animals or seeds employ diving as part of the flight. Notably, peregrine falcons use diving (estimated top speed 157 m/s) in order to attack their prey, but losing altitude of up to 60 m when pulling out of the dive. The maple seed, however, performs much better at recovering from a 'dive'. One research as described in Ortega-Jimenez et al., "Superb autorotator: rapid decelerations in impulsively launched samaras," *Journal of the Royal Society Interface*, vol. 16, no. 150, p. 20180456, 2019, launched maple seeds at 9 m/s and found that they can reach near-zero translational velocity within 150 ms in a rapid deceleration. The maple seed has a much smaller mass than the falcon, yet its rapid deceleration can be attributed more to its ability to convert translational kinetic energy into rotational kinetic energy in a short instant.

For any gliding aerial body that has no means for sustained flight, glide angle is a good measure of its effectiveness and range. In mammals, the Sugar Glider, a nocturnal gliding possum, achieves a gliding angle averaging 29.7° while the northern flying squirrel glides at 26.8°. Flying snakes, although lacking appendages to assist them in their aerial movements, achieve glide angle of 31° late in their flight trajectory. Parafoil canopies may glide up to 11.5°. Interestingly, the glide slope achieved by dSAW is close to that of the Sugar Glider. Although the parafoil may achieve superior glide angles, the flight trajectory of the autorotating aerial device according to various example embodiments may be far more complex, due to its ability to dive and decelerate abruptly.

According to various example embodiments, the diving-SAW includes improved flight dynamics by finding an optimized wing planform and angle of attack of flap for a design configuration that has adequate rotation rate, slow descent rate, and minimum unwanted oscillations. In various example embodiment, Genetic Algorithm (GA) is used to find the optimum solutions.

It is noted that some samara-inspired platforms with on-board propulsion, called monocopters, can achieve sustained controllable flight. These concepts most often use a flap that is cut-out along the main wing. Notably, there are two ways of actuating the flap for trajectory control. The first involves changing the pitch of the flap constantly over several rotations in order to induce a precession circle and the craft achieves lateral motion as a result as described in Pines et al., "Control model for robotic samara: Dynamics about a coordinated helical turn," *Journal of Guidance, Control, and Dynamics*, vol. 33, no. 6, pp. 1921-1927, 2010. The second method is once-per-revolution actuation of the pitch of the flap as described in Houghton et al., "Fly-by-wire control of a monocopter," *Massachusetts Institute of Technology, Project Report,* 2008 and in Fregene et al., "Dynamics and control of a biomimetic single-wing nano air vehicle," in *Proc. of the* 2010 *American Control Conf.* IEEE, 2010, pp. 51-56, akin to cyclic pitch control of helicopter blades using the swash plate mechanism.

According to various example embodiments, a square cyclic control methodology is introduced. This is an improved control over traditional sinusoidal cyclic control and better suited for direct actuation with a rapid servo. The parameters for this control are also found using Genetic Algorithm. This new control methodology, together with the improved design parameters, allows dSAW to achieve a glide angle of 28.9°. dSAW is the only samara-inspired platform with agility of a decent glide slope with directional control, diving and autorotation modes, achieved using a single actuator.

Various example demonstrations are also provided with respect to the single-winged autorotating platform which may be used for example in the field of micro-payload deployment by showing experimental results and a novel flight mode with highly under-actuated control, minimum complexity and at low cost.

According to various example embodiments, the autorotating aerial device may comprise a three-dimensional (3D)-printed body (corresponding to the housing member as described hereinbefore) that houses the electronic components, and a wing laser-cut from thin balsa wood. In various example embodiment, the on-board electronics include a microcontroller (corresponding to the controller as described hereinbefore), a three-axis magnetometer, a 5V step-up voltage regulator, a RC micro-receiver, a GPS, a 1-cell lithium-polymer battery and a servo (corresponding to the actuator as described hereinbefore). The wing member may be designed such that a straight narrow portion forms the leading edge (corresponding to the main wing portion) and a large rear portion forms the flap (corresponding to the flap portion). The components may be strategically placed such that the center of gravity is located very close to the root of the wing (or wing member).

Design Consideration

A conventional autorotating aerial device (e.g., SAW+) demonstrated capabilities such as entering autorotation quickly upon launch and achieving directional control during its descent. It was able to achieve a glide angle of 58.4° but when deployed in real-world conditions, it was observed that the trajectory was easily influenced by strong winds.

The parameters of the autorotating aerial device according to various example embodiments is optimized to improve its glide angle and a new 'diving' flight mode is provided. Some changes are made to the choice of the servo, the wing aspect ratio, the component selection and material choice of the wing.

Figure 5C:
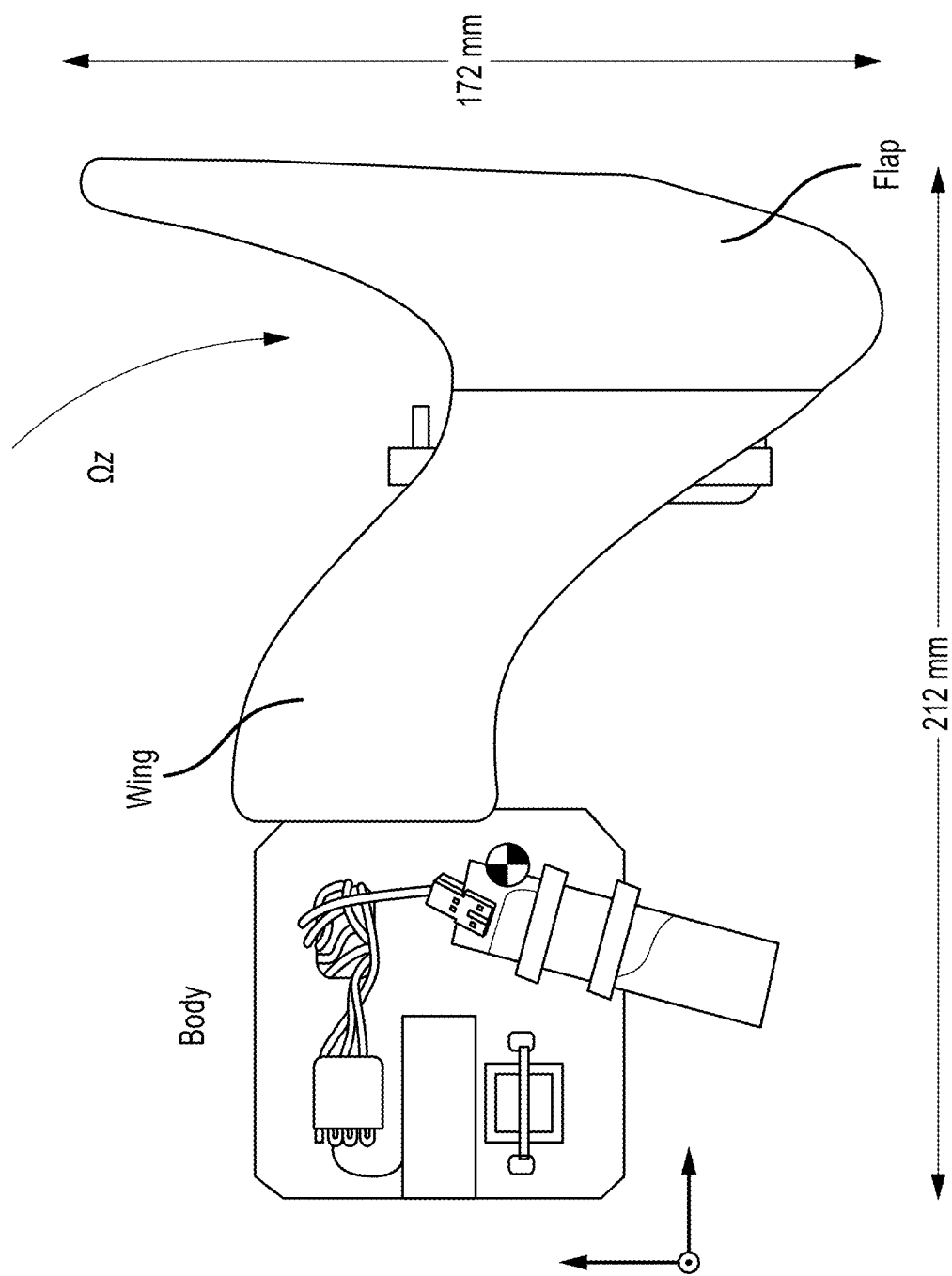
FIG. 5C illustrates a top view of an example Samara Autorotating Wing device, shaped by genetic algorithm for fast spin descent according to various example embodiments.

In various example embodiment, to improve the glide angle of the autorotating aerial device according to various example embodiments, the spin rate (or rotation speed) of the autorotating aerial device may be increased. By having a higher spin rate, the flap may actuate more frequently, thus providing more aerodynamic force for lateral displacement. In various example embodiment, to increase the spin rate in autorotation, one technique may include using Blade Element Theory and genetic algorithm (similar to the process described below in relation to optimization of design parameters) to find the wing planform, location of battery and servo for higher spin rate. The resulting embodiment is shown in FIG. 5C. More particularly, FIG. 5C illustrates a top view of a Samara Autorotating Wing device, shaped by genetic algorithm for fast spin descent. It carried identical electronic components as SAW+ (e.g., Pixracer (mRobotics), uGPS ublox (mRobotics), 3-axis magnetometer (PNI RM3100), a 5V step-up regulator (Pololu), micro receiver (FrSky) and micro servo (Blue Arrow D03013)) except for a larger battery (1 s 650 mAh instead of is 260 mAh). It weighed 88 g, rotated at about 15 Hz, and descended at about 5 m/s. For comparison, SAW+ rotated at 5 Hz, weighed 83 g and dropped at about 3 m/s. Interestingly, the optimization results placed the servo further outside along the wing (e.g., along a side of the wing member), increasing the wing tip mass. Combined with a shorter wing length, it was able to increase the spin rate by a factor of three. To accommodate this, the flap was designed to be the entire outer portion of the wing. However, it also brought about new challenges. Experiments show that faster spin rate came with faster descent speed, and it also took longer before it reached its maximum spin rate after being dropped. The other challenge was a need for a very fast actuator, an electronic compass and inertial measurement unit (IMU) that can cope with the fast rotation. Considering these shortcomings, another method was chosen to focus on.

Another method of improving the glide angle of the autorotating aerial device is by decreasing the descent speed according to various example embodiments. With a slow descent rate, there is more time to traverse laterally. For slowest descent, reductions in weight can be done while finding an appropriate wing aspect ratio and wing planform. The result is the new design shown in FIGS. 6A-6E according to various example embodiments. With a lighter weight and larger wing span, the autorotating aerial device according to various example embodiments is able to enter autorotation almost immediately upon a throw and it possesses a descent rate slow enough for meaningful control and glide angle measurement.

Figure 6A:
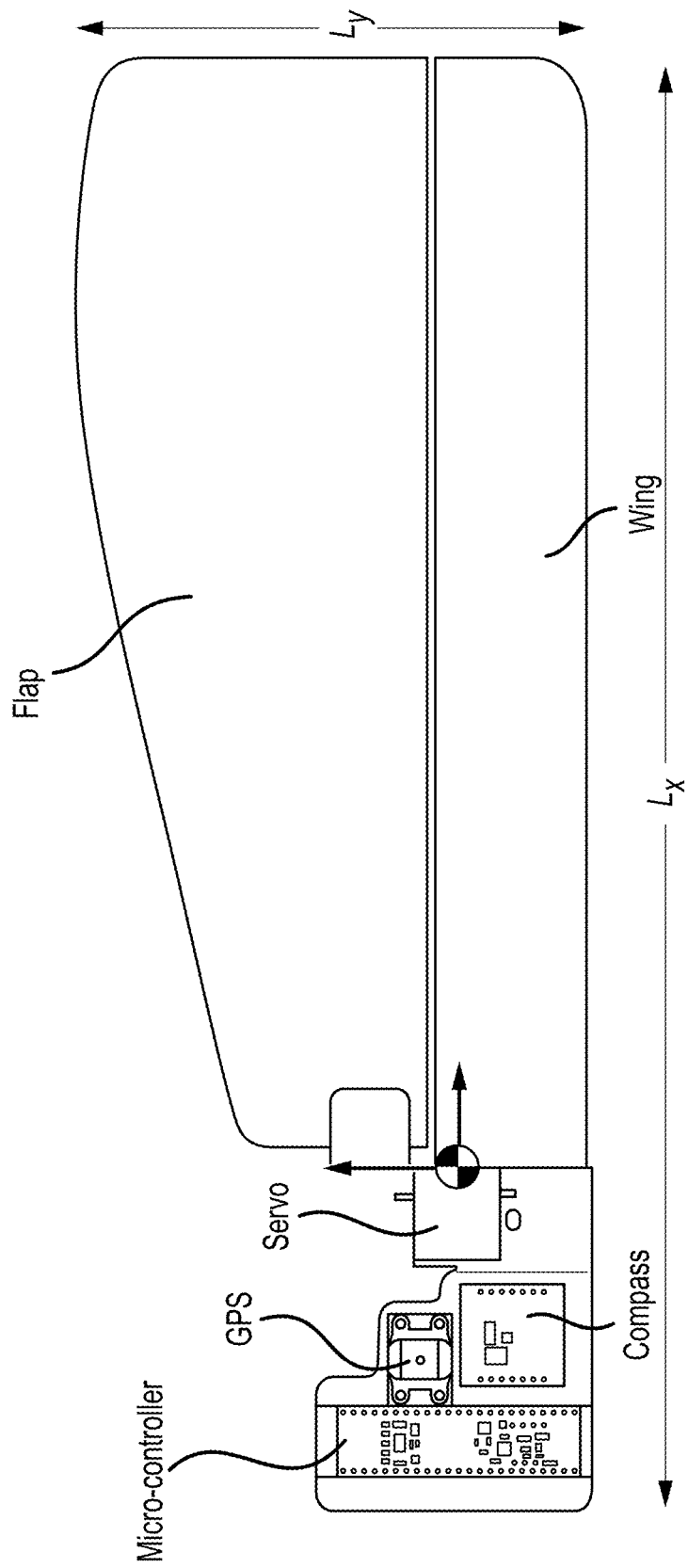
FIGS. 6A-6C illustrate top, side and front views of a design of the autorotating aerial device according to various example embodiments.
Figure 6B:
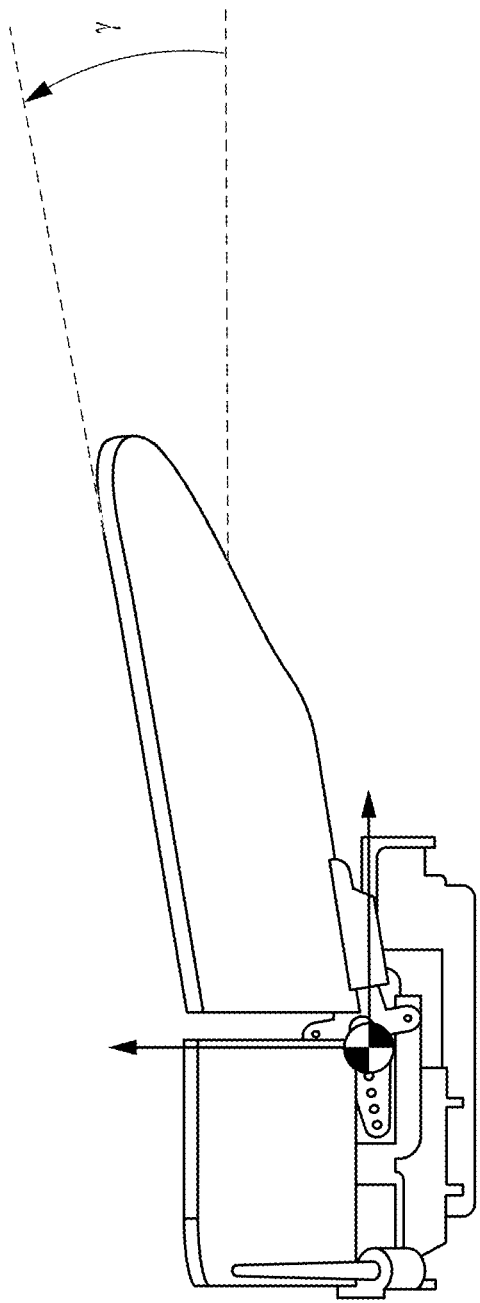
Figure 6C:
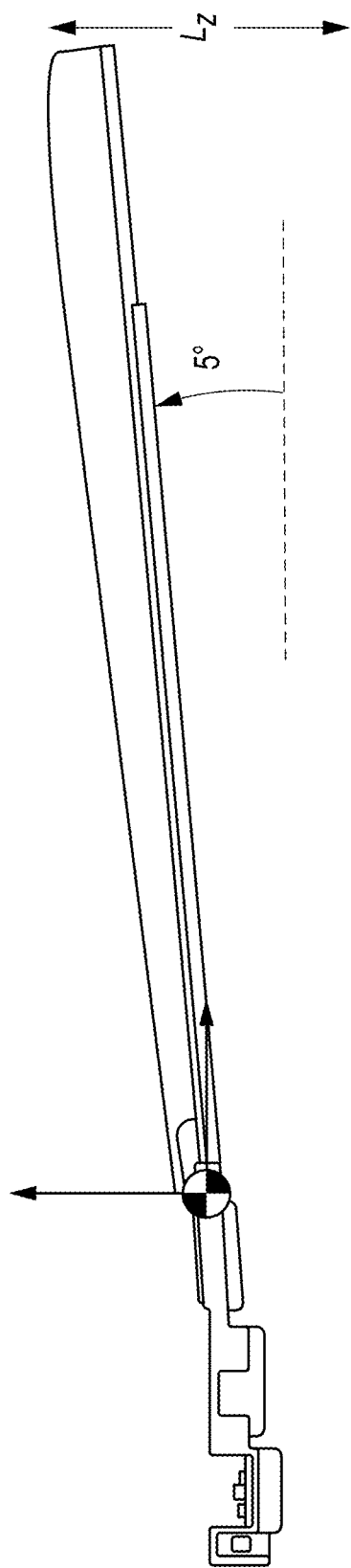
Figure 6D:
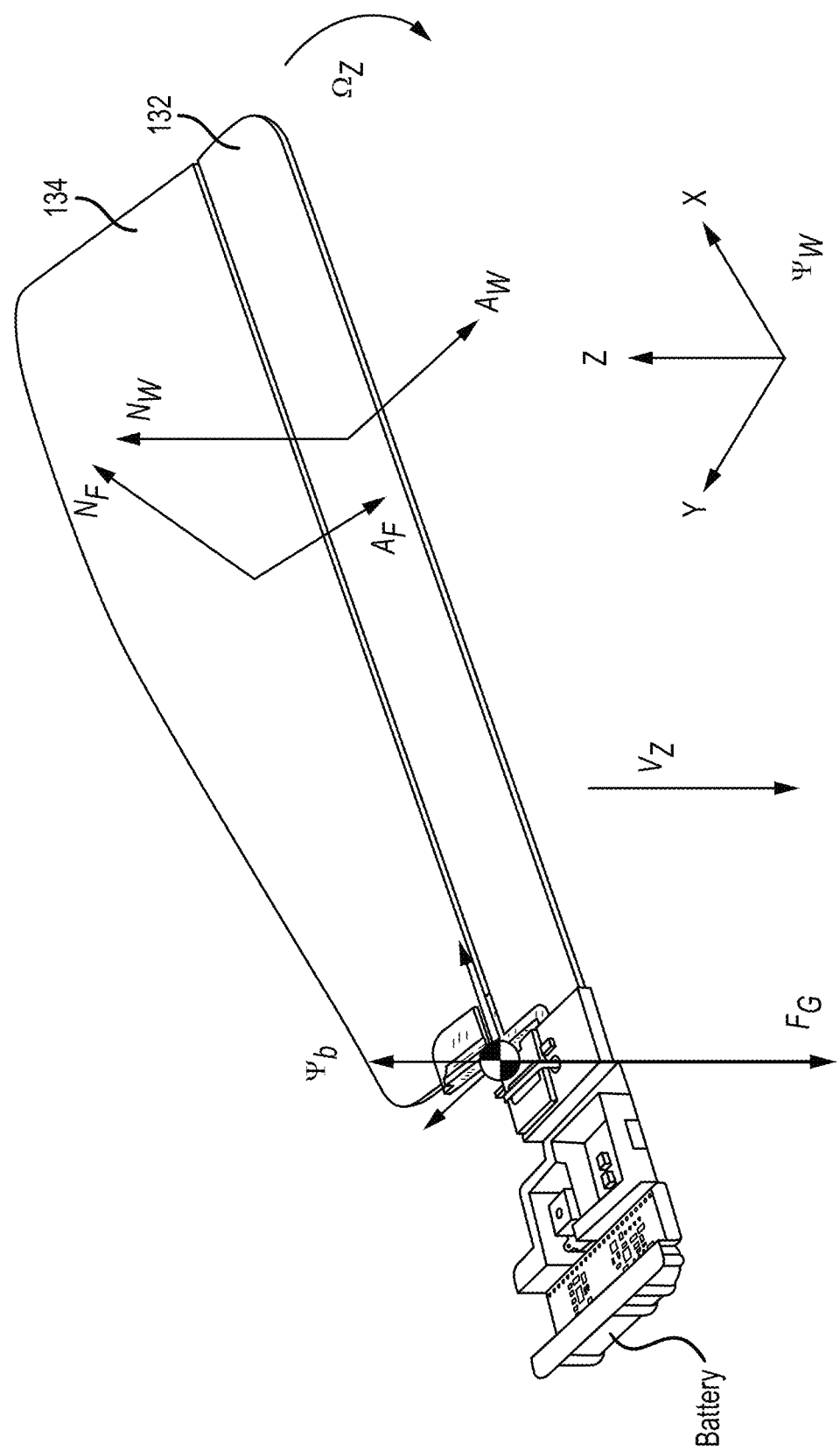
FIG. 6D illustrates a free body diagram with definitions of world frame and bodyframe at the center of gravity according to various example embodiments.

More particularly, FIGS. 6A-6C illustrate top, side and front views of a design of the autorotating aerial device according to various example embodiments. FIG. 6D illustrates a free body diagram with definitions of world frame $\Psi_W$ (X, Y, Z) and body frame $\Psi_b$ (x, y, z) at the center of gravity. $\Omega_Z$ is rotation speed of $\Psi_b$ with respect to $\Psi_W$ and $V_Z$ is the velocity along Z axis. According to various example embodiments, $L_x$, $L_y$, $L_z$, and mass m of final optimized dSAW are given in Table 3 as will be described with respect to FIG. 10. $\gamma$ is the actuated angle of the flap measured from neutral (horizontal) position (corresponding to the lateral axis along the main wing portion as described hereinbefore). $N_W$, $N_F$, $A_W$, and $A_F$ are normal and axial forces from the main wing portion 132 and the flap respectively and $F_G$ is the force due to gravity.

Dynamic Model

Figure 7A:
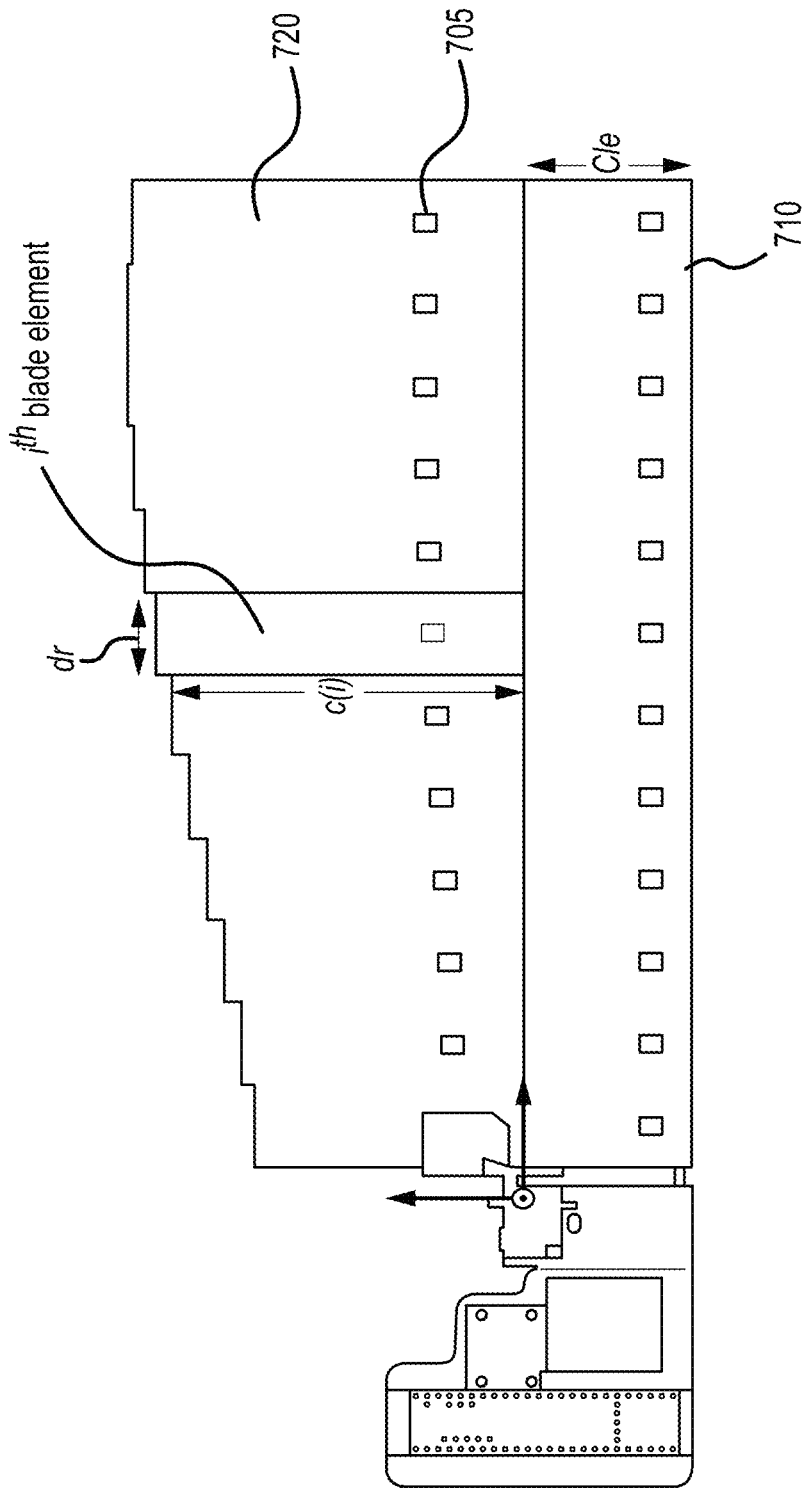
FIG. 7A illustrates visualization of the model in MAT-LAB Simulink, with definitions of blade element width, chord length of blade element and chord length of the leading edge according to various example embodiments.
Figure 7B:
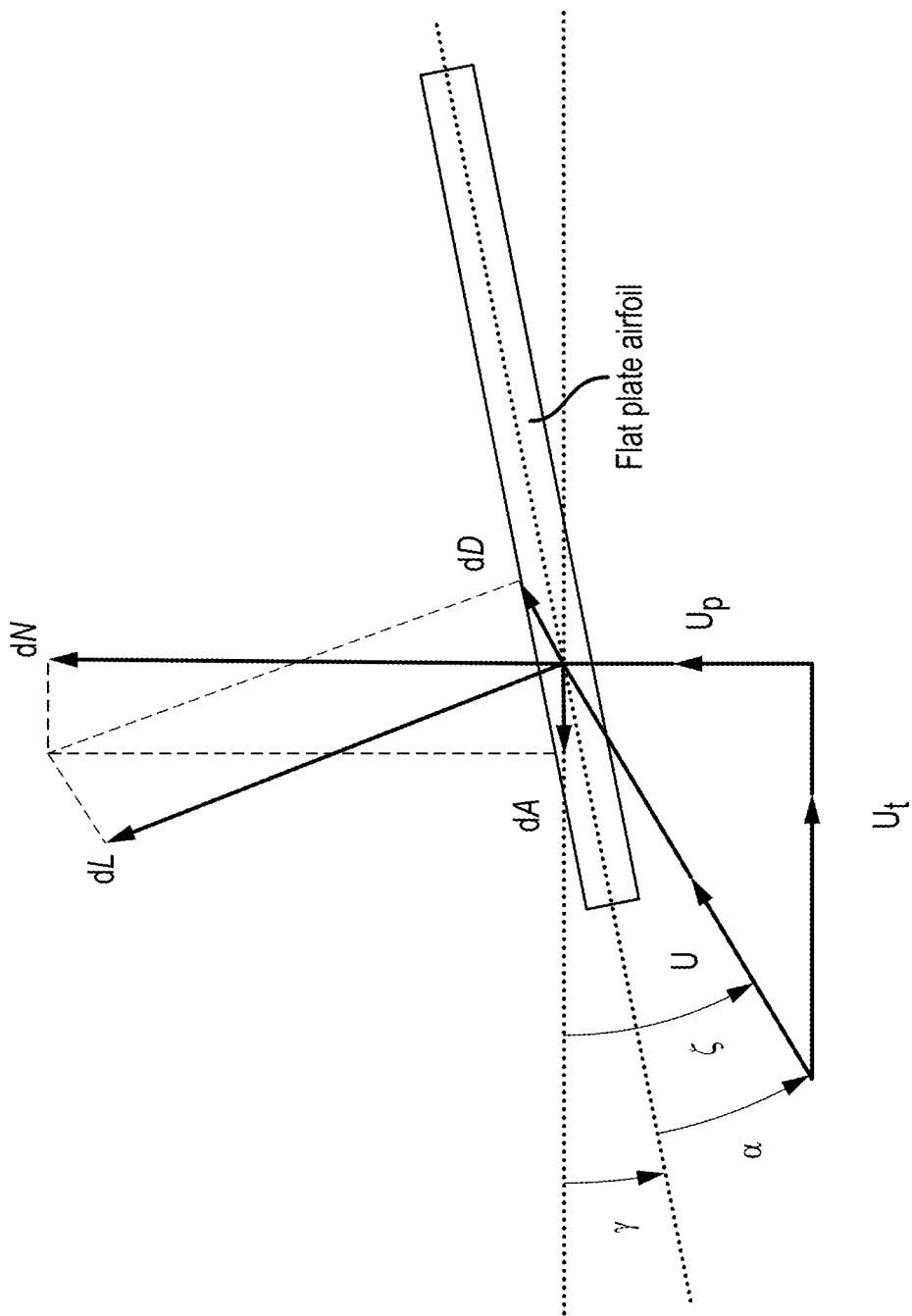
FIG. 7B illustrates a cross sectional view of the blade element, showing inflow air velocity, lift and drag components and the resolved normal and axial forces according to various example embodiments.

The aerodynamic forces acting on the main wing portion (or wing) and the flap portion of the autorotating aerial device may be determined using Blade Element Theory as described in G. J. Leishman, *Principles of Helicopter Aerodynamics*. Cambridge University Press, 2006. As it falls, the wing member (including the main wing portion and the flap portion) is assumed to be the only component producing useful and significant aerodynamic forces, slicing through clean and undisturbed air. The main wing portion and the flap portion are each split into $n_{be}$ blade elements, as shown in FIGS. 7A-7B.

The lift and drag forces on each blade element is individually calculated using the following two equations:

$$dL = \tfrac{1}{2}\rho U^2 c C_l dr \qquad \text{Equation (1)}$$

$$dD = \tfrac{1}{2}\rho U^2 c C_d dr \qquad \text{Equation (2)}$$

where dL and dD are the lift and drag forces respectively acting on the blade element, ρ is the density of air, U is the relative air velocity interacting with the blade element, c is the chord length of the blade element, $C_l$ and $C_d$ are coefficients of lift and drag respectively, and dr is the width of the blade element. Since the wing member is a flat piece of balsa or foam, flat plate airfoil coefficients are used and they are obtained from NACA Technical Report 3221 as described in B. H. Wick, "Study of the subsonic forces and moments on an inclined plate of infinite span," *NACA TN*-3221, 1954.

These lift and drag forces are resolved into normal force dN and axial force dA before being applied back into the dynamics simulation using the following equations:

$$dN = dL \cos(\zeta) + dD \sin(\zeta) \qquad \text{Equation (3)}$$

$$dA = dL \sin(\zeta) - dD \cos(\zeta) \qquad \text{Equation (4)}$$

where ζ is the relative inflow angle of the air.

More particularly, FIG. 7A illustrates visualization of the model in MATLAB Simulink, with definitions of blade element width dr, chord length of blade element c(i) and chord length of the leading edge $c_{le}$. The small squares 705 denote the locations where resolved normal and axial forces are applied back to the model (at the quarter chord). The blade elements are uniformly distributed along the main wing portion (or wing) 710 and the flap portion 720. It is assumed that the aerodynamic forces are acting at the quarter-chord position. FIG. 7B illustrates a cross sectional view of the blade element, showing inflow air velocity (U, Ut, Up), lift and drag components (dL, dD) and the resolved normal and axial forces (dN, dA).

Once the forces from each blade element are computed, the net forces and moments acting on the body (corresponding to the housing member) about its center of mass may be calculated. As dSAW is a rigid body free to rotate and translate in any direction, a standard formulation for equations of motion in six degrees-of-freedom (6-DOF) may be applied as described in P. C. Hughes, *Spacecraft attitude dynamics*. Courier Corporation, 2012. In various example embodiment, MATLAB Simscape Multibody is used to develop the dynamic model of dSAW and simulate its various flight dynamics. For example, Simscape Multibody provides a simulation environment for multiple rigid bodies using blocks representing bodies, joints, constraints, force elements and sensors. 3D computer aided drawing (CAD) assemblies are imported to compute exact masses and moments of inertia and a 3D animation is generated to visualize the system dynamics. When a 6-DOF joint is used, the standard formulations for equations of motion in 6-DOF are automatically applied. Forces and moments can be specified and applied at component level, such as individual blade elements, and resolved forces and moments are automatically calculated and applied to the rigid body.

Flight Modes
Autorotation

In various example embodiment, dSAW in its natural state has mechanical dynamics (such as the dense seed portion, lightweight wing structure, well-defined leading edge) that enables it to enter autorotation easily. However, to help it enter autorotation faster upon any kind of human throw and also to autorotate in the correct direction, the flap is set to a small angle $\gamma_a$. This value is found from optimization results described in a following section. Also, the wing member is angled upwards 5° along the y axis of body frame as shown in FIG. 6C (e.g., angle between the housing member (or body) and the wing member). These two angles together create the aerodynamic imbalance at the start of the transition into autorotation after a human throw or a dive maneuver.

Diving

In various example embodiment, diving requires dSAW to alter its mechanical or aerodynamic properties such that it is unable to initiate or remain in autorotation. Normally, this could be achieved in various ways such as altering the center of gravity location or using an additional thruster or aerodynamic surface to deflect the airflow. Such methods require an additional actuator, adding weight and increasing power drawn from the limited energy stored on-board. Various example embodiments intend to utilize the single actuator that the platform already possesses, for an elegant and simple solution. This means that only the flap is at disposal for any required adjustment. According to various example embodiments, dSAW is unable to remain in autorotation once the wing stalls, which happens when the flap is actuated to a large angle of attack. According to various example embodiments, a stall may be initiated by increasing the angle of attack. Pitching the flap to 90° either up or down (denoted as $\gamma_{d+}$ or $\gamma_{d-}$ respectively) allows the wing (wing member) to be stalled completely. During a dive, dSAW can accelerate to free-fall speeds.

Figure 8:
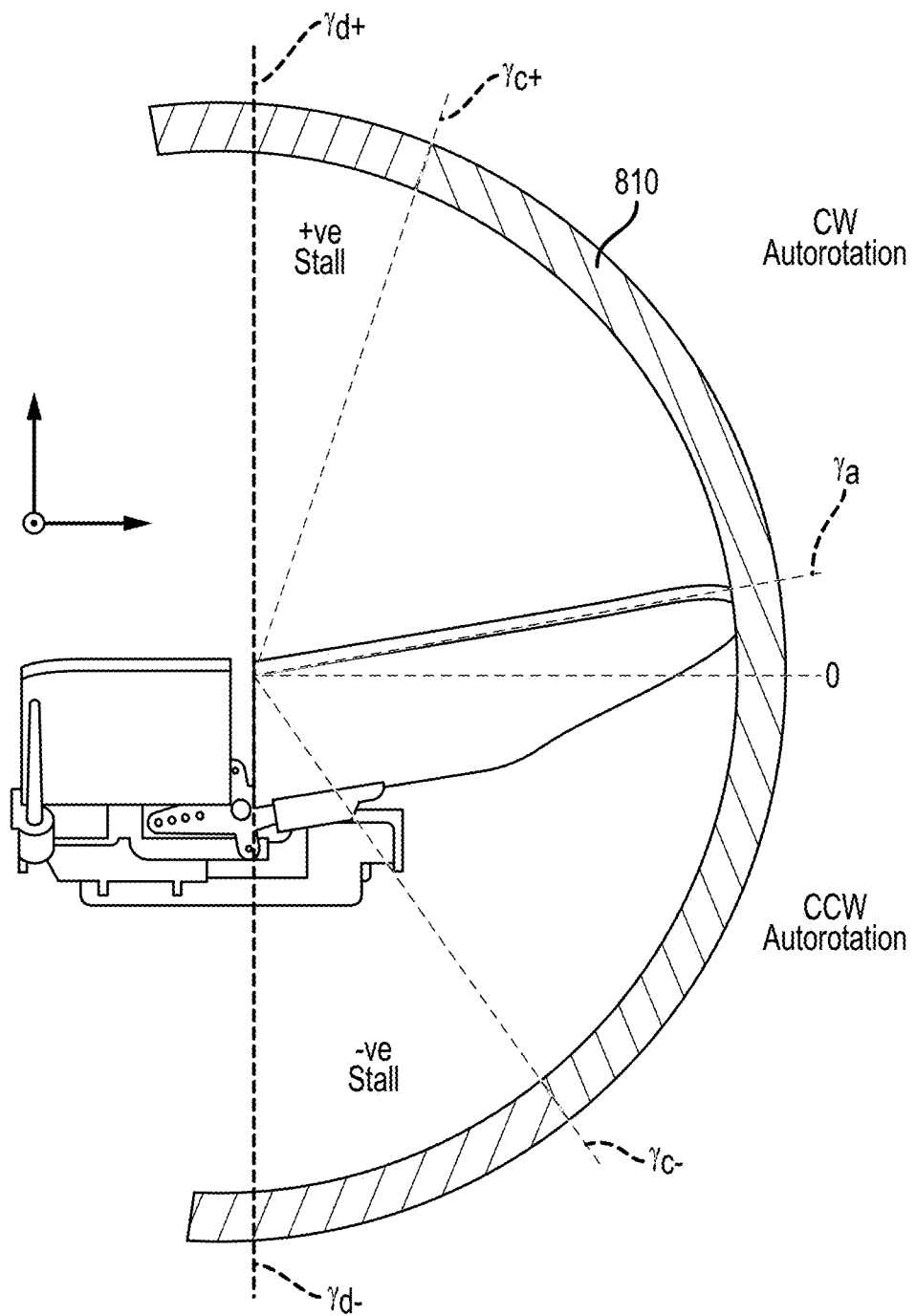
FIG. 8 shows the definition of flap angles from side view according to various example embodiments.
Figure 16:
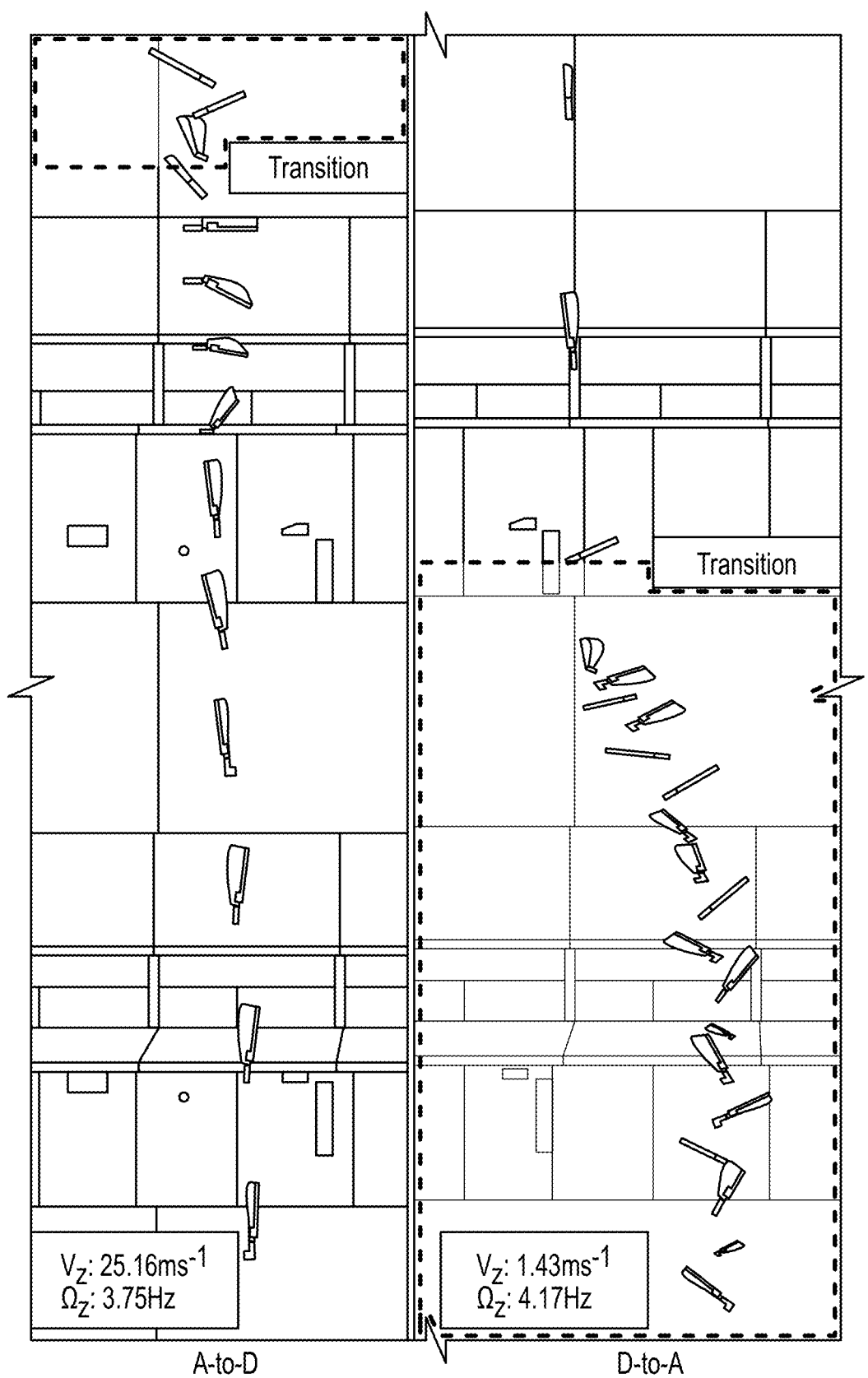
FIG. 16 illustrates the two transitions for negative stall according to various example embodiments.

FIG. 8 shows the range of angles that controls the flight envelope of dSAW, as discussed more later in experimental investigations with respect to FIG. 16. More particularly, FIG. 8 shows the definition of flap angles from side view. According to various example embodiments, $\gamma_a$ is the optimized value of flap angle for A-Mode (optimized flap angle for autorotation). According to various example embodiments, $\gamma_{d+}$ and $\gamma_d$ are flap angles for D-Mode. $\gamma_{c+}$ and $\gamma_c$ are critical flap angles beyond which the wing stalls and dSAW drops faster than $V_{max}$. These angles are discussed further in the experimental investigation. When the flap angle is more than (beyond) the critical flap angle $\gamma_{c+}$ and $\gamma_{c-}$ which are found to be non-symmetric about the center, the wing is stalled and the platform begins to dive. Both $\gamma_{d+}$ and $\gamma_{d-}$ are flap angles that enable high-speed dive behavior (e.g., diving mode of operation). When the flap angle is in autorotation mode region 810, dSAW generally rotates clockwise (CW) for positive γ or counter clockwise (CCW) for negative γ. At $\gamma_a$, dSAW reaches an optimum autorotation whereby it has a slow and stable descent and it also enters autorotation reliably in the correct direction upon dropping. Hence, this method allows dSAW to transit into dive at any point in the flight and also transit back into autorotation in the correct rotation direction reliably.

Optimization and Design Parameters

In various rotary-winged crafts and more prominently on crafts whose entire body rotates during flight (such as the monocopter), there exists a form of precession circle, which is a combined result of gyroscopic precession and aerodynamic forces. This effect is undesirable and it can be observed as oscillations in X and Y axes.

In the optimization according to various example embodiments, the wing planform and the flap angle needed to achieve the following objectives may be determined:
minimum drop speed
rotation rate of about 6 Hz
minimum unwanted oscillations in the X and Y axes In various example embodiment, targeting a 6 Hz rotation speed ensures that it is well within servo actuation speeds and also prevents an unreasonably large wing geometry (slow rotation speed and slow drop speed). Various embodiments is expected to be lighter (due to the removal of certain electronics) compared to a conventional autorotating aerial device, SAW+ as described in Win et al., "Dynamics and control of a collaborative and separating descent of samara autorotating wings," *IEEE Robotics and Automation Letters*, vol. 4, no. 3, pp. 3067-3074, 2019. From preliminary testing, it is found that a simulation according to various example embodiments tends to overestimate the rotation speed by about 20%. To compensate for this and achieve similar rotation speed as SAW+ in reality, a target of 6 Hz is chosen. Without a target rotation speed, the algorithm may search for a solution at extremely slow rotation at near-stall aerodynamics where the dynamic model according to various example embodiments may have limited accuracy or extremely fast rotation where the actuator may not be able to keep up.

Design Parameters

The wing planform is made up with two components: leading edge (corresponding to the main wing portion as described hereinbefore) and the flap (corresponding to the flap portion as described hereinbefore). In various example embodiment, the leading edge portion of the wing may be attached to a straight carbon rod at the front for structural rigidity and to the flap at the back. Other materials having a low weight while providing high structural strength may also be used. This means that the shape of the leading edge portion is fully constrained as a rectangle, with a fixed width $c_{le}$ of about 38 mm. For example, the leading edge portion may be fully constrained as a rectangle according to various example embodiments to provide a front of the leading edge which is straight (constrained by the carbon rod), and the rear of the leading edge forms a hinge for the flap portion. The width is fixed at 38 mm due to the placement of the servo (which is fixed). The flap, therefore, defines the wing planform. The chord lengths of the blade elements of the flap are defined by a polynomial of order 3 to ensure smoothness and to avoid unrealistic changes in chord length. The equation defining flap chord lengths may be as follows:

$$c(i) = C_1 i^3 + C_2 i^2 + C_3 i + C_4, c_{min} \le c(i) \le c_{max} \quad \text{Equation (5)}$$

where i is the blade element designation ($i \le n_{be}$, $i \in Z^+$), c(i) is the chord length of the respective blade element, and $C_1$, $C_2$, $C_3$ and $C_4$ are the coefficients to be determined such that the value of c(i) is bounded between $c_{min}$ and $c_{max}$. Below $c_{min}$, the foam flap is not structurally rigid, and above $c_{max}$, the overall wing would not fit within the compartment of a C-130 model aircraft which is described in the experimental setup later. The other design variables are dr, the width of each blade element and γ, flap angle as shown in the FIG. 7B.

Formulation

In various example embodiment, all the design variables may be expressed in a single concatenated vector $\Gamma = [C_1, C_2, C_3, C_4, dr, \gamma_a]^T$ which are real numbers except dr which is integer valued. These design variables may be summarized as per Table 1.

TABLE 1

Table of design variables

| Parameter | Lower Bound | Upper Bound |
| --- | --- | --- |
| $C_1$ | −1 | 1 |
| $C_2$ | −2 | 2 |
| $C_3$ | −3 | 3 |
| $C_4$ | 1 | 100 |
| dr (mm) | 10 | 30 |
| $\gamma_a$ (rad) | 0 | 0.262 |

The main objective function comprises some sub-objective functions: $F_1$, $F_2$, $F_3$ and $F_4$. $F_1$ is the sub-objective function for average rotation speed, which is defined as follows:

$$F_1 = \left( \frac{\sum_{i=n_1}^{n_2} \Omega_Z(t_i)}{n_2 - n_1} - 37.7 \right)^2 \quad \text{Equation (6)}$$

where $\Omega_z(t_i)$ is the angular velocity in the Z-axis at time $t_i$ and 37.7 rad/s is the rotation speed equivalent to 6 Hz. $n_1$ denotes the step number in the simulation, 3 s from the beginning, and $n_2$ is the step number at the end of the simulation. The reason for starting at $n_1$ is to allow some time for the model to settle into autorotation stage. $F_2$ is the sub-objective function for average drop speed which is defined as follows:

$$F_2 = -\frac{\sum_{i=n_1}^{n_2} V_Z(t_i)}{n_2 - n_1} \quad \text{Equation (7)}$$

where $V_Z$ is the velocity in the Z-axis. Since the craft (autorotating aerial device) is traveling downwards, $V_Z$ is a negative value. $F_3$ is the sub-objective penalty function for undesired oscillations and is defined as follows:

$$F_3 = \frac{\sum_{i=n_1}^{n_2} \left( \Omega_X(t_i)^2 + \Omega_Y(t_i)^2 \right)}{n_2 - n_1} \quad \text{Equation (8)}$$

where $\Omega_X$ and $\Omega_Y$ are angular velocities in the X and Y-axes respectively, which represent the body (or housing member) rolls during each rotation.

$F_4$ is sub-objective function for the distance deviation and is defined as follows:

$$F_4 = \sqrt{(d_X(t_s) - d_X(t_f))^2 + (d_Y(t_s) - d_Y(t_f))^2} \quad \text{Equation (9)}$$

where $d_X$ and $d_Y$ are distances in X and Y-axes with respect to the origin in the world frame. $t_s$ and $t_f$ are start and final times respectively. This sub-objective function serves as another way for penalizing an unstable system whereby it does not oscillate much but it keeps deviating towards a certain direction.

The optimization formulation may be summarized as follows:

$$\min_{\Gamma} \kappa_1 F_1 + \kappa_2 F_2 + \kappa_3 F_3 + \kappa_4 F_4 \quad \text{Equation (10)}$$

where $\Lambda_1$, $\Lambda_2$, $\Lambda_3$ and $\Lambda_4$ are the weightage coefficients of each sub-objective function. Although the optimization problem can be formulated as a multi-objective optimization, it is simplified to produce a single result using a weighted sum from subjective preferences. The coefficients, given in Table 3 later, serve to non-dimensionalize the function outputs and bring them to a similar order of magnitude. Highest priority is given to $F_2$ (lowest drop speed), followed by $F_3$ (reduce oscillations).

Optimization Results

In various example embodiment, the optimization was run on MATLAB's genetic algorithm ga function by simulating the various possible dSAW configurations, using principles of biological evolution and natural selection. It works by using a crossover and mutation function to modify a population of individual solutions in order to obtain the solution with best fitness value. For example, the algorithm is stopped when the best fitness value remains unchanged for fifteen consecutive generations. Each simulation is run for 40 seconds of drop, with a fixed step size of 0.001 s.

In various example embodiment, the design variables corresponding to the best fitness value is $\Gamma=[-0.0325, 0.4175, 2.1997, 58.5336, 23, 0.1887]^T$. This results in a wing planform shown in both FIGS. 6A-6D and FIGS. 7A-7B. When making the actual wing, the smooth shape of the wing is achieved by joining the blade elements together using a spline. The simulation parameters are given in Table 3.

Square Cyclic Control

Cyclic pitch control on helicopter blades is governed by a sinusoidal function such as one given in Equation 10 below. The blade pitch angle follows a smooth sine curve within a period of one rotor revolution. From a mechanical perspective considering the configuration of the swash plate, such smooth motion is logical and desired. Monocopters as described in, Houghton et al., "Fly-by-wire control of a monocopter," *Massachusetts Institute of Technology, Project Report*, 2008, and Fregene et al., "Dynamics and control of a biomimetic single-wing nano air vehicle," in *Proc. of the 2010 American Control Conf.* IEEE, 2010, pp. 51-56, have also adopted this sinusoidal control strategy. dSAW's flap pitch angle is not mechanically limited by a swash plate, and this allows exploring other waveforms for its actuation.

Figure 9A:
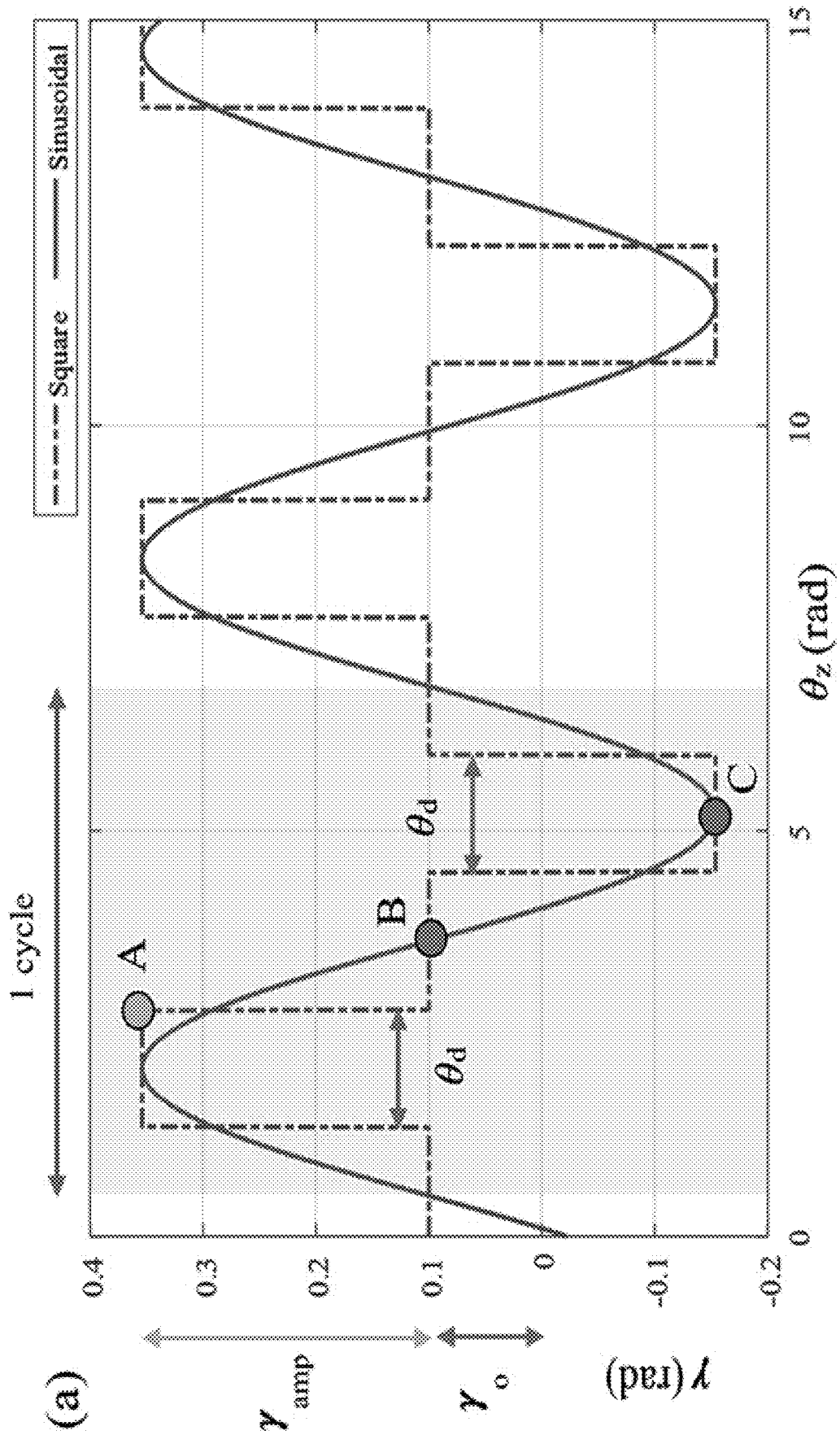
FIG. 9A illustrates a square cyclic control according to various example embodiments compared to traditional sinusoidal cyclic control.
Figure 9B:
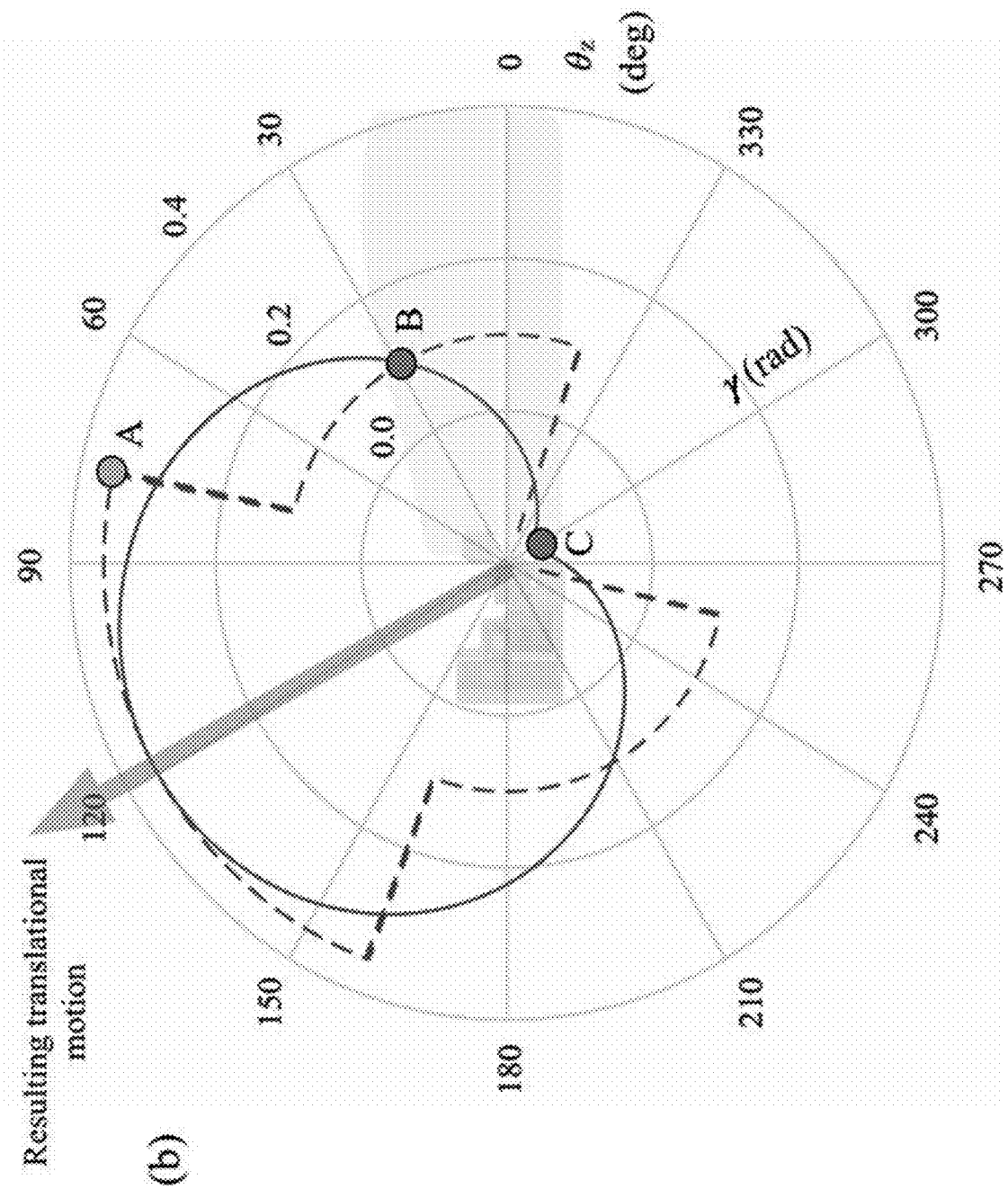
FIG. 9B illustrates a polar plot of flap pitch angle for better visualization of the square cyclic control and sinusoidal control.

In various example embodiment, square waves for cyclic actuation of the flap, as shown in FIG. 9A, may be used. More particularly, FIG. 9A illustrates the square cyclic control according to various example embodiments compared to traditional sinusoidal cyclic control. With such control, various embodiments take advantage of the servo's rapid actuation speed, requiring the servo to aggressively switch between maximum, neutral and minimum actuation angles. Unlike monocopters whose rotation is driven by a thrust unit, dSAW derives its rotational energy from the process of autorotation, which requires the flap angle to be close to its optimum angle $\gamma_a$. The benefit of the proposed square cyclic control is that it allows flap pitch angle to remain close to $\gamma_a$ (point B in FIG. 9B) throughout a major portion of each revolution, and switch to maximum and minimum in the most effective regions. More particularly, FIG. 9B illustrates a polar plot of flap pitch angle for better visualization of the square cyclic control and sinusoidal control as dSAW's azimuth angle $\theta_z$ changes.

The proposed control scheme can simply be defined as follows:

$$\gamma = \begin{cases} \gamma_o + \gamma_{amp}, & \text{if } \sin(\theta_z + \lambda_c) > \epsilon \\ \gamma_o - \gamma_{amp}, & \text{if } \sin(\theta_z + \lambda_c) < -\epsilon \\ \gamma_o, & \text{otherwise} \end{cases} \quad \text{Equation (11)}$$

where $\gamma$ is the flap pitch angle, $\gamma_o$ is the offset or neutral point of the cyclic control, $\gamma_{amp}$ is the cyclic amplitude, $\theta_z$ is the current azimuth angle, $\lambda_c$ is the direction control input from human controller, and $\epsilon$ is the threshold that controls the duty cycle $\theta_d$ of the square wave. A traditional sinusoidal cyclic control can be defined as follows:

$$\gamma = \gamma_o + \gamma_{amp} \sin(\theta_z + \lambda_c) \quad \text{Equation (12)}$$

In order to illustrate the control strategy better, a polar plot is shown in FIG. 9B. In the polar plot shown in FIG. 9B, the radius of the plot represents the flap pitch angle $\gamma$ as the craft (corresponding to the autorotating aerial device described hereinbefore) goes through one complete rotation. In this plot, it is assumed that effects of gyroscopic precession are absent since the craft is rotating at relatively slow speed such as 6 Hz. Therefore, the resulting direction of motion is assumed to be at the center of the region where the flap generates the least lift when it is flapping up.

Next, the optimized parameters for the square cyclic control may be determined using genetic algorithm. The following describes the formulation briefly.

The control variables are expressed in a single concatenated vector $\Gamma_c=[\gamma_o, \epsilon, \gamma_{amp}]^T$ which are all real numbers. These variables are bounded between values shown in Table 2.

TABLE 2

Table of Control Variables

| Parameter | Lower Bound | Upper Bound |
|---|---|---|
| $\gamma_o$ | 0 | 0.175 |
| $\epsilon$ | 0.01 | 0.99 |
| $\gamma_{amp}$ | 0 | 0.175 |

The main objective function also comprises some sub-objective functions: $G_1$, $G_2$ and $G_3$. $G_1$ is the objective function for average rotation speed after control is applied, which can be defined as follows:

$$G_1 = \left( \frac{\sum_{i=n_3}^{n_4} \Omega_Z(t_i)}{n_4 - n_3} - 44.0 \right)^2 \quad \text{Equation (13)}$$

where 44.4 rad/s is the rotation speed at 7 Hz. From example experiments, it is found that although $\gamma_a$ is an angle optimized for stable autorotation, it produces slightly steeper coning angle and rotates too slow for good control. Hence, the target rotation speed during control is increased by 1 Hz. $n_3$ denotes the step in the simulation when control is first applied and $n_4$ denotes the end of the simulation. Next is $G_2$ which is the penalty function for unwanted oscillations after control is applied, which is defined as follows:

$$G_2 = \frac{\sum_{i=n_3}^{n_4} (\Omega_X(t_i)^2 + \Omega_Y(t_i)^2)}{n_4 - n_3} \quad \text{Equation (14)}$$

$G_3$ is the function for glide angle. In various example embodiment, it is formulated such that it is lateral distance traveled over distance dropped. It is a value that should be maximized, hence assigned as a negative value which must be minimized, as follows:

$$G_3 = \frac{\sqrt{(d_X(t_{s2}) - d_X(t_{f2}))^2 + (d_Y(t_{s2}) - d_Y(t_{f2}))^2}}{\text{abs}(d_Z(t_{s2}) - d_Z(t_{f2}))} \quad \text{Equation (15)}$$

where $d_Z$ is the distance along Z-axis with respect to the origin in the world frame. $t_{s2}$ and $t_{f2}$ denote the starting time when control is applied and final time of the simulation, respectively. The combined optimization formulation for control is summarized as follows:

$$\min_{\Gamma_c} \beta_1 G_1 + \beta_2 G_2 + \beta_3 G_3 \qquad \text{Equation (16)}$$

Where $\beta_1$, $\beta_2$ and $\beta_3$ are weightage coefficients of each sub-objective function. Similar to design parameter optimization, the weighted sum includes considerations for non-dimensionalizing and bringing the sub-objectives to similar magnitude, while higher priority is given to $G_3$ (lower glide angle). The result of this optimization is given in Table 3, as illustrated in FIG. 10.

Simulation

In the following, simulation results for autorotation with optimized parameters is discussed. Comparison between square cyclic control and sinusoidal cyclic control is also shown.

Simulation With Optimized Parameters

In various example simulation, when building the model for simulation within MATLAB Simulink, the 3D-printed body (or housing member) and electronic components were drawn first in SolidWorks and their basic geometries were imported into MATLAB. The leading edge and the flap are box-shaped geometry with assigned densities. Estimated component masses were assigned to each imported geometry within the Simulink environment where the moment of inertia and the center of gravity were internally calculated.

Figure 11:
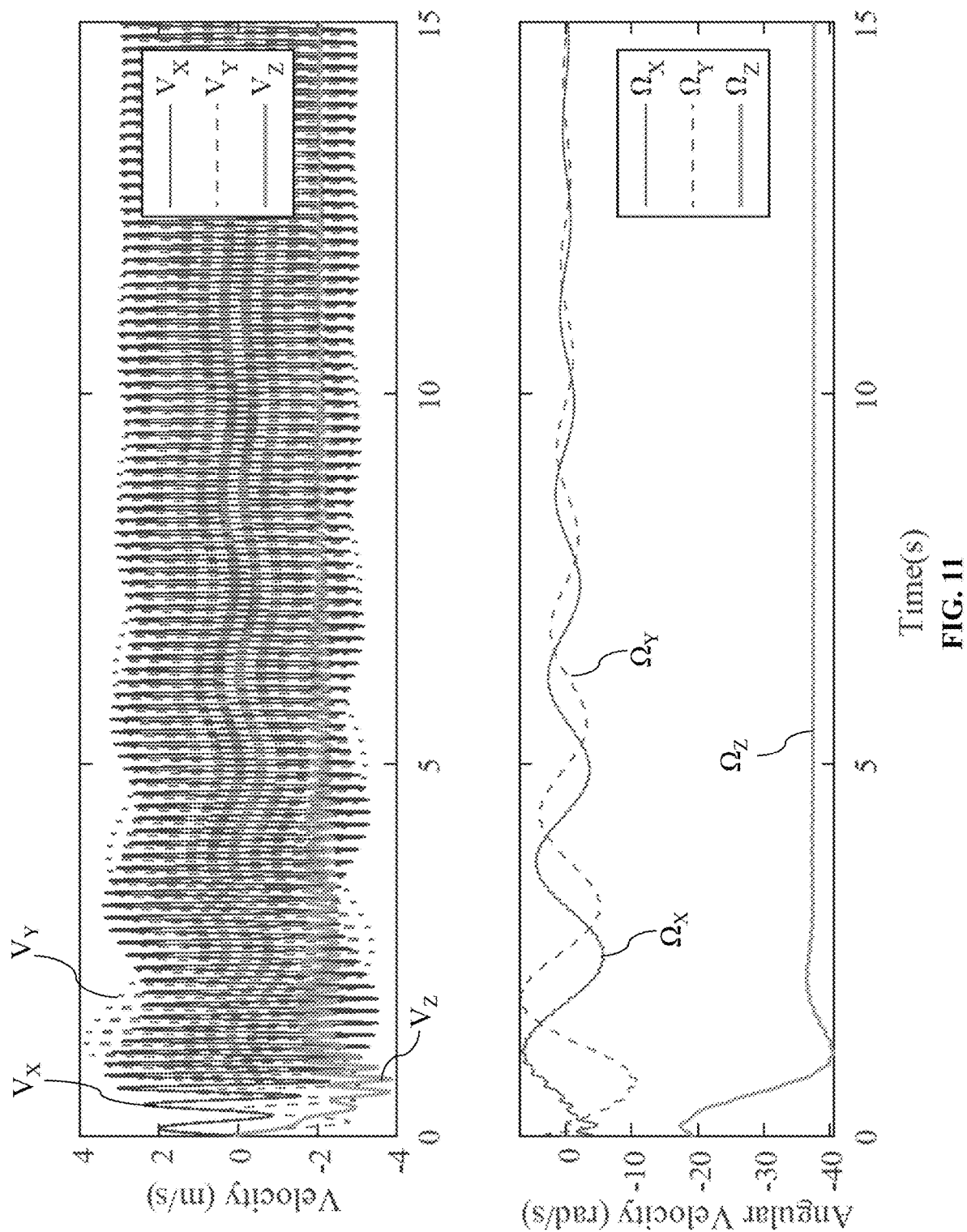
FIG. 11 illustrates simulation results showing linear and angular velocities of the autorotating aerial device with optimized design variables according to various example embodiments.

The dSAW model according to example embodiments with optimized design variables $\Gamma$ has rotation speed $\Omega_Z$ of about −37.6 rad/s and drop speed $V_Z$ of about −2.06 m/s. From its given initial condition, dSAW was able to enter stable autorotation within two seconds, with quickly decaying oscillations in $\Omega_X$ and $\Omega_Y$, as shown in FIG. 11. More particularly, FIG. 11 illustrates simulation results showing linear and angular velocities of dSAW with optimized design variables $\Gamma$. It is simulated to be released with initial conditions $V_Z=0$ m/s and $\Omega_Z=-18.8$ rad/s. The plot shows oscillating values of $V_X$ and $V_Y$ due to the body frame not being placed at the center of rotation.

Simulation of Control

Figure 12:
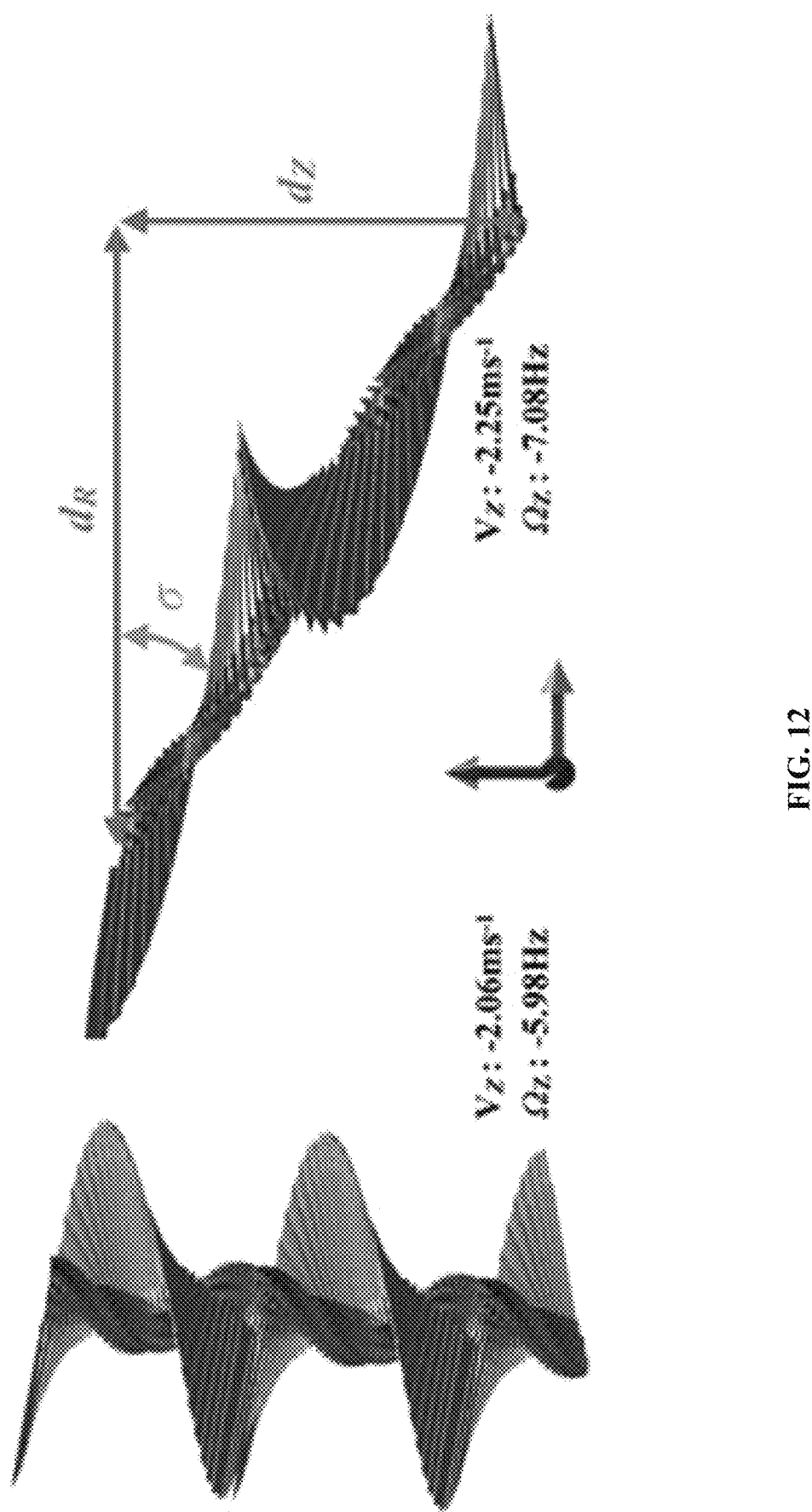
FIG. 12 illustrates autorotation sequence of the autorotating aerial device model in simulation for normal autorotation and direction controlled autorotation according to various example embodiments.
Figure 13A:
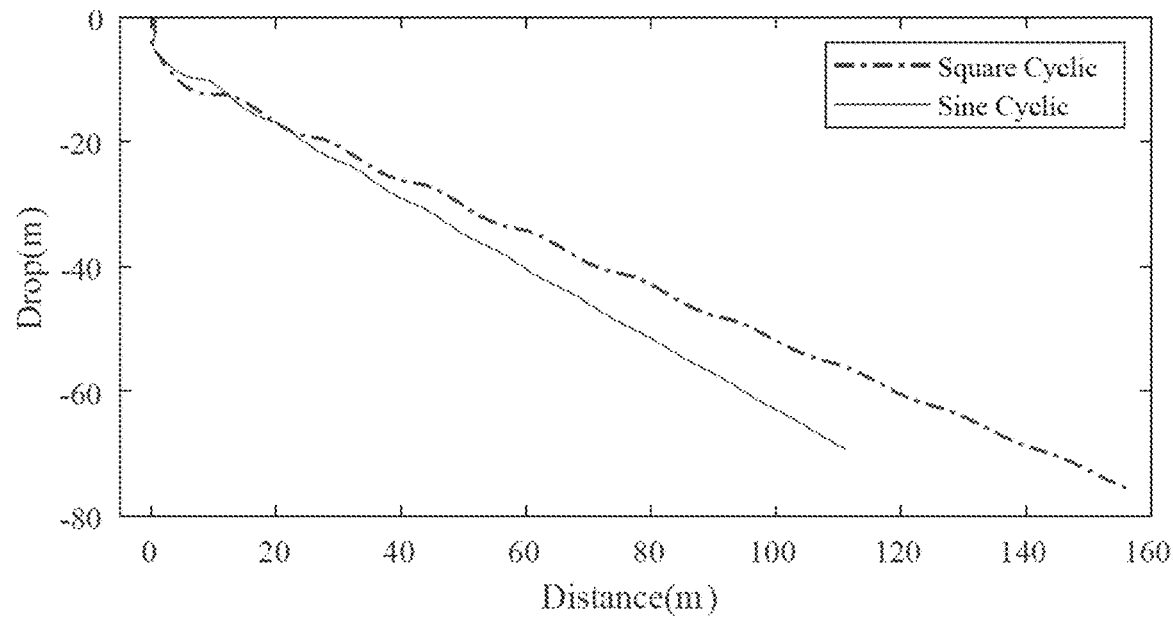
FIGS. 13A-13C show a comparison between various translational and angular velocities of square cyclic and sinusoidal cyclic control according to various example embodiments.
Figure 13B:
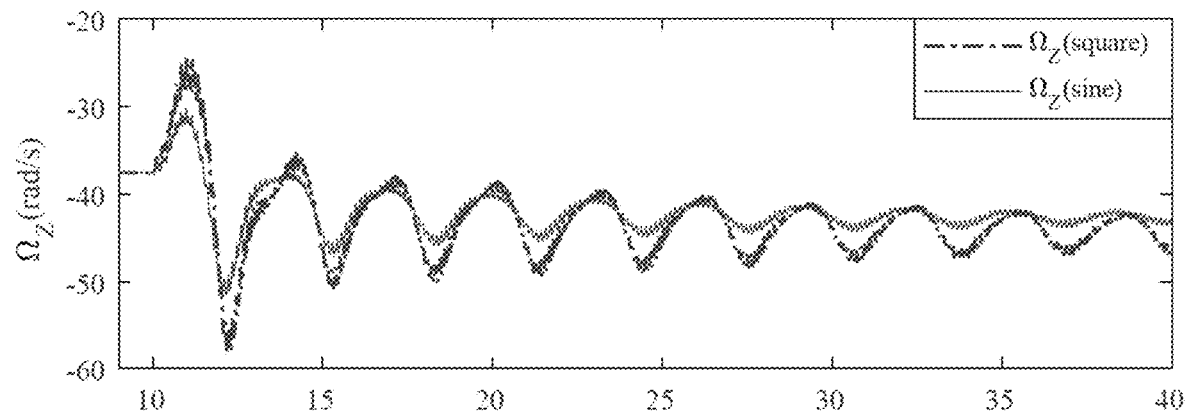
Figure 13C:
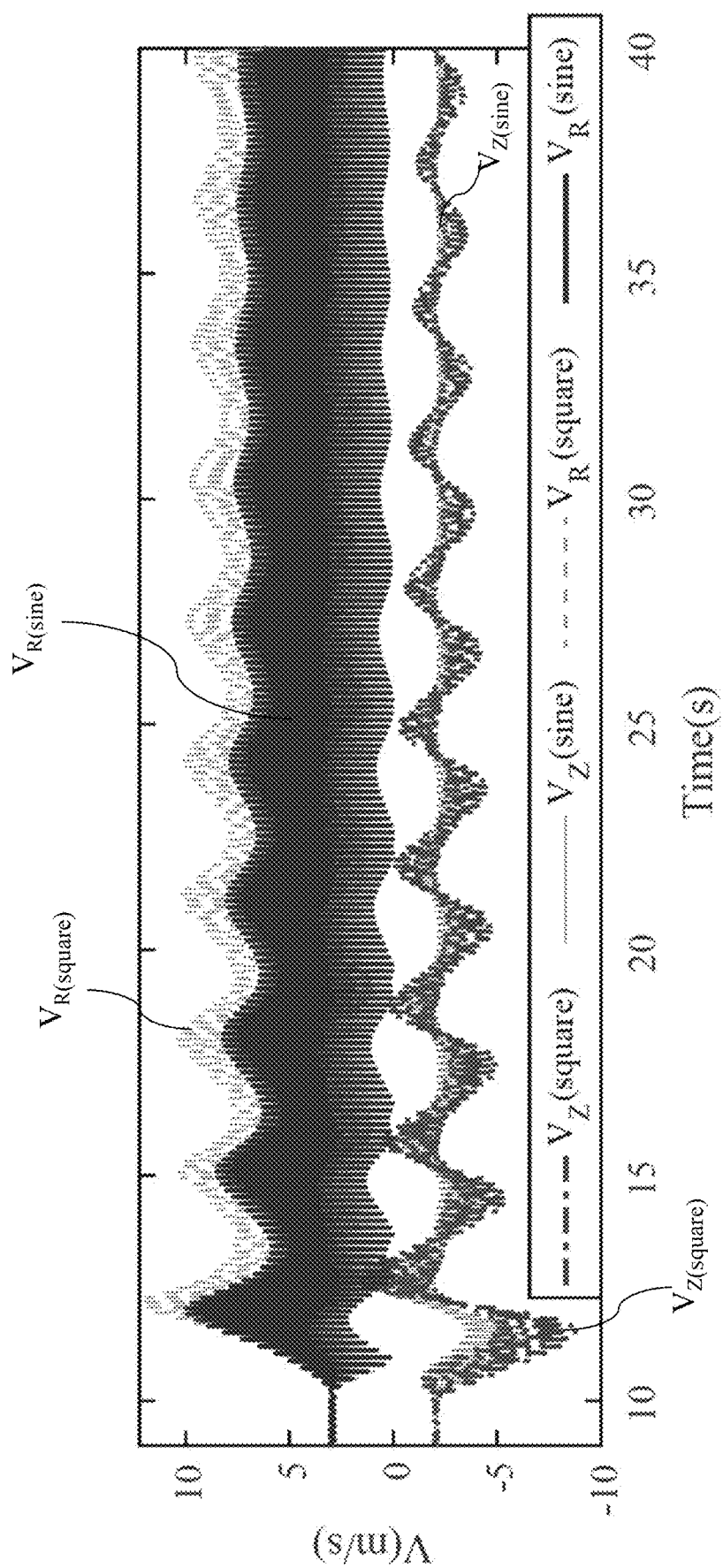

The optimized values of $\gamma_o$, $\epsilon$, $\gamma_{amp}$ were used for the proposed square cyclic control described in Equation (11) which was applied to the model at simulation time $t_{s2}$ of about 10 s. The same $\gamma_o$ and $\gamma_{amp}$ were used for the traditional sinusoidal cyclic control described in Equation (12), starting at the same time $t_{s2}$ of about 10 s. The two resulting trajectories are shown in FIGS. 13A-13C for comparison. Glide angle $\sigma$ (as shown in FIG. 12) is defined by $$\sigma = \tan^{-1} \frac{d_Z}{d_R}$$

where $d_Z$ is the vertical distance dropped and $d_R$ is the horizontal distance traveled. More particularly, FIG. 12 illustrates autorotation sequence of dSAW model in simulation for normal autorotation (left) and direction controlled autorotation (right). Each frame is captured 0.005 s apart. The definition of glide angle $\sigma$ is also shown. It can be seen that the proposed control scheme produced a better glide angle and traveled a further distance within the same simulated period. Decaying oscillations can be observed on $\Omega_Z$, $V_Z$ and $V_R$ plots (with bigger oscillations for square cyclic control). Increasing $\gamma_{amp}$ beyond its optimum value results in disruption of autorotation of the platform in both simulation and experiments. This indicates that the optimum parameters were pushing the platform to its maximum capability, close to making it unstable. FIGS. 13A-13C show a comparison between various translational and angular velocities of the two controls. More particularly, FIGS. 13A-13C show comparison of drop trajectory, $\Omega_Z$, $V_Z$ and $V_R$ (9 s to 40 s) under square cyclic and sinusoidal cyclic control, applied 10 s after dSAW is simulated to drop. Glide angle of square cyclic is 0.4716 rad (27.0°) and that of sine cyclic is 0.6086 rad (34.9°). It can be seen that square cyclic control created oscillations of higher amplitude, but it had higher average $\Omega_Z$ and horizontal velocity $V_R$ while having similar drop speed $V_Z$ to sinusoidal cyclic control.

Experimental Investigation

Two types of experiments were conducted: a) semi-outdoor drop from 30 m and b) outdoor deployments from fixed-wing UAV. The purpose of the semi-outdoor experiments is to repeatedly test control maneuvers in A-Mode in low wind condition and user-commanded transitions between A-Mode and D-Mode. Outdoor deployments from fixed-wing UAV demonstrates the use case of dSAW in real-life missions.

In various example experiments, building of the autorotating aerial device (e.g., dSAW) started with the selection of its single actuator. Table IV shows a comparison of multiple servos.

TABLE 4

Servo Comparison

| | Range ($R_s$) (degrees) | Speed ($\omega_s$) (deg/s) @4.8 V | Weight ($m_s$) (grams) | S |
|---|---|---|---|---|
| BA D03013 | 125 ($\Theta_1$) | 857 ($\Theta_2$) | 3.0 ($\Theta_3$) | 0 |
| MKS DS480 | 149 | 882 | 9.5 | 4.4 |
| MKS DS95i | 115 | 1277 | 21.2 | 0.4 |
| HK-5330 | 112 | 1200 | 1.9 | 0.9 |

$\Theta = 135°$,
$S_1 = 0.2$,
$S_2 = 0.01$,
$S_3 = 0.1$

Figure 14A:
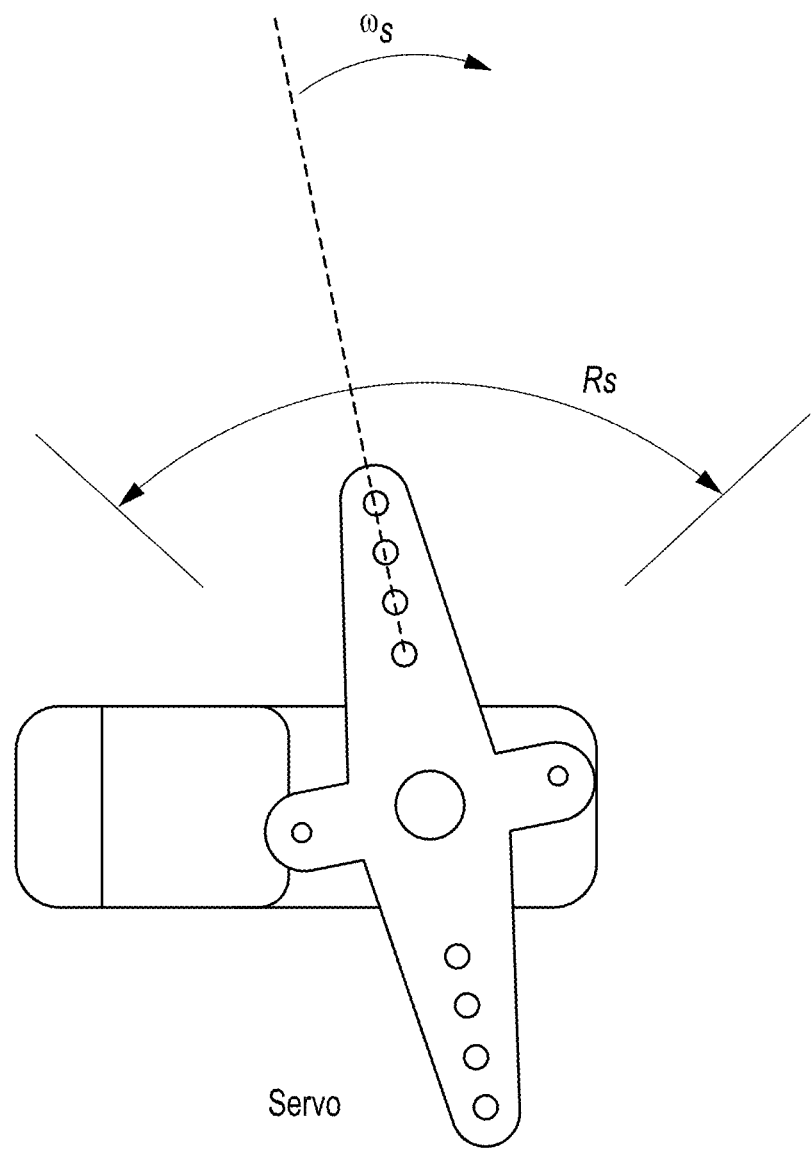
FIG. 14A illustrates the definition of servo selection criteria according to various example embodiments.
Figure 14B:
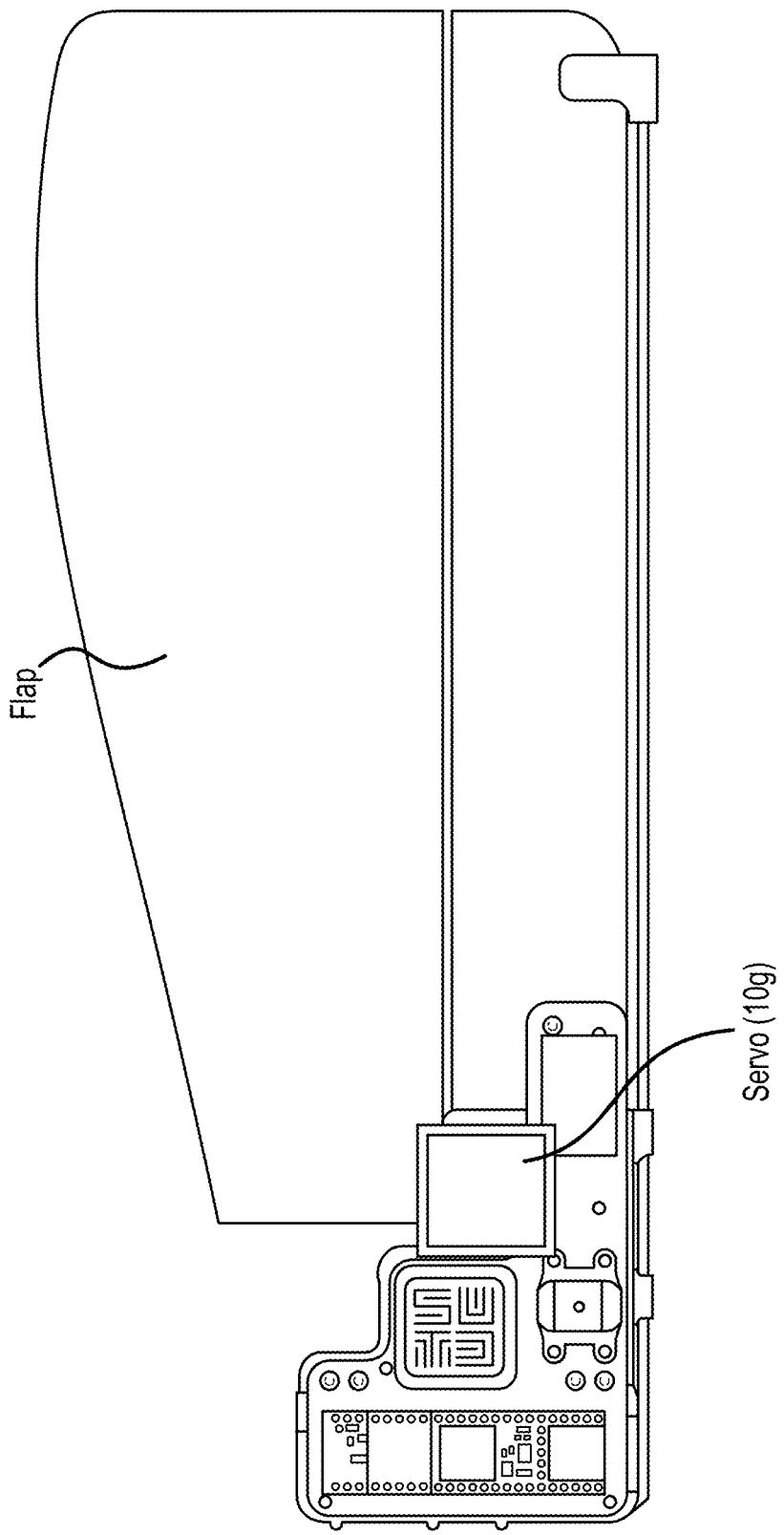
FIGS. 14B-14C illustrate the autorotating aerial device according to various example embodiments.

In order to obtain a good glide angle and agile motion such as diving, a servo needs to have a) a good range of actuation $R_s$, b) fast actuation speed $\omega_s$ and c) light weight $m_s$. FIG. 14A illustrates the definition of servo selection criteria. The criteria may be summarized as a selection non-dimensional score S which may be defined as follows:

$$S = S_1(R_s - \Theta_1) + S_2(\omega_s - \Theta_2) + S_3(\Theta_3 - m_s) \qquad \text{(Equation 17)}$$

where $S_1$, $S_2$ and $S_3$ are coefficients, selected such that all variables have the same order of magnitude, identified in Table 4. BA D03013 was previously used for SAW+ and is used as a reference servo for comparison. Coefficient $S_1$ is set slightly higher because for dSAW to enter D-Mode, having high $R_S$ is considered most important. MKS DS480 scored the highest S and is used on dSAW according to various example embodiments.

Figure 14C:
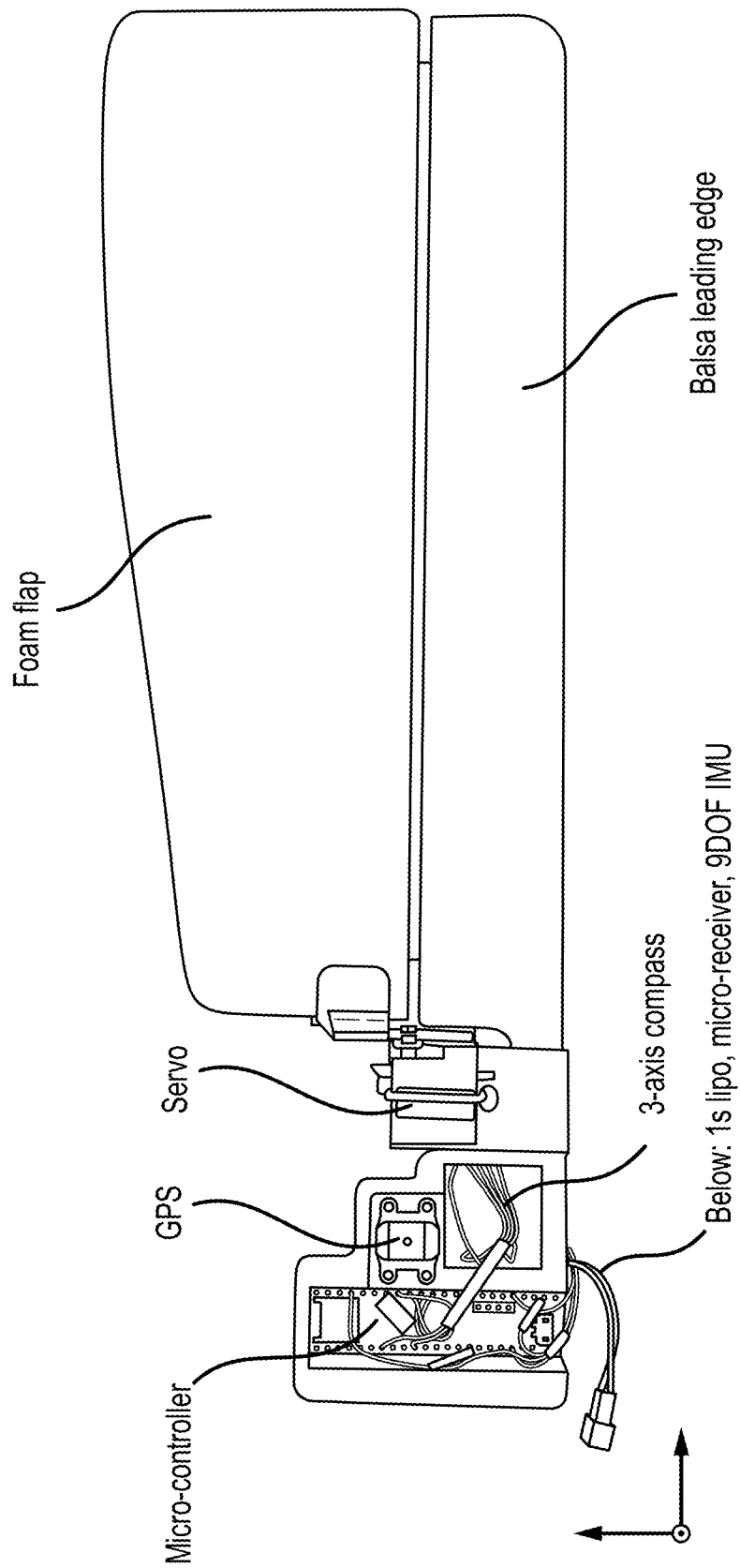

The dSAW according to various example embodiments, shown in FIG. 14C, comprises a seed-like portion (corresponding to the housing member), which is a 3D-printed part (e.g., Markforged Onyx). It houses a micro-controller (e.g., Teensy 3.5), a 3-axis magnetometer (PNI RM3100), a GPS (OriginGPS ORG1510), a 9 DOF IMU (EM7180 SENtral), a micro-receiver (FrSky), a 5V regulator (Pololu), a 1 s 260 mAh lithium-polymer battery (BetaFPV) and a servo (MKS DS480). The leading edge portion of the wing (e.g., laser-cut 2.5 mm balsa) is slotted in and attached using wing tape to a 2.5 mm carbon rod which extends from the seed portion. The flap (e.g., laser-cut 2.5 mm foam) is attached to the leading edge using wing tape and is also held in place by the servo horn attachment. Overall, the device weighs just 58 g, which is 34% lighter than the previous generation SAW+ as described in Win et al., "Dynamics and control of a collaborative and separating descent of samara autorotating wings," IEEE Robotics and Automation Letters, vol. 4, no. 3, pp. 3067-3074, 2019. The weight savings are achieved by the absence of Pixracer and its GPS (which was only used for logging IMU data and GPS data) and the use of lighter material for flap. For example, dSAW may be configured to perform the same datalogging function using its microcontroller (Teensy 3.5) and GPS (OriginGPS ORG1510).

Three similar prototypes were made with this design and are named as 'N' and 'P'.

Experiment Setup

Figure 15A:
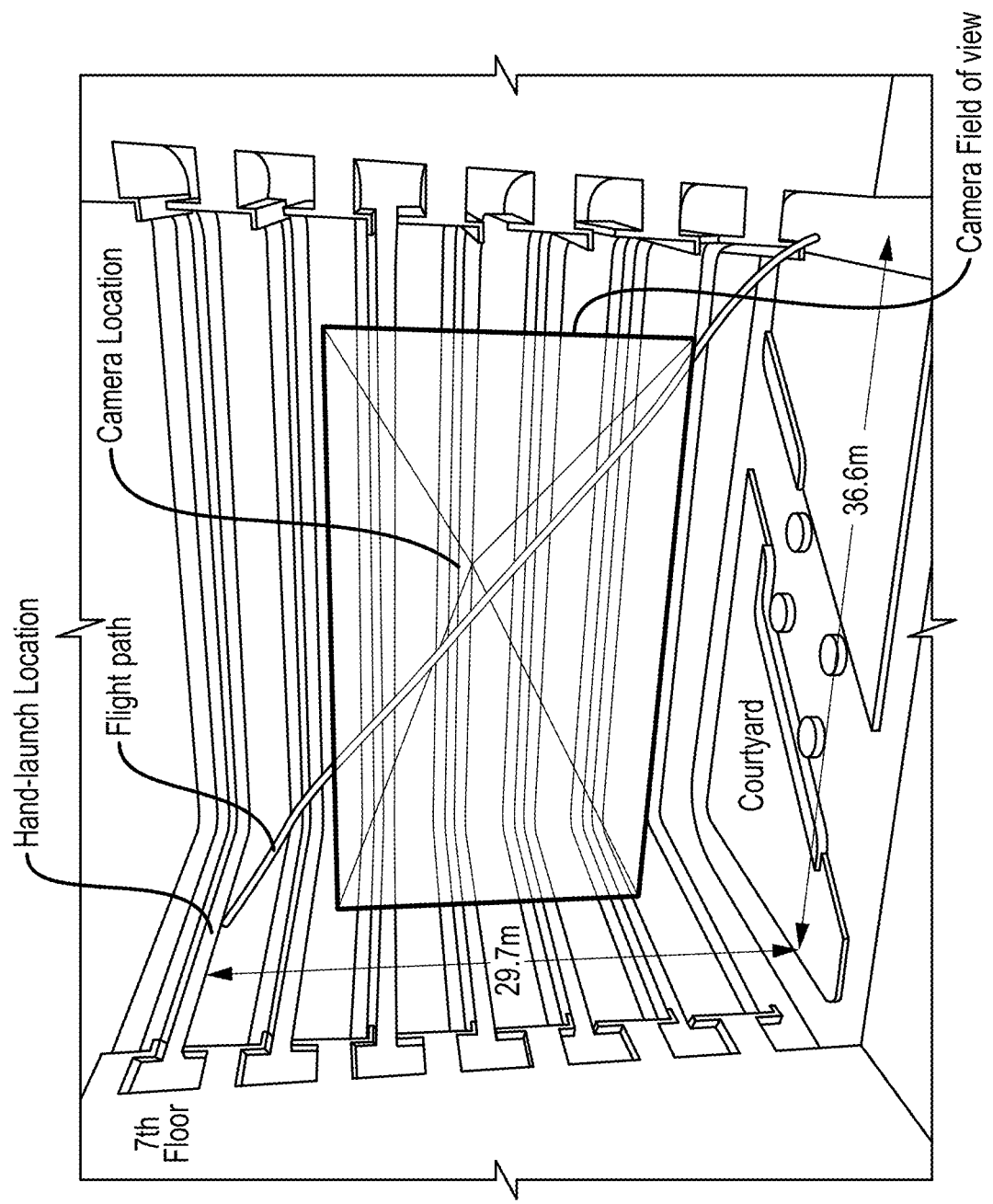
FIG. 15A shows a depiction of the semi-indoor experiment setup according to various example embodiments.

The semi-indoor drop tests involved hand throwing or launching of dSAW devices from the 7th floor of SUTD Building 2 towards the courtyard on the ground floor, as shown in FIG. 15A. This is about 30 m of drop height. More particularly, FIG. 15A shows a depiction of the semi-indoor experiment setup. dSAW devices were dropped from 7th floor towards the courtyard on 1st floor. Since the building surrounds the whole drop region, wind is assumed to be absent. A camera captured the flight path from an orthogonal view. On the 4th floor, a Nikon P1000 camera was placed on a tripod to take high quality zoomed-in pictures of dSAW to record its minimum glide angle and the flight transitions in subsequent experiments. Because the experiment setup was semi-indoors, GPS coverage was minimum.

Figure 15B:
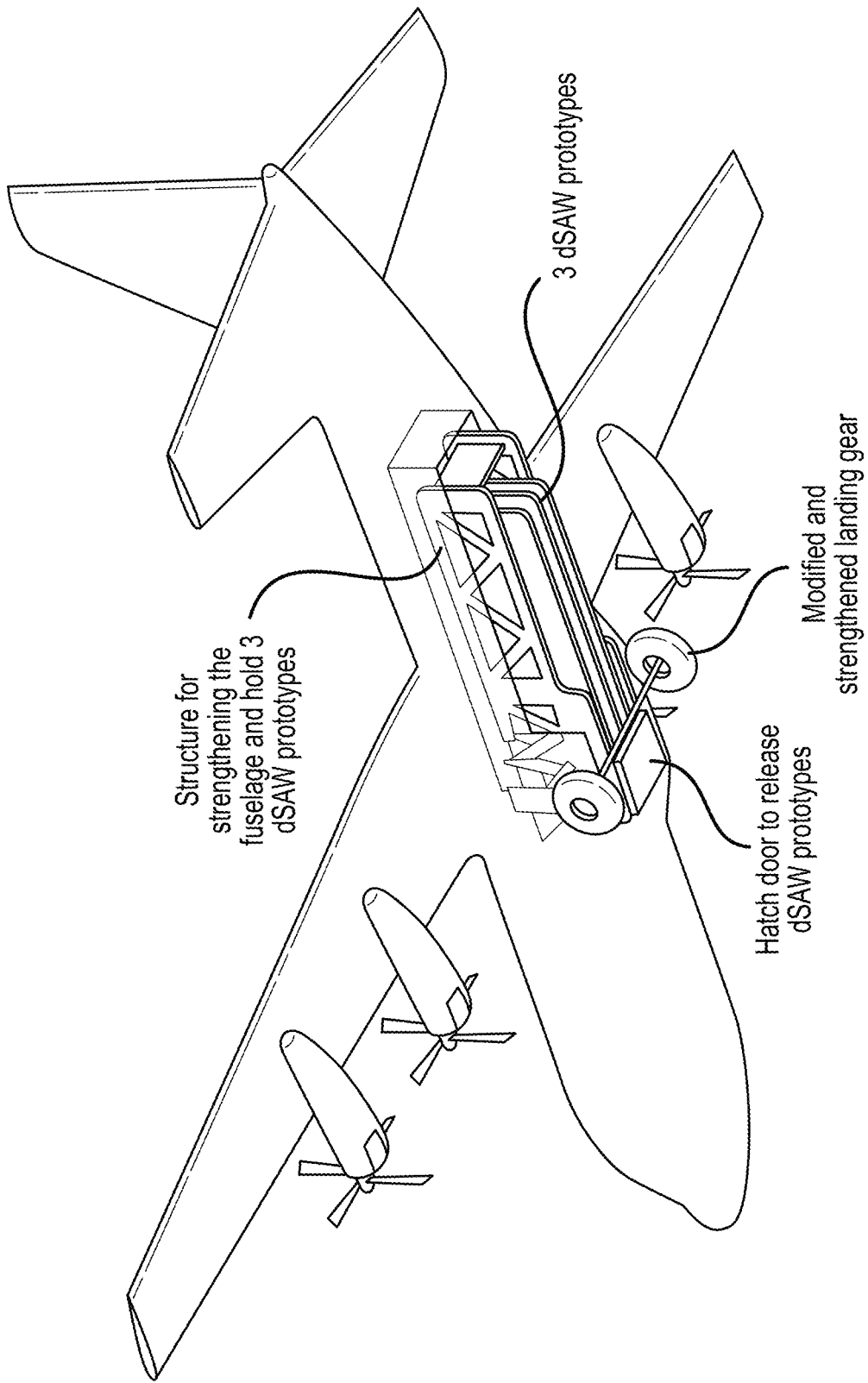
FIG. 15B shows a model aircraft modified to carry and deploy the autorotating aerial device according to various example embodiments.

For the outdoor deployment, a model aircraft (e.g., Avios C-130) was modified as a carrier aircraft. It has a length of 1195 mm, a wingspan of 1600 mm and a take-off weight of about 2400 g. It uses four 1000 kV brushless motors for its propulsion. Its fuselage is just wide enough to house three dSAW devices and a release mechanism. The aircraft's fuselage was cut open and a new structure to hold and release dSAW devices was added, as shown in FIG. 15B. More particularly, FIG. 15B shows a model aircraft C130 was modified to carry and deploy three dSAW devices (e.g., the experimental prototypes 'M', 'N' and 'P'). The model aircraft's original retractable landing gear mechanism and operational hatch door were removed to save weight. A Pixracer with PX4 firmware was installed on the aircraft to aid with flight controls. The aircraft was always flown manually in according to various experiments.

Semi-Outdoor Drop

Three different experiments were conducted for semi-outdoor drop (e.g., from 30 m) within the university campus.

Transition between Modes

Figure 17A:
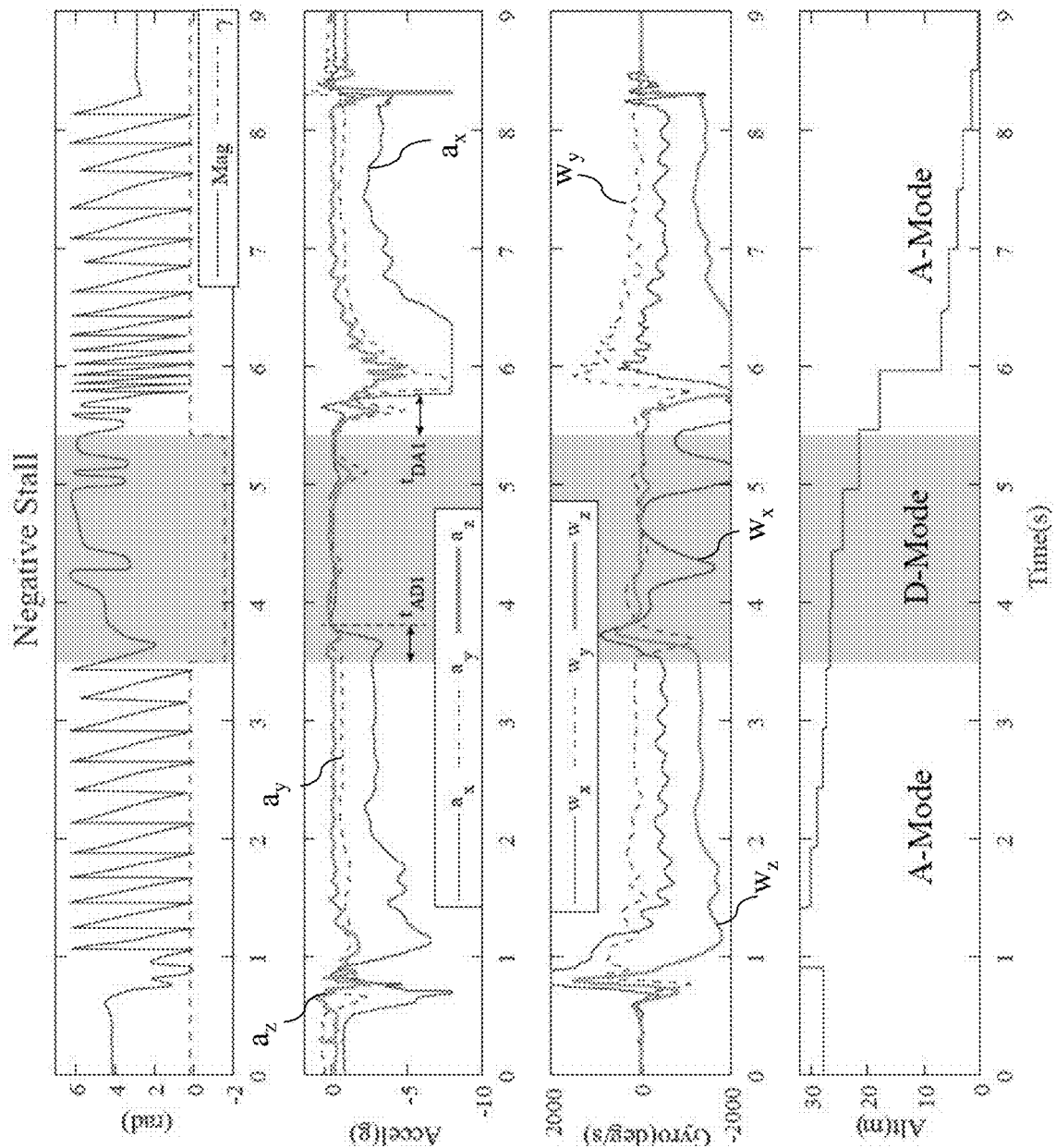
FIGS. 17A-17B illustrate magnetometer, accelerometer, gyroscope and barometer data for transition between the diving mode of operation and the autorotating mode of operation according to various example embodiments.
Figure 17B:
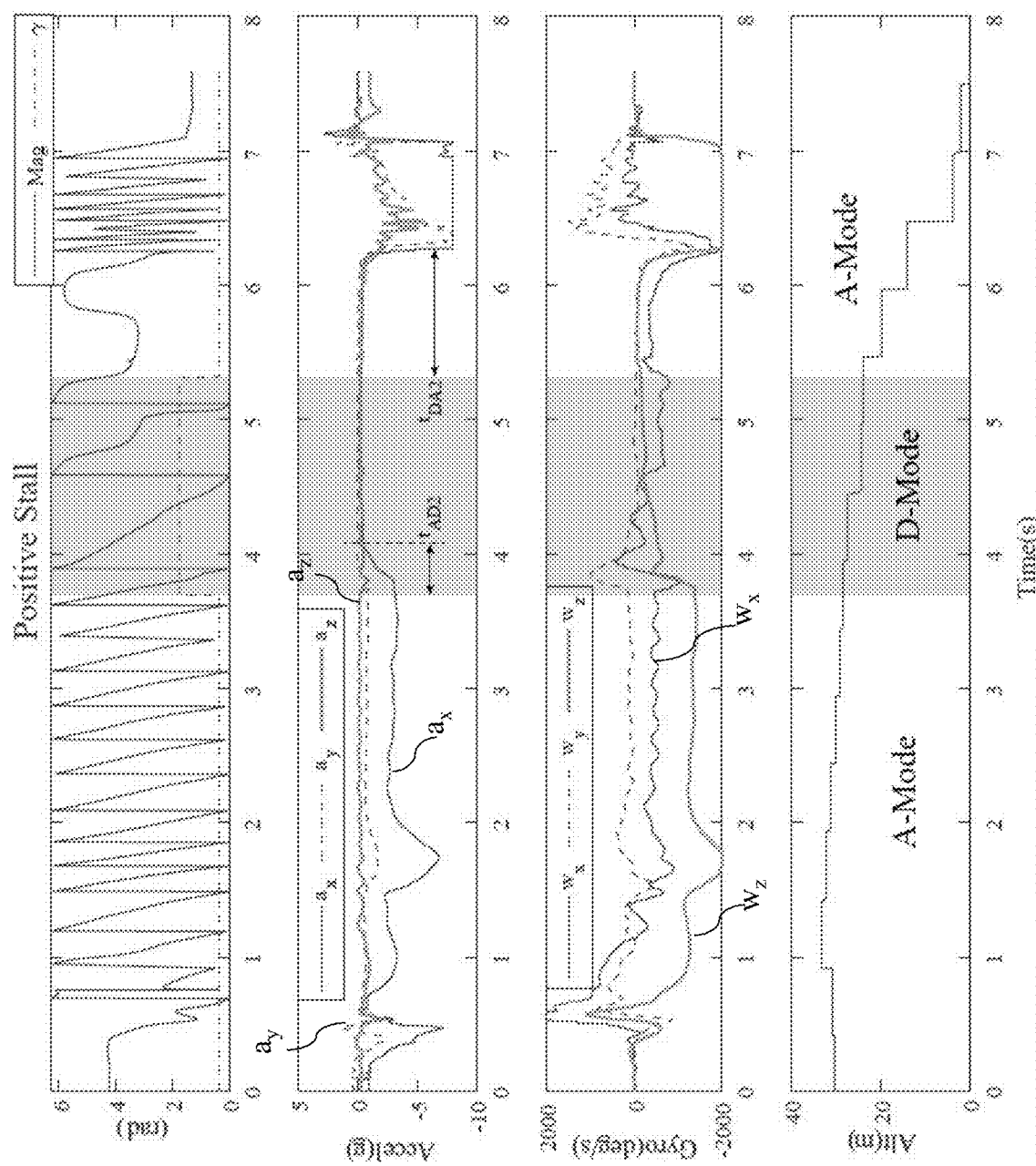

The transitions between flight modes (A-Mode and D-Mode) as described were tested and observed. The flap angle was manually commanded to switched from $\gamma_a$ to $\gamma_{d-}$ (negative stall) or $\gamma_{d+}$ (positive stall) and back to $\gamma_a$ within the 30 m drop. The resulting transitions were captured from Nikon P1000 camera with zoom applied, as shown in FIG. 16. More particularly, FIG. 16 illustrates the two transitions for negative stall ($\gamma_d$ used for D-Mode). Each frame was captured 0.1 s apart. The notable parameters for these transitions for both cases are plotted in FIGS. 17A-17B where the highlighted region for D-Mode is defined with respect to flap angle $\gamma$. More particularly, FIGS. 17A-17B illustrate magnetometer, accelerometer, gyroscope and barometer data for transition from A-Mode to D-Mode (negative stall and positive stall), then back to A-Mode within 30 m drop. $t_{AD1}$=250 ms, $t_{DA1}$=341 ms, $t_{AD2}$=355 ms, $t_{DA2}$=950 ms. It was observed that for A-to-D transition, the change was almost instantaneous and dSAW achieved its dive pose in just half a rotation ($t_{AD1}$=250 ms) for negative stall. For positive stall, the transition was slightly more gentle and took slightly longer ($t_{AD2}$=355 ms). The flight path remained relatively vertical for both A-to-D transitions. For D-to-A transition, the delay was usually slightly longer ($t_{DA1}$=341 ms and $t_{DA2}$=950 ms). $t_{DA2}$ was recorded to be higher, but D-to-A transitions for either case may vary in duration depending on environmental conditions. The delay in D-to-A transition exhibits itself also in the altitude plots in both FIGS. 17A-17B and FIG. 23, where altitude was still decreasing rapidly after the transition was triggered. This indicates that dSAW had not reached its terminal velocity during its dive in all the tests. It should also be noted that the barometer was updating every 500 ms making the delay effect more pronounced.

At the instance of D-to-A transition, dSAW spun very fast (12.35 Hz) and experienced peak acceleration in x and y-axes due to large centrifugal forces at the location of the IMU. The values peak beyond 8 g for a short period. The maximum range for the accelerometer and gyroscope are 8 g and 2000 deg/s respectively in each axis.

Glide Angle Measurement

Figure 18:
FIG. 18 illustrates autorotating aerial devices dropped and square cyclic control was applied shorty after according to various example embodiments.

The dSAW prototype was launched using a hand motion intended to assist entering autorotation immediately. This involved holding the prototype from above its center of gravity and giving it a clockwise rotation while releasing it. The intention was to let it enter its full autorotation before much height was lost. Once it was in full autorotation, a manual RC command triggered the square cyclic control, from Equation (11) using optimized parameters, to steer dSAW in a direction orthogonal to the camera. From about 15 m above ground, a Nikon P1000 camera captured a video of its trajectory. From the video, frames were extracted and the glide angle of dSAW was measured visually. The average glide angle was 0.5044 rad (28.9°), as shown in FIG. 18. During cyclic flap actuation, dSAW rotated at 4.46 Hz and dropped at about 1.04 m/s. More particularly, FIG. 18 illustrates dSAW devices were dropped by hand and square cyclic control was applied shorty after. Still frames of dSAW were extracted and displayed in sequence to show its pose. An average glide angle 0.5044 rad (28.9°) was achieved. Lower right corner shows a close up of Drop 3. Each frame was captured 0.25 s apart, hence dSAW had rotated slightly more than one rotation between each frame.

Similar experiments were conducted with sinusoidal cyclic control using the same parameters. An average glide angle of about 0.6817 rad (39.1°) was obtained. The square cyclic control was seen to perform better than the sinusoidal cyclic control in both the simulation and the experiment.

Flight Envelope

Figure 19:
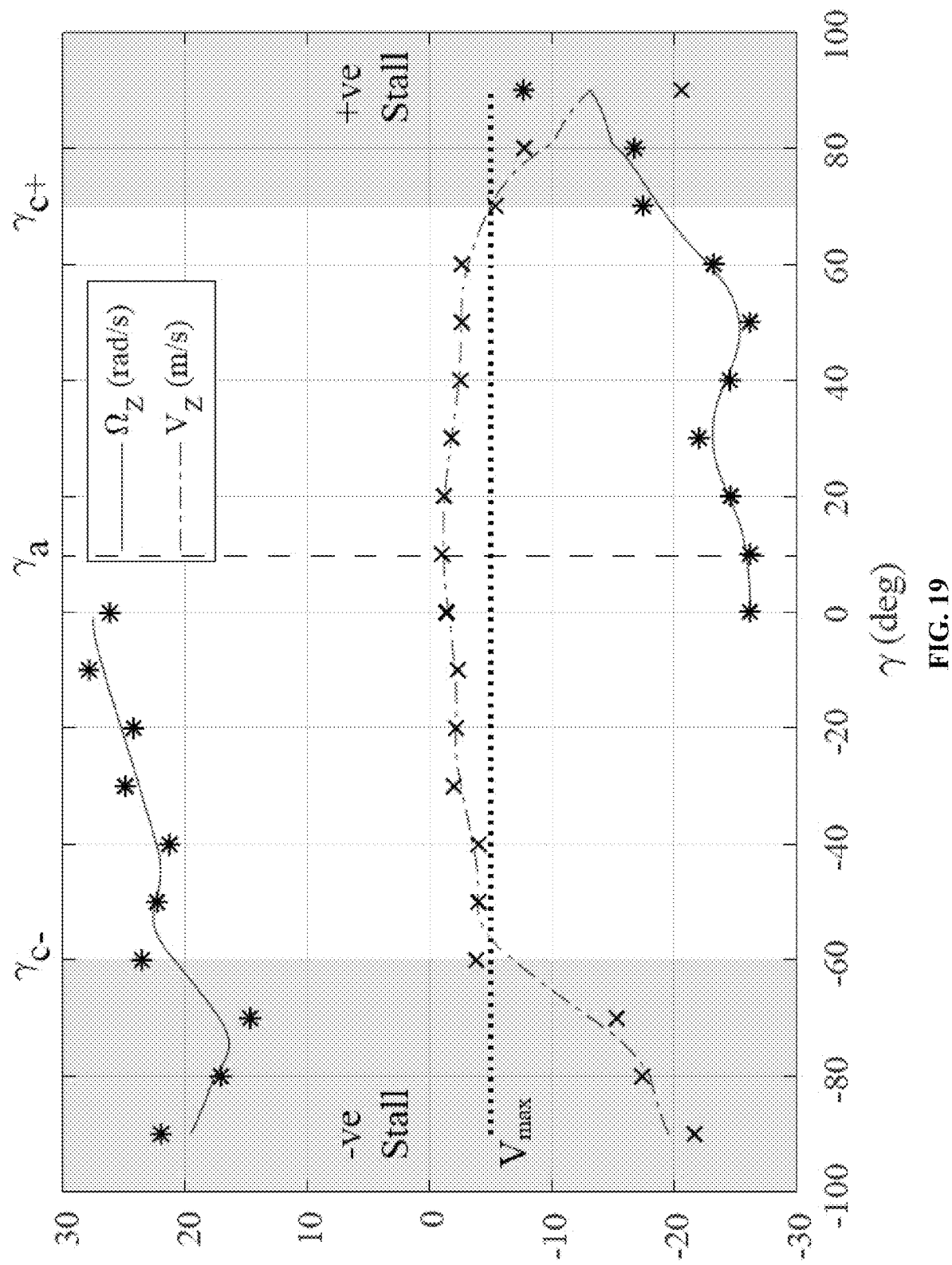
FIG. 19 illustrates the flight envelope of the autorotating aerial device and the definition of the stall region according to various example embodiments.

To investigate flight behavior of dSAW for different range of flap angles described in FIG. 8, the device was dropped repeatedly from 30 m with each time $\gamma$ set to angles from −90° to 90°, at intervals of 10°. This experiment was repeated 3 times and the average values of final rotation speed $\Omega_Z$ and drop speed $V_Z$ were recorded. The values are plotted in FIG. 19. More particularly, FIG. 19 illustrates the flight envelope of dSAW, and the definition of the stall region. dSAW tends to rotate clockwise for +$\gamma$ and counter-clockwise for −$\gamma$. However, for −10°<$\gamma$<10°, the direction of rotation became less certain as it was more likely to be influenced by factors such as initial conditions, hand launch variations or gusts of wind.

From the graph, it can be observed that the flight dynamics of dSAW are not very symmetric about positive and negative $\gamma$ values. This is expected since the design of dSAW is not symmetric. $V_Z$ values tend to increase aggressively on negative γ. It can also be observed that $V_Z$ value is smallest at around γ=10°, aligning with $γ_a$ from the optimized result according to various embodiments. It should be noted that the steady state $V_Z$ and $Ω_Z$ for γ=±90 could not be measured within the drop height of 30 m.

The maximum drop velocity for autorotation, $V_{max}$ may be defined to be −5 m/s, as it can be seen that $V_Z$ values increase sharply after this point. dSAW can be considered stalling when $V_Z$ is beyond $V_{max}$ as its wing is unable to produce useful aerodynamic forces. Hence the critical flap angles are $γ_{c-}$=−60° and $γ_{c+}$=70° according to various example embodiments.

As the $R_s$ of the servo is 149°, the flap actuation region of dSAW was set at −90°<γ<59°, taking advantage of aggressive diving speeds for large negative γ values while cyclic actuation happens at small positive γ values.

It was observed that dSAW with the flap at $γ_a$ rotated at about 4.17 Hz and dropped at about 1.43 m/s. With flap set at $γ_{d+}$, the fastest drop speed measured during outdoor experiments was 25.16 m/s, which is 17.6 times A-Mode's drop speed. However, this measured speed is not yet its steady state dive speed (terminal velocity), which we were unable to obtain due to height limitations of UAV flight.

Outdoor Deployments from Fixed-Wing UAV

The purpose of this experiment was to simulate real-life deployment of dSAW devices. In an actual deployment, dSAW may be carried by a multi-rotor or fixed-wing UAV or even an actual aircraft. In this experiment, a modified C-130 model aircraft was used to deploy the autorotating aerial devices according to various example embodiments.

Figure 20:
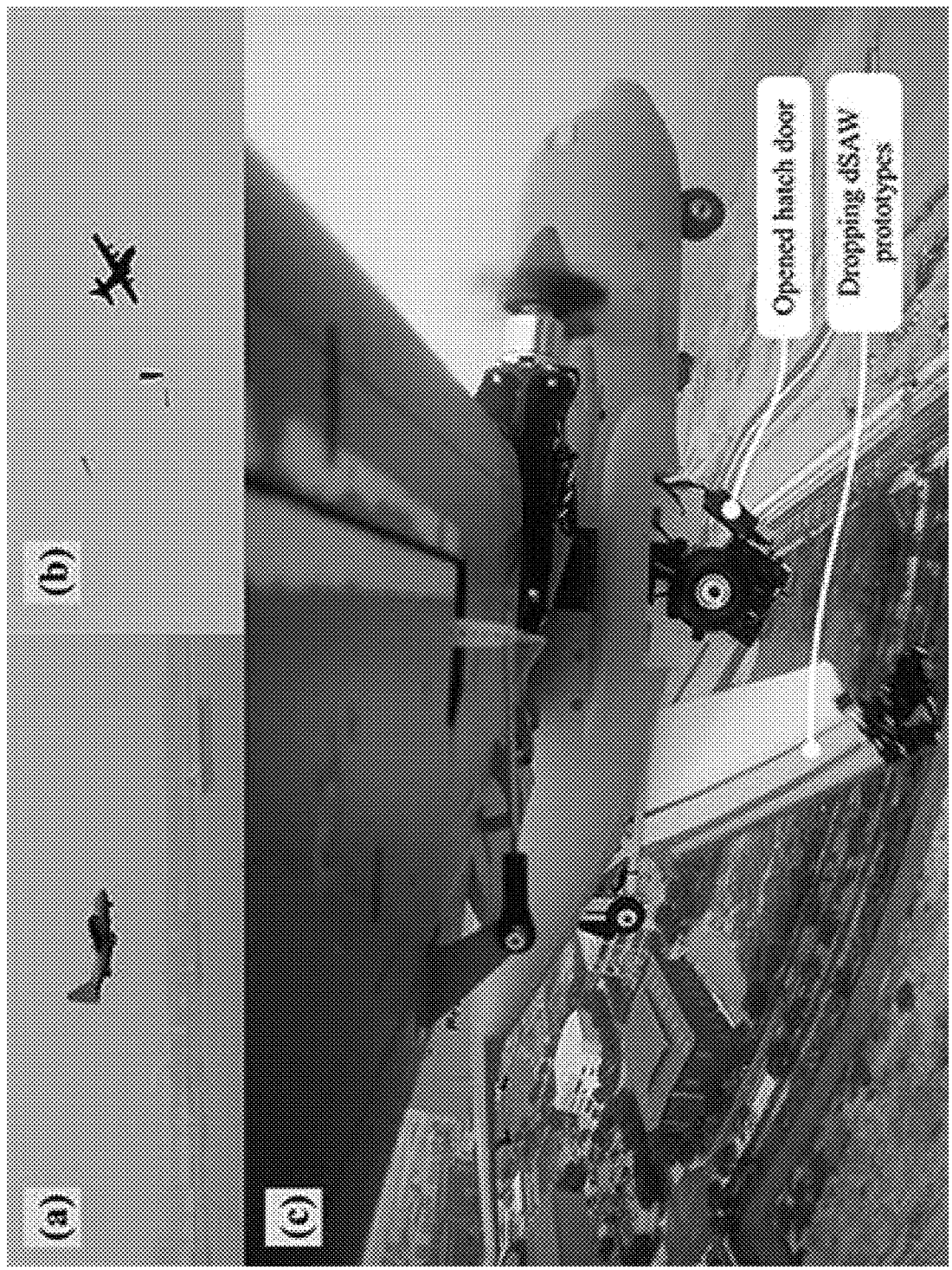
FIG. 20 illustrates aerial camera view of model aircraft flying to deploy the autorotating aerial devices according to various example embodiments, ground camera view shortly after the release, and wing camera view of the moment of drop, when the hatch door was triggered to open, releasing the autorotating aerial devices simultaneously.

The aircraft was flown in a straight line, at about 100 m above ground level with a horizontal speed of around 72 km/h. The hatch-door was triggered to open, releasing all three dSAW prototypes (named M, N and P) at the same time as shown in FIG. 20. More particularly, FIG. 20 illustrates (a) aerial camera view of model aircraft C-130 flying to deploy dSAW prototypes, (b) ground camera view shortly after the release of three dSAW prototypes from C-130, (c) wing camera view of the moment of drop, when the hatch door was triggered to open, releasing three dSAW prototypes simultaneously.

Figure 21:
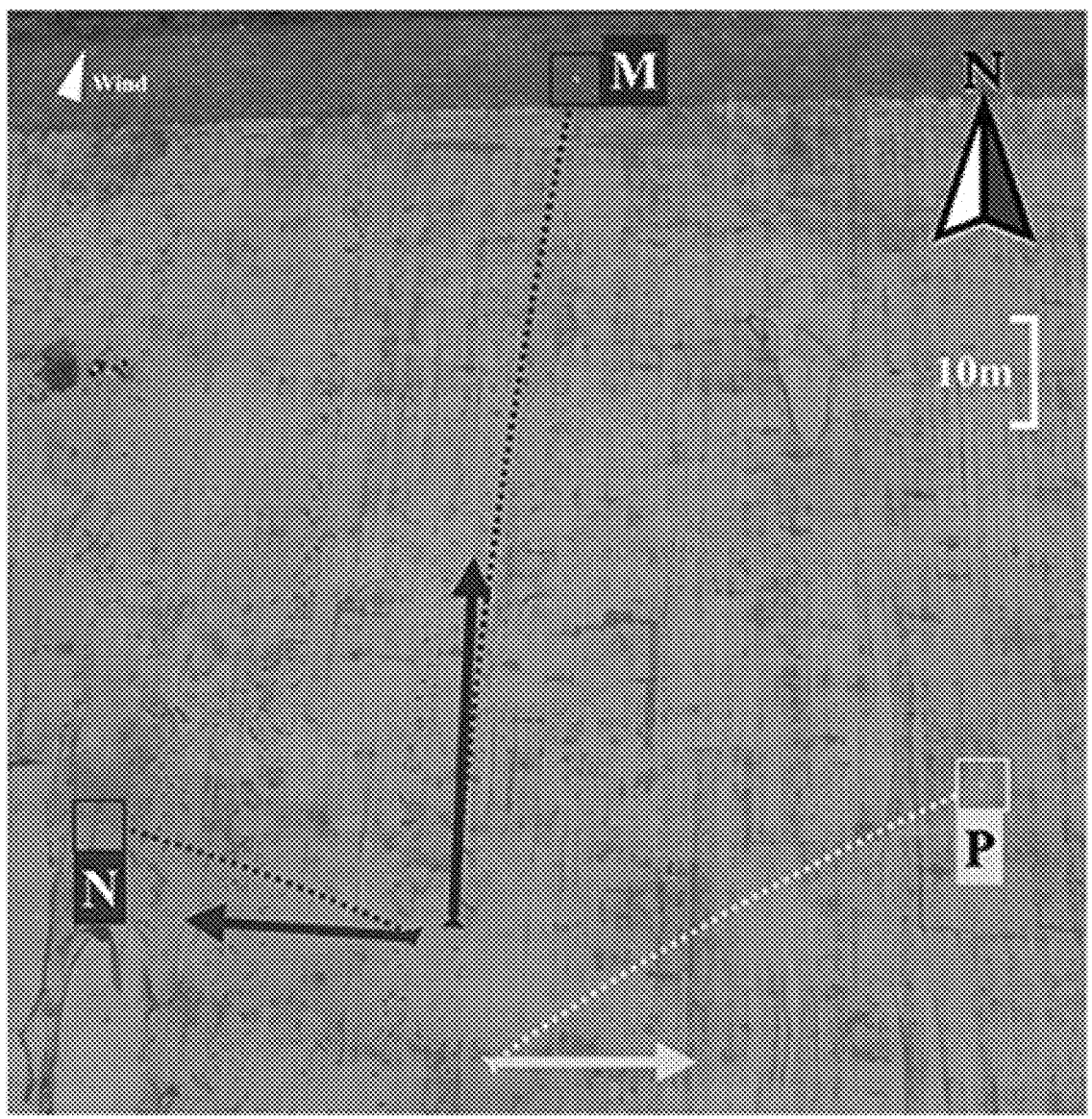
FIG. 21 illustrates an aerial picture showing the estimated flight trajectories of the autorotating aerial devices according to various example embodiments.

After release, all prototypes entered autorotation almost immediately, due to the flap angles being set at $γ_a$. About 10 seconds later, a command signal was sent to all dSAWs simultaneously, using on-board radio. With this command, N was tasked to travel West, M to North, and P to East, visually forming a T-shape in the sky. On-board GPS data is plotted and shown in FIG. 20. Aerial and ground videos were recorded, which showed the flight trajectory visibly. A snapshot from an aerial camera is shown in FIG. 21, where estimated flight trajectories and its deviation from intended flight path are shown. More particularly, FIG. 21 illustrates an aerial picture showing the estimated flight trajectories of dSAW prototypes M, N and P and their commanded cyclic control directions, before entering dive. A mild and steady wind was present during the experiment, which accounted for the deviations in trajectory. All devices were programmed to enter D-Mode as soon as the on-board barometer registered about 50 m above ground. Diving to quickly approach the ground, the devices entered A-Mode automatically again once 18 m above ground level, to slow down their descent for a safe landing.

Figure 22:
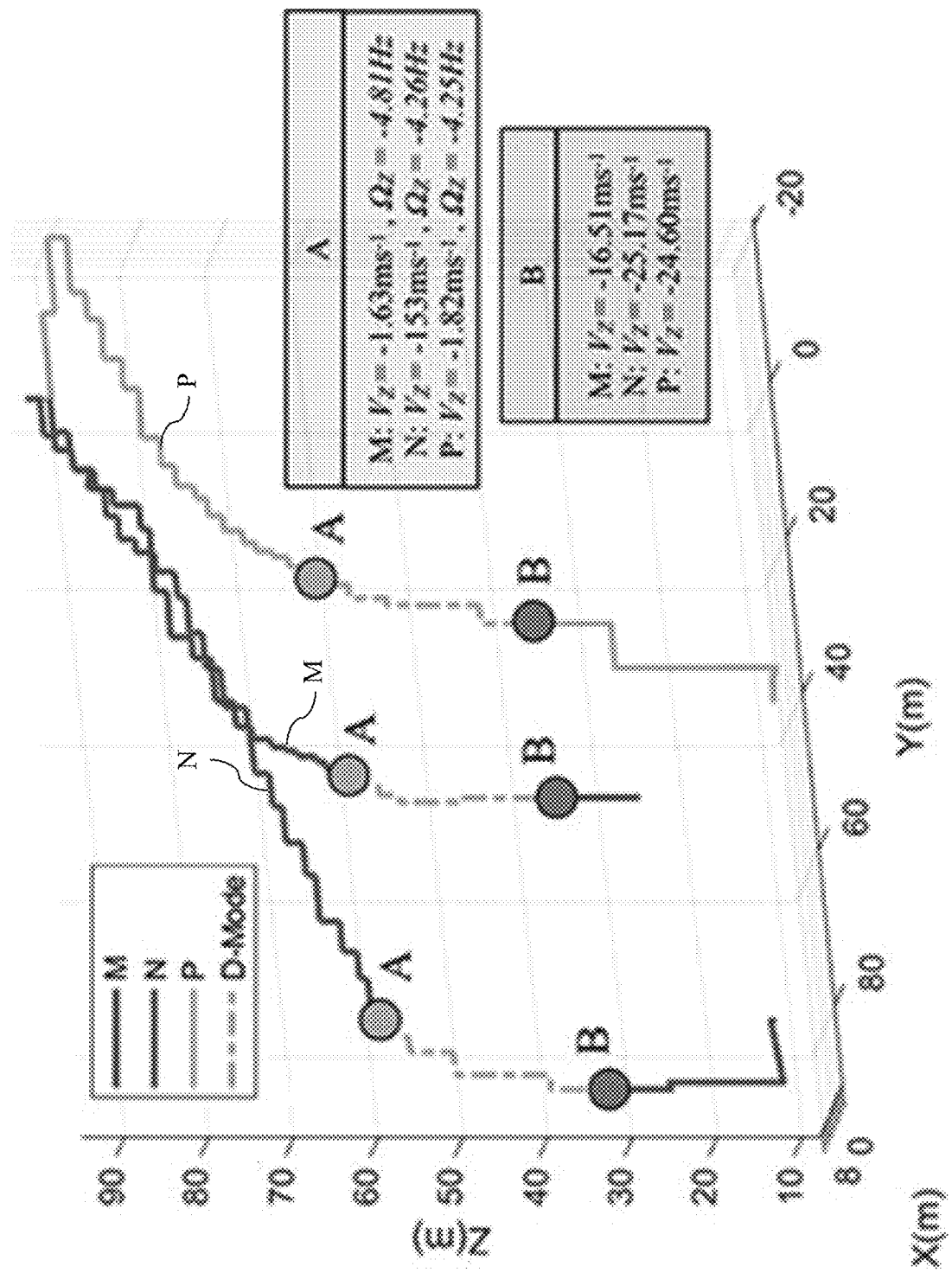
FIG. 22 shows a graph illustrating the flight trajectories of the autorotating aerial devices according to various example embodiments.

FIG. 22 shows a graph illustrating the flight trajectories of dSAW prototypes M, N and P as recorded by their on-board GPS. Values of $V_Z$ and $Ω_Z$ before A-to-D transition and $V_Z$ before D-to-A transition are given.

Figure 23:
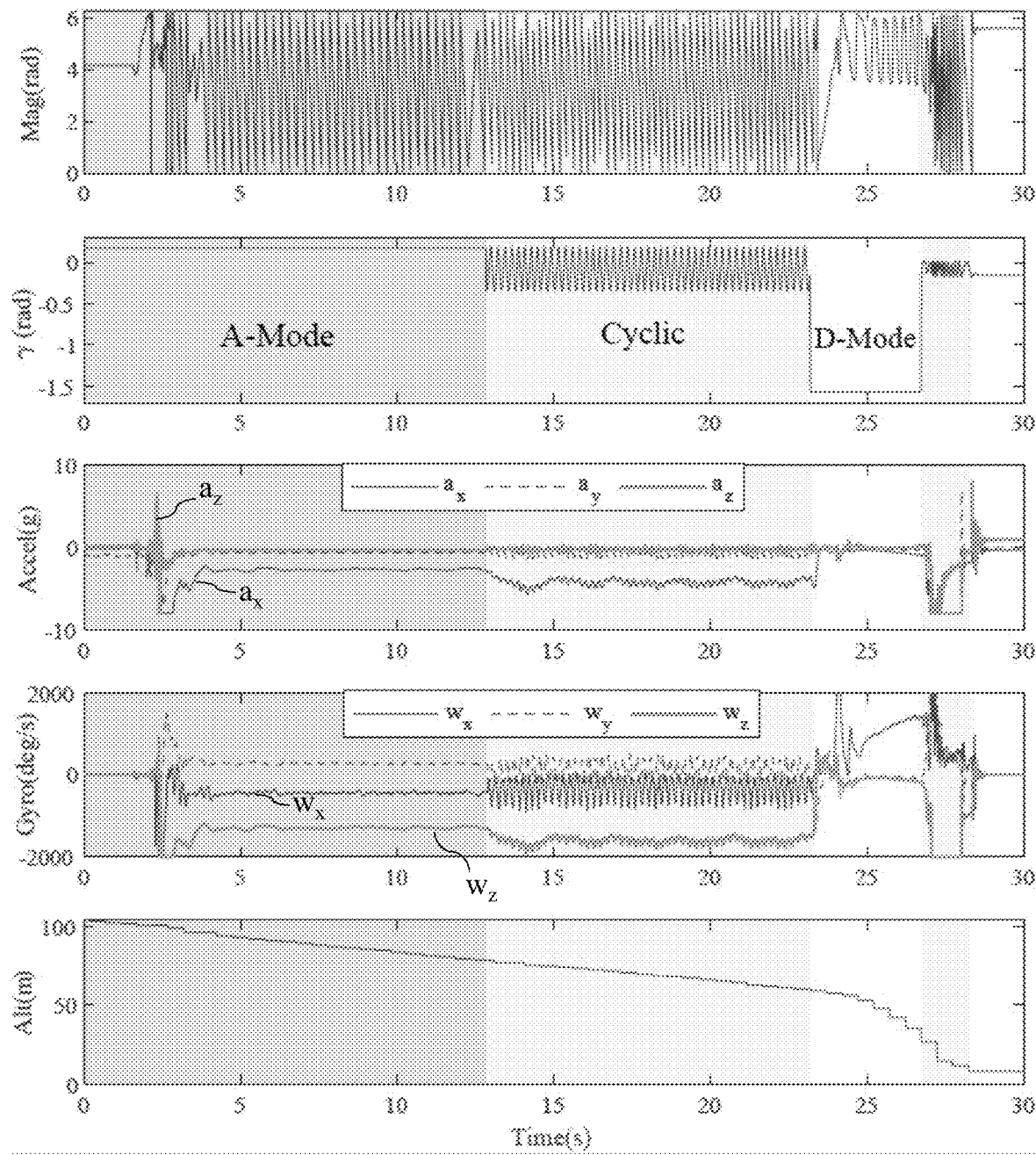
FIG. 23 illustrates data from magnetometer, γ values and IMU of an autorotating aerial device after it was launched according to various example embodiments.

The data collected from model P is shown in FIG. 23, as an example. More particularly, FIG. 23 illustrates data from magnetometer, γ values and IMU of dSAW 'P' after it was launched from C-130. It shows stages of A-Mode, cyclic control, D-Mode and finally back to A-Mode with smaller cyclic signals. From the graphs, it is observed that upon cyclic control, dSAW spun slightly faster and it had small oscillations in its body frame $ω_x$ and $ω_y$, indicating that the tip path plane was tilted.

It can be observed that the simulation and experimental drop speeds $V_Z$ and rotation speeds $Ω_Z$ are not very close. However, the ratio $$\frac{V_Z}{Ω_Z}$$

is similar as it is 0.344 for simulation and 0.343 for experiment. The use of Blade Element Theory has its limitation and assumptions, but it is good enough to predict reasonably accurate model dynamics in steady state. Using genetic algorithm on this dynamic model with specific objectives, an optimized wing planform that achieves slower descent speed than predicted in simulation is found. It was visually observed during the experiments that the abrupt and aggressive movements of the flap in square cyclic control partially acted similar to a flapping wing, creating transient aerodynamics forces. These forces were observed to act in favor of improving the glide angle, making dSAW a more agile platform.

As opposed to sinusoidal cyclic control, square cyclic control engages the flap at up, down or neutral positions, allowing the craft to increase or decrease lift at exact periods during a cycle of rotation. The upward or downward stroke of the flap tends to slow down the rotation speed, while the neutral angle enables the craft to regenerate the lost speed. Actuation angles that are too large tend to destabilize the autorotation process.

For a rotary wing that lacks any form of on-board propulsion, a glide angle of 28.9° is a notable achievement and the first of its kind in a documented work. A fixed-wing type platform may easily achieve similar or better glide angles with simpler, well-explored control methodology. Flight by autorotation, on the other hand, is inherently non-linear which requires novel non-linear control strategies for increased performance. Compared to fixed wing platforms which tumbles upon release with non-ideal initial conditions, dSAW can quickly enter autorotation, maximizing its useful flight envelope. Additionally, D-Mode adds value for various mission profiles where stealth and speed are critical factors. The platform, in A-Mode, may still be vulnerable to rough winds, but D-Mode allows it to skip quickly through tough environmental conditions. As described, various embodiments provide an autorotating aerial device having bi-directional flight transition and trajectory control by using only one actuator.

The glide angle is optimized with limited number of design and control variables and while the use of genetic algorithm does not guarantee global optimum, it is less likely to be stuck in a local optimum. In order to improve its glide angle even further, various embodiments of the autorotating aerial device may further include a small propulsion to increase lift, therefore reducing descent speed, to increase lateral distance traveled.

In various example embodiments, dSAW may be used to carry micro-sensors for data collection.

In various example embodiments, the autorotating aerial device may further include on-board electronic components integrated into a compact custom printed circuit board, which may act as a multi-functional structure. By integrating the on-board electronic components into a compact custom printed circuit board, this will save weight, reduce clutter and simplify the manufacturing process of dSAW. In various example embodiments, the autorotating aerial device may be a fully autonomous GPS-guided platform (based on the software used), and may include sensors for it to intelligently decide and switch between A-Mode and D-Mode while planning its trajectory.

Collaborative Autorotation

Figure 24A:
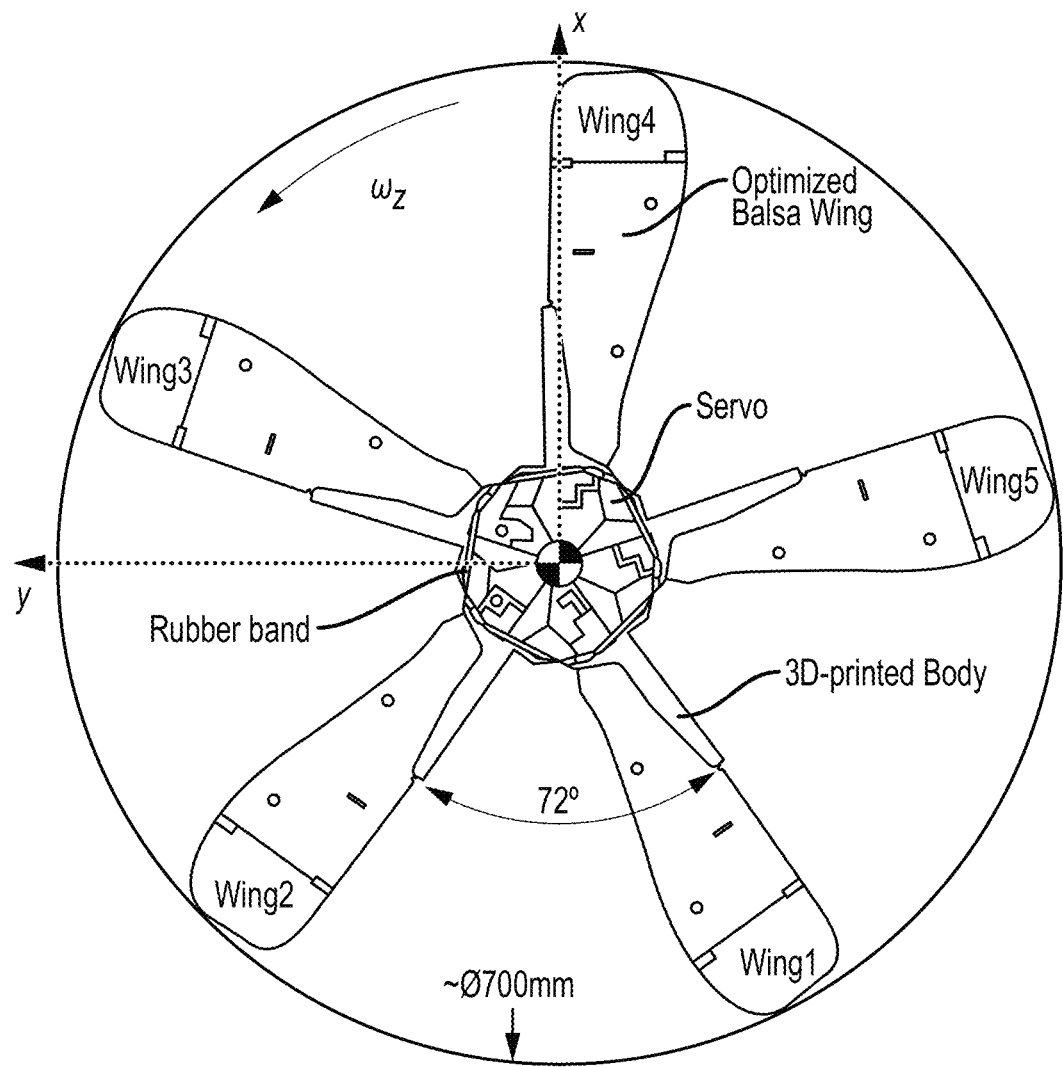
FIG. 24A shows an image of the two or more autorotating aerial devices coupled together according to various example embodiments.
Figure 24B:
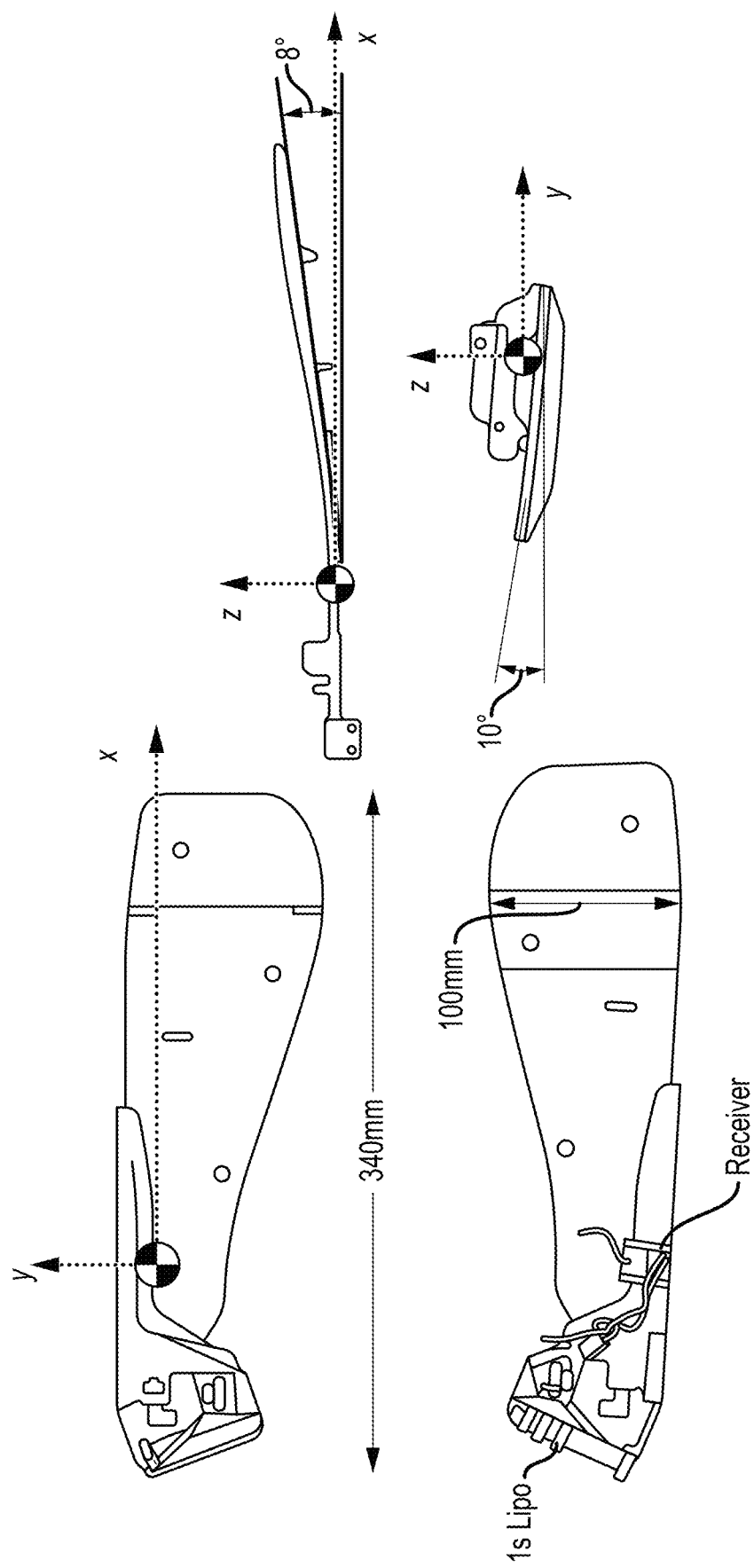
FIG. 24B shows exemplary configuration of the autorotating aerial devices according to various example embodiments.

Collaborative autorotation may be achieved when two or more autorotating aerial devices (which may be interchangeably referred to as a Samara Autorotating Wing device herein) are attached together at the seed area, forming a unified rotor hub. Each Samara Autorotating Wing device may be configured to be identical to each other in terms of wing structure and payload. The autorotating aerial device operates in collaborative autorotation in this mode and it is shown to have better stability and controllability. Additionally, the wings fully generate aerodynamic lift forces, in contrast to the single-winged mode where a portion of the wing does not produce useful aerodynamic forces due to location of the center of spin. This enhanced mode may enable the Samara Autorotating Wing device to be released at higher altitudes, where the atmosphere is thinner. FIG. 24A shows an image of the two or more autorotating aerial devices coupled together.

The separation mechanism is designed following a set of mechanical and electrical constraints. Mechanically, it has to be lightweight, yet it provides enough force for multi-winged Samara Autorotating Wing to maintain its rigidity. It should not be an extremely complex mechanism that requires precision manufacturing. Electrically, it should consume a minimum amount of electrical energy since Samara Autorotating Wing carries a small battery that is reserved for direction control throughout its journey. The mechanism should release all the wings at once for best possible results. Once detached mid-flight, the centrifugal force should naturally pull the wings apart, providing favourable initial conditions for the single-wings to continue the next phase of drop.

Centrifugal force $F_{CF}$ is also one of the main forces that the mechanism must withstand, in addition to aerodynamic forces from the wings. It can be computed using an approximated rotation speed (30 rad/s) and mass (50 g) of each wing, as follows:

$$F_{CF}=mr\omega^2=2.25N$$

In various example embodiments, the designed device uses rubber bands that are easily available as household items. The bands are stretched and seated on a latch so that they can provide the necessary tension to oppose the centrifugal forces. The wing bodies sit next to each other in a series of interlocking grooves that serve to withstand the aerodynamic forces. It is an elegant solution since it does not require any power to actively hold the wings together. In the connected configuration, the rubber band is seated on vertical latches.

The spring-loaded mechanism comprises a spring and two levers, which are in interlocked state before release is triggered. The rubber band is pushed upwards and released when the control arm of on-board servo moves to an extreme end, unbinding the interlock, enabling multi-wing Samara Autorotating Wing to exit the collaborative mode. The same servo may also control the pitch angle of the wing's flap, hence only a single actuator is technically required for the craft.

Every unit of SAW is equipped with a spring-loaded latch and a control servo, which means the release mechanism is de-centralized and fail-safe. Any of the wings can trigger the release upon meeting a condition, such as a pre-determined altitude or a critical point of a mission trajectory. The release of the rubber bands is measured to occur at a duration of 21 ms.

Concurrent Optimization of Mechanical Design and Control for Flapless Autorotating Aerial Device For an aerial craft that autorotates for its flight similar to its biological counterpart, the maple seed, it may be intuitive to use a flap or an aileron to control its drop trajectory. In various example embodiments, an autorotating aerial device or craft uses a single thrust (or thruster) unit, as an alternative to the flap, for its multi-directional trajectory control. A thrust unit provides a more focused and precise application of aerodynamic force and torque, and its assembly is light enough to be mounted in various configurations on the craft. A concurrent mechanical design and control parameter optimization is carried out using Genetic Algorithm to determine the optimal physical configuration of the thruster and the parameters for square cyclic control. The objective function of this optimization is designed to achieve the best glide slope with minimum undesired oscillations. Simulations are carried out in 6-DOF environment to evaluate performance of the optimum configuration compared to less optimal configurations. Real-life experimental drop tests with a physical prototype are carried out via hand launching to verify the glide slope and drop characteristics.

There are some recent attempts to use samara-inspired designs for aerial deployment of payloads. Many of the works focus more on applications or explore the feasibility of samara-like designs for specific use cases and low-cost, easy manufacturing of the device. The aspect of control methodology for direction control is not considered or presented in those works. Another study described the use of a controllable vertical fin for trajectory control. However, due to a number of factors, its drop tests had inconclusive results for direction control. Hence, Win et al., "Dynamics and control of a collaborative and separating descent of samara autorotating wings," *IEEE Robotics and Automation Letters*, vol. 4, no. 3, pp. 3067-3074, 2019, is the only documented work whereby trajectory control is shown for samara-inspired payload delivery platforms.

Self-sustained flight capable variants of samara-inspired crafts are called monocopters. They often have two actuators and are controllable in position and height. The two actuators consist of a thrust unit, for powering and sustaining the spin rate of the craft, and a flap or aileron, which is usually used with both collective and cyclic control similar to helicopters. Some other works for optimization or control of spinning aerial robots are described in Hedayatpour et al., "Revised propeller dynamics and energy-optimal hovering in a monospinner," in *4th International Conference of Control, Dynamic Systems and Robotics,* 2017; Bai, et al., "Design and take-off flight of a samara-inspired revolving-wing robot," in *IEEE/RSJ International Conference on Intelligent Robots and Systems,* 2019, pp. 6070-6076; and Zhang, et al., "Design, modeling and control of a flying vehicle with a single moving part that can be positioned anywhere in space," Mechatronics 61, pp. 117-130, 2019.

Various embodiments provide an autorotating aerial device which uses a single thrust unit, replacing the functionality of a flap, to control the descent trajectory of the autorotating aerial device (e.g., SAW). The benefit of using the thruster is that during the part of descent where no control is needed, the thrust unit draws no power whereas the actuator that is configured to hold the flap portion at a set angle consumes a small amount of power to hold the set angle. The single thruster unit can also be placed in more locations, providing focused and precise forces, due to its light weight, depending on the required flight profile. A thrust unit may be more viable than a flap in certain applications and use cases.

In various example embodiments, the autorotating aerial device uses a single thruster unit for multi-directional control, instead of an actuating flap, for the autorotating craft. The optimal location and orientation of the thruster unit may be determined using Genetic Algorithm for stable autorotating descent and best glide slope under control input. In various example embodiments, a square cyclic control strategy suitable for use with the single thruster is provided. The parameters of the controller may be determined in the same Genetic Algorithm run for determining the optimal location and orientation of the thruster unit. Numerical simulations are carried out to evaluate the performance of the optimal configuration as compared to less optimal configurations.

Figure 25:
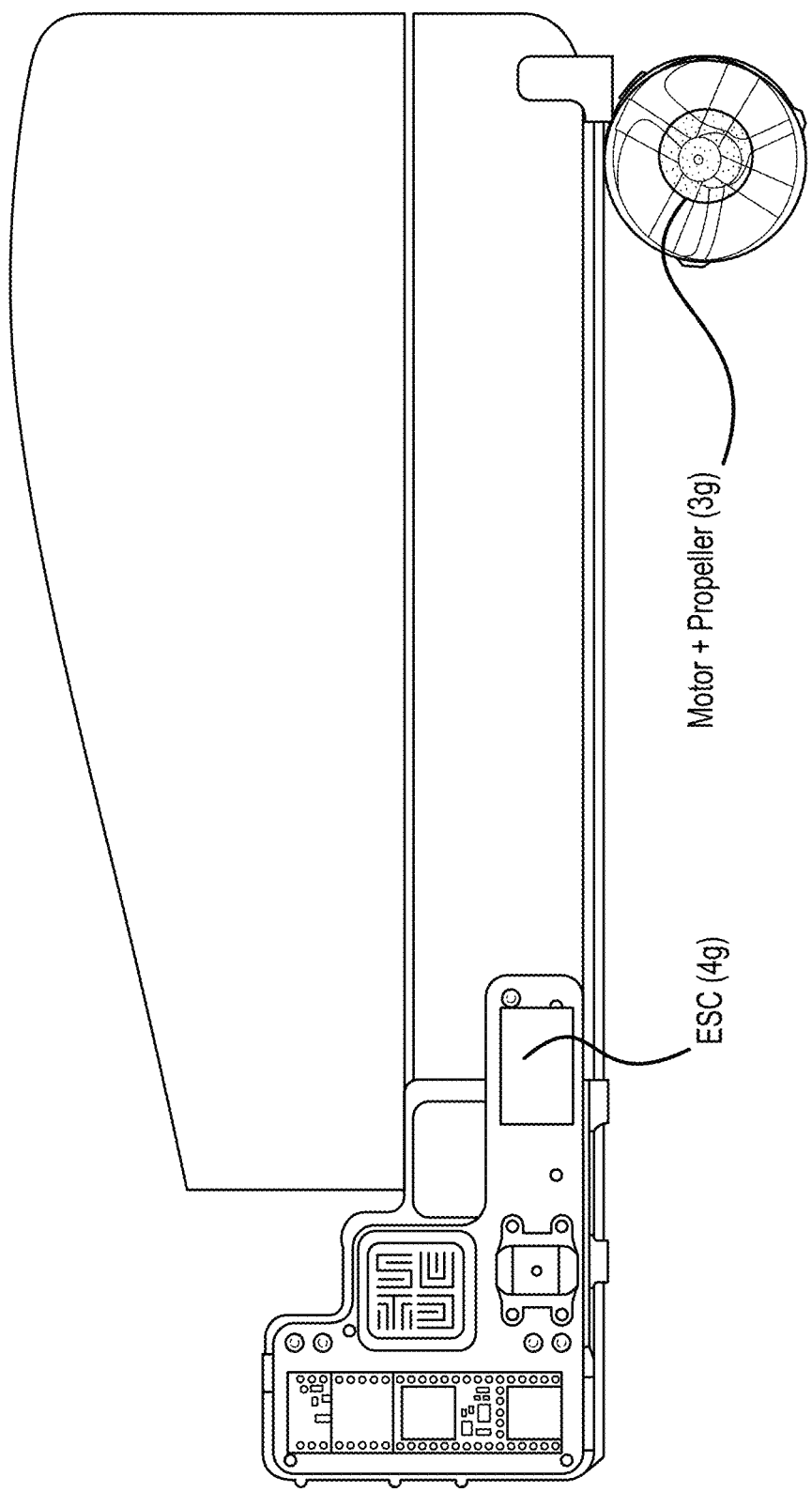
FIG. 25 shows an exemplary autorotating aerial device having a thrust unit according to various example embodiments.

FIG. 25 shows an exemplary embodiment of an autorotating aerial device having a thrust unit (or thruster). The thrust unit may be placed in more locations for specific thrust or torque. The thrust unit may be a lighter actuator. The thrust unit does not draw power when not used, and may only consume more power when intensively used.

Figure 26A:
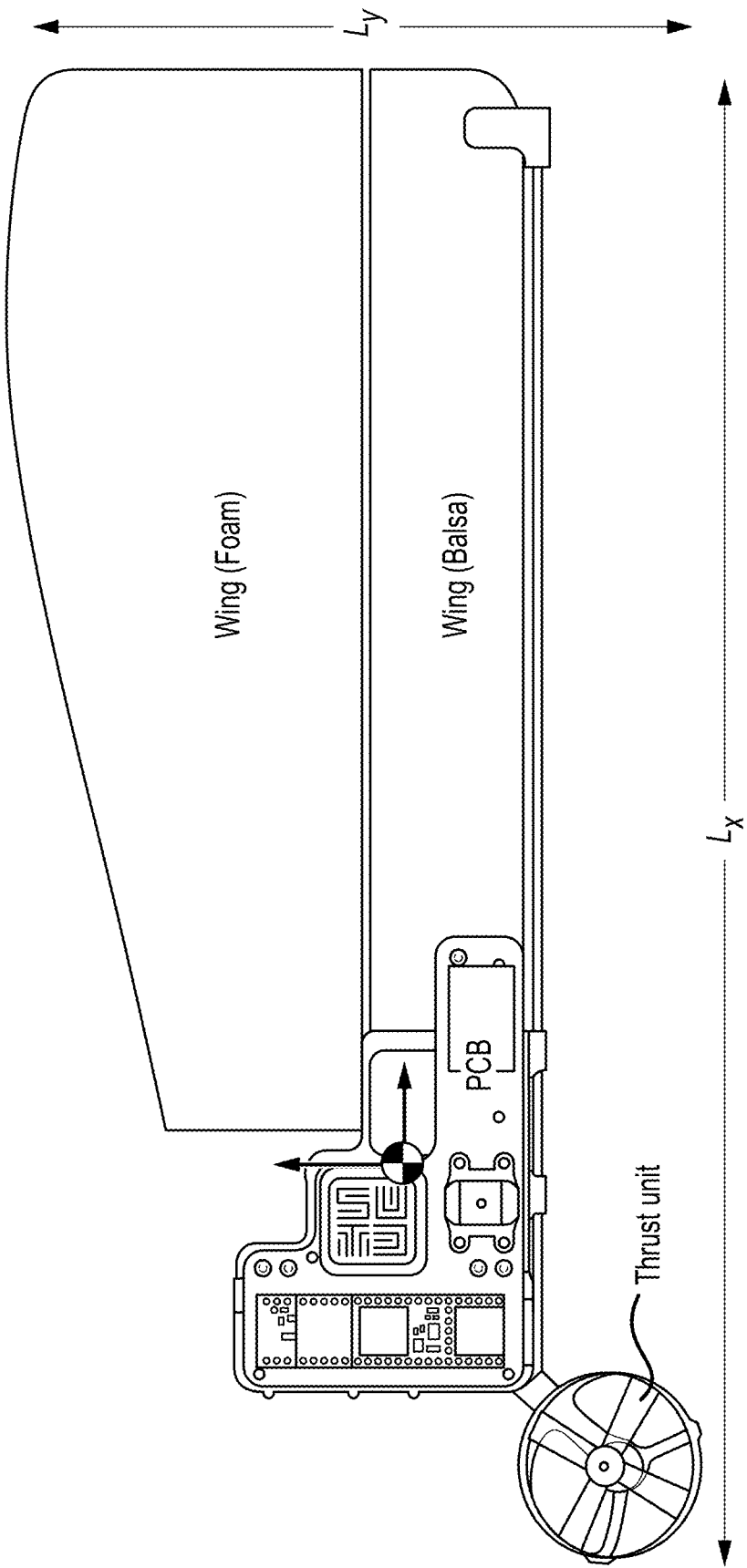
FIGS. 26A-26C show top, side and front views of another exemplary autorotating aerial device having a thrust unit according to various example embodiments.

In various example embodiments, a physical device is built from the design consideration and is called motorized-SAW (mSAW), shown in FIG. 26A. Using the proposed control strategy, experiments were carried out to evaluate its directional control during autorotating descent.

Design Consideration

The Samara Autorotating Wing was initially developed through several cycles of iterative design. Its setup is geometrically similar to the maple seed—it features a dense seed-like portion which houses most of the electronics and battery, and a thin, large and lightweight wing portion which generates the aerodynamic lift and torque required for autorotation. The components have been strategically placed such that regardless of its initial conditions, the craft is able to enter autorotation.

The wing portion (or wing member) reuses the optimized planform (e.g., the two-dimensional geometry (shape) of the optimized planform) derived in Win et al., "Dynamics and control of a collaborative and separating descent of samara autorotating wings," *IEEE Robotics and Automation Letters*, vol. 4, no. 3, pp. 3067-3074, 2019. The rear portion of the wing is tilted at a fixed angle γ to ensure quick initiation of the autorotation process. The rear portion is also made with a thin foam sheet to make it lighter.

Figure 26B:
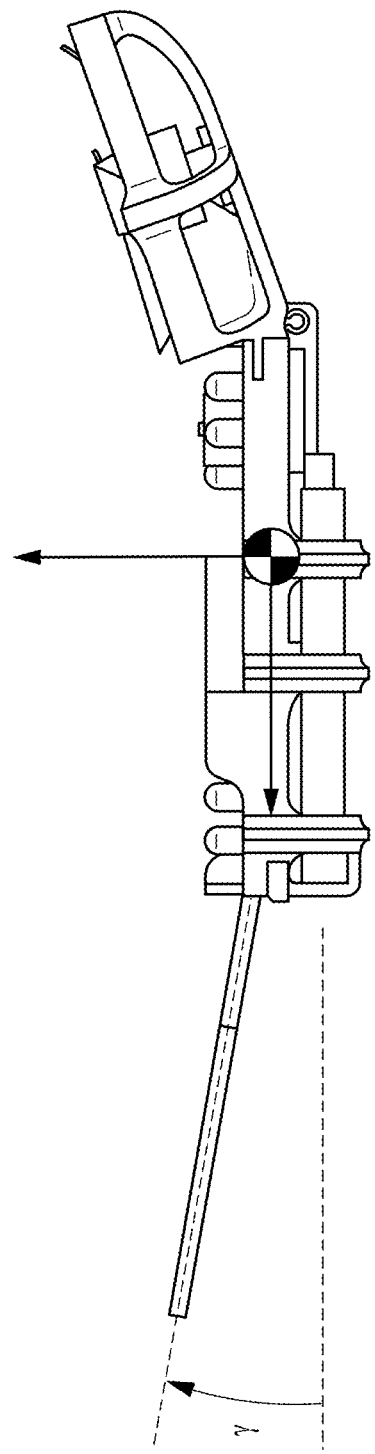
Figure 26C:
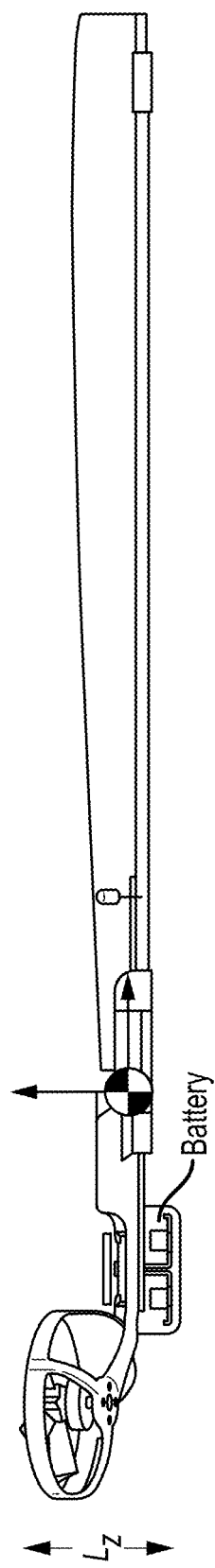
Figure 26D:
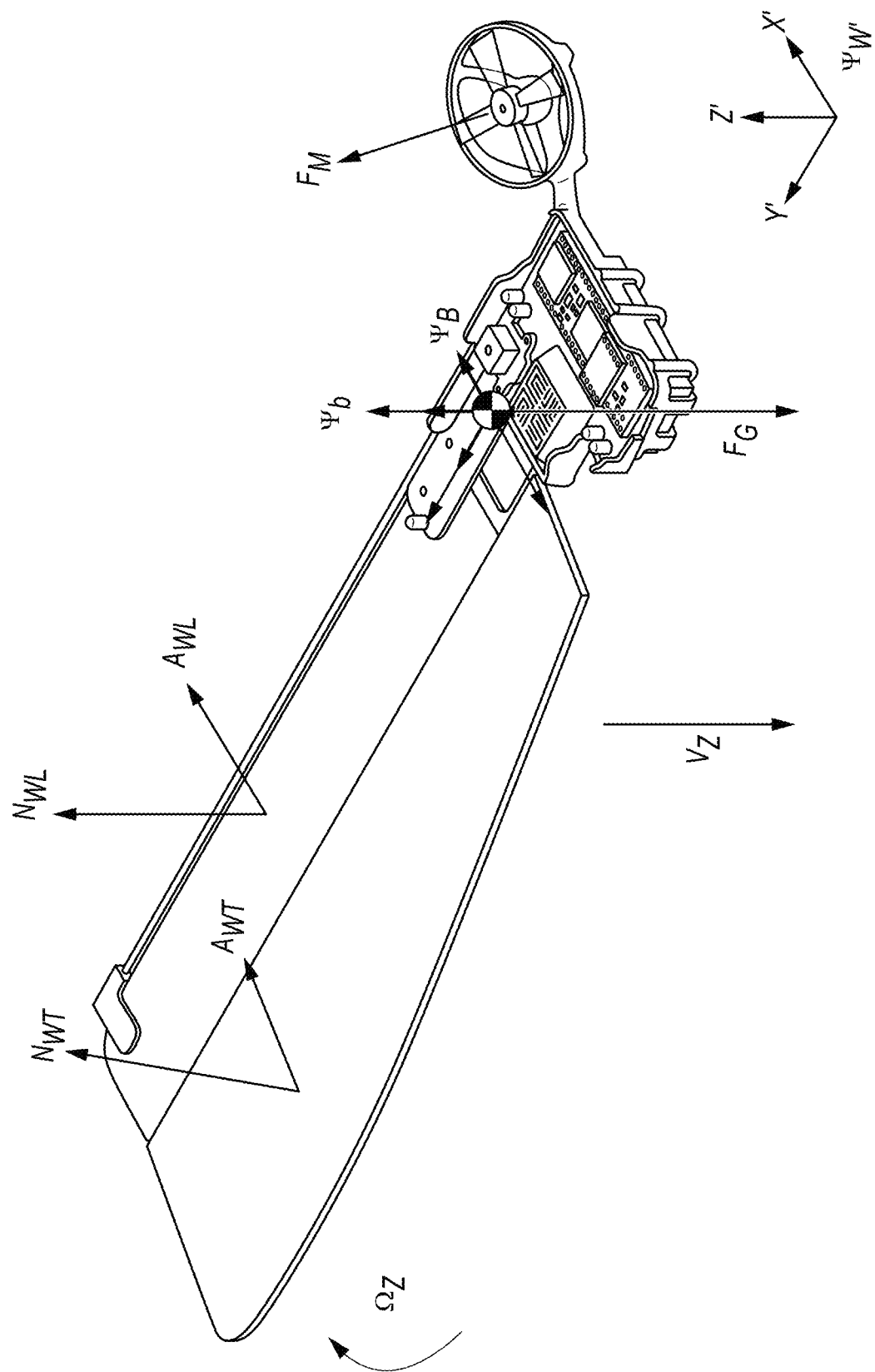
FIG. 26D shows a free body diagram with definitions of world frame, body frame at the center of gravity and a non-rotating body frame whose origin is at center of gravity with its axes aligned to the world frame according to various example embodiments.

FIGS. 26A-26C show exemplary top, side and front views of mSAW design according to various example embodiments. FIG. 26D shows a free body diagram with definitions of world frame $\Psi_W$ (X', Y', Z'), body frame $\Psi_b$ (x, y, z) at the center of gravity and a non-rotating body frame $\Psi_B$ (X, Y, Z) whose origin is at center of gravity with its axes aligned to $\Psi_{W'}$. Rotation speed $\Omega_Z$ is measured about $\Psi_B$ and drop speed $V_Z$ is measured with respect to $\Psi_{W'}$. $L_x$, $L_y$, $L_z$, and mass m of final optimized mSAW are given in Table 6 shown in FIG. 31.

Aerodynamic Model

Figure 27:
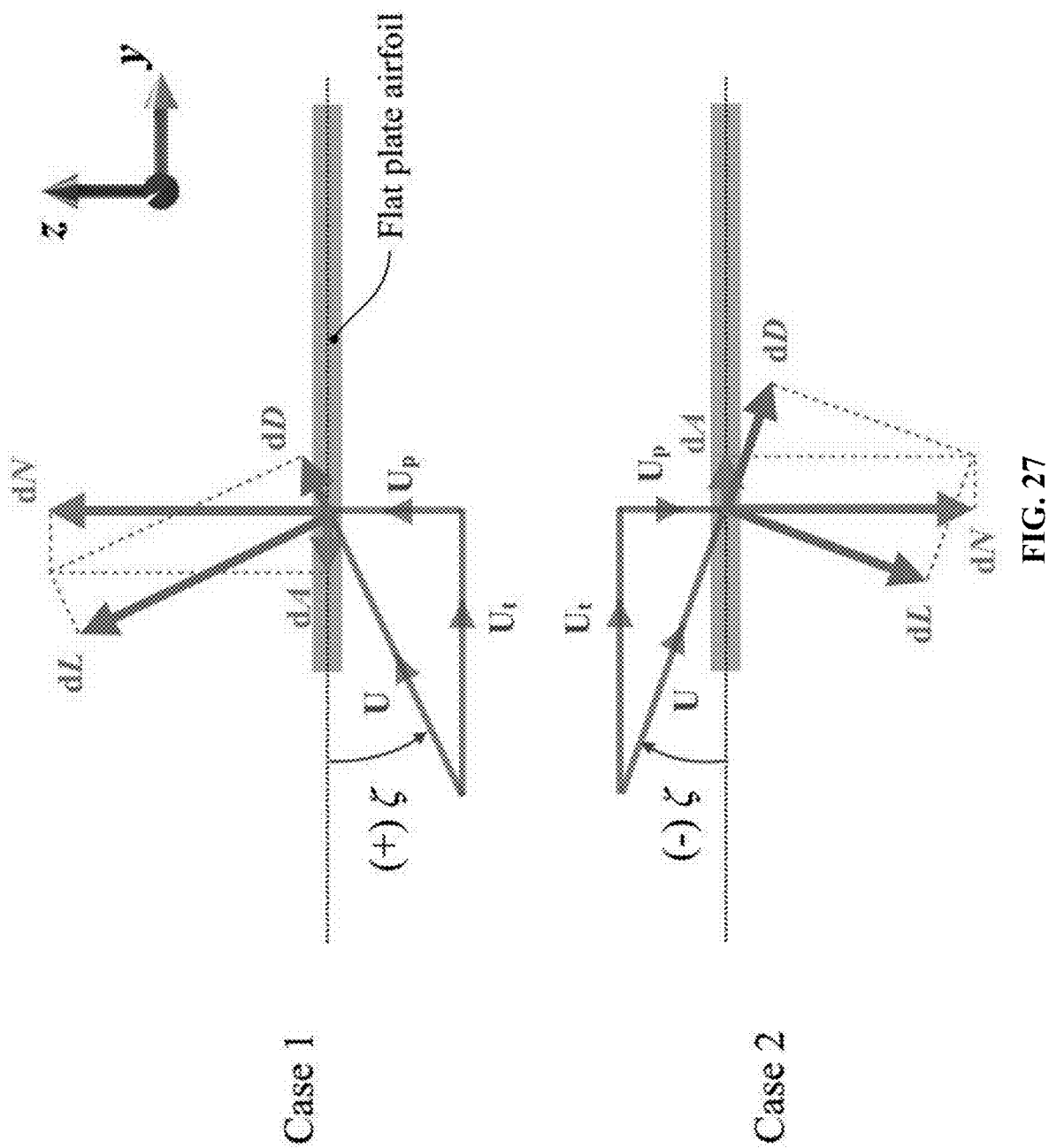
FIG. 27 illustrates two cases of relative inflow angle for blade element according to various example embodiments.
Figure 30A:
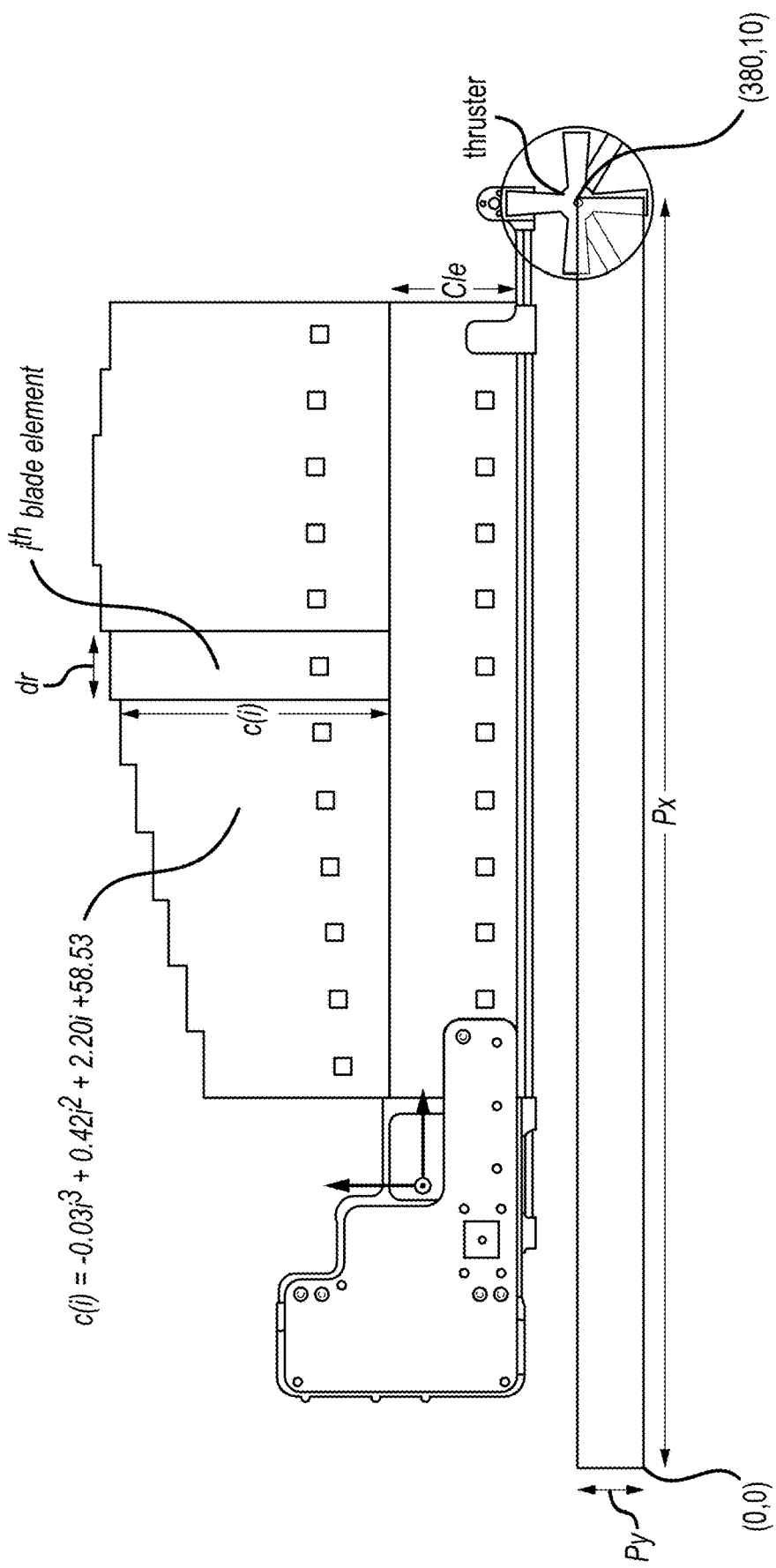
FIG. 30A shows a top view of simulated mSAW, depicting a blade element designation and variables for optimization and its range.

In various example embodiments, the Blade Element Theory as described in G. J. Leishman, *Principles of Helicopter Aerodynamics*, Cambridge University Press, 2006 is applied to model the autorotating flight of mSAW in a 6 degrees-of-freedom environment. The world frame is denoted as $\Psi_W$ and the body frame is denoted as $\Psi_b$. A non-rotating body frame $\Psi_B$ is also defined whereby its axes are always aligned to that of $\Psi_W$. As the craft falls in autorotation, the wing is assumed to be the only component that produces useful and significant aerodynamic forces as it cuts through clean and undisturbed air. The wing is composed of two sections, the front and the rear, both of which are flat plate airfoils. These two sections are necessary to create a small torque that induces and sustains autorotation. The wing sections are each split into $n_{be}$ blade elements. The lift and drag forces generated from each blade element is calculated using Equation (1) and Equation (2) as described above. The values of $C_l$ and $C_d$ are obtained and linearly interpolated from B. H. Wick, "Study of the subsonic forces and moments on an inclined plate of infinite span," *NACA TN*-3221, 1954. dL and dD forces are resolved into normal and axial forces (dN and DA respectively) before being applied back into the model. In MATLAB Simulink, the relative inflow angle can be found by attaching a transform sensor to measure velocities with respect to a non-rotating follower on the blade element, as shown in FIG. 27 and FIG. 30A. More particularly, FIG. 27 illustrate two cases of relative inflow angle ζ for blade element. Two cases consider both positive and negative relative inflow velocity situations, allowing the model to be simulated dynamic scenarios. dN and dA forces are then calculated using:

$$\text{Case 1} \begin{cases} dN = dL\cos(\zeta) + dD\sin(\zeta) \\ dA = -dL\sin(\zeta) + dD\cos(\zeta) \end{cases} \quad \text{Equation (18)}$$

$$\text{Case 2} \begin{cases} dN = -dL\cos(\zeta) + dD\sin(\zeta) \\ dA = dL\sin(\zeta) + dD\cos(\zeta) \end{cases} \quad \text{Equation (19)}$$

where ζ is the relative inflow angle of the air.

The blade elements are uniformly distributed along the wing member to calculate the total aerodynamic force and torque generated. Also, the resultant forces are assumed to be applied at the quarter-chord position.

In various example embodiments, the thrust unit comprises a brushless motor directly attached to a propeller. The thrust unit is modelled to provide an ideal force without any delay. In order to consider the gyroscopic effects of a spinning mass (the motor bell and propeller), the components are also spun in the simulation with estimated rotation speed of about 200 rotations per second at 30 g of thrust, modelled with a direct linear relationship to the motor force.

Control Strategy

In various example embodiments, the thrust unit (brushless motor and electronic speed controller) is non-reversible. This means that the thrust can only be applied in one direction. With a single thrust unit on-board, one may think of two different ways of applying thrust for trajectory control. The first way is to orientate the thrust unit horizontally (Θ=0°) and generating thrust during every rotation when the thrust direction becomes parallel to the desired direction. This means the resulting motion depends entirely on the strength of the thrust and also likely fighting against the restoring forces that enables the stability of the autorotation. The second way is to have the thrust unit vertical (Θ=90°), located with an offset distance from the center of rotation. The thrust from the offset distance produces a torque to either tilt the Tip Path Plane or change the angle of attack of the wing. Again, it needs to generate a certain amount of thrust during every rotation.

The optimum configuration of the thruster for best glide slope within its maximum thrust capability is described later. For any configuration, the following 'square cyclic control' law can be used:

$$T = \begin{cases} T_o + T_{amp}, & \text{if } \sin(\theta_z + \lambda_c + \lambda_{off}) > \epsilon \\ T_o, & \text{otherwise} \end{cases} \quad \text{Equation (20)}$$

where T is the thrust force, $T_o$ is the offset or neutral thrust, $T_{amp}$ is the amplitude of cyclic thrust, $\theta_z$ is the current azimuth heading of the craft, $\lambda_c$ is the control direction from the human controller, $\lambda_{off}$ is the angle correction offset due to gyroscopic precession, and $\epsilon$ is the variable to control the duty cycle. $\lambda_c$ can be found by $$\lambda_c = a\tan2\left(\frac{\text{pitch}}{\text{roll}}\right)$$

and $\lambda_{off}$ is a manually adjusted value based on the system's gyroscopic precession.

Figure 28A:
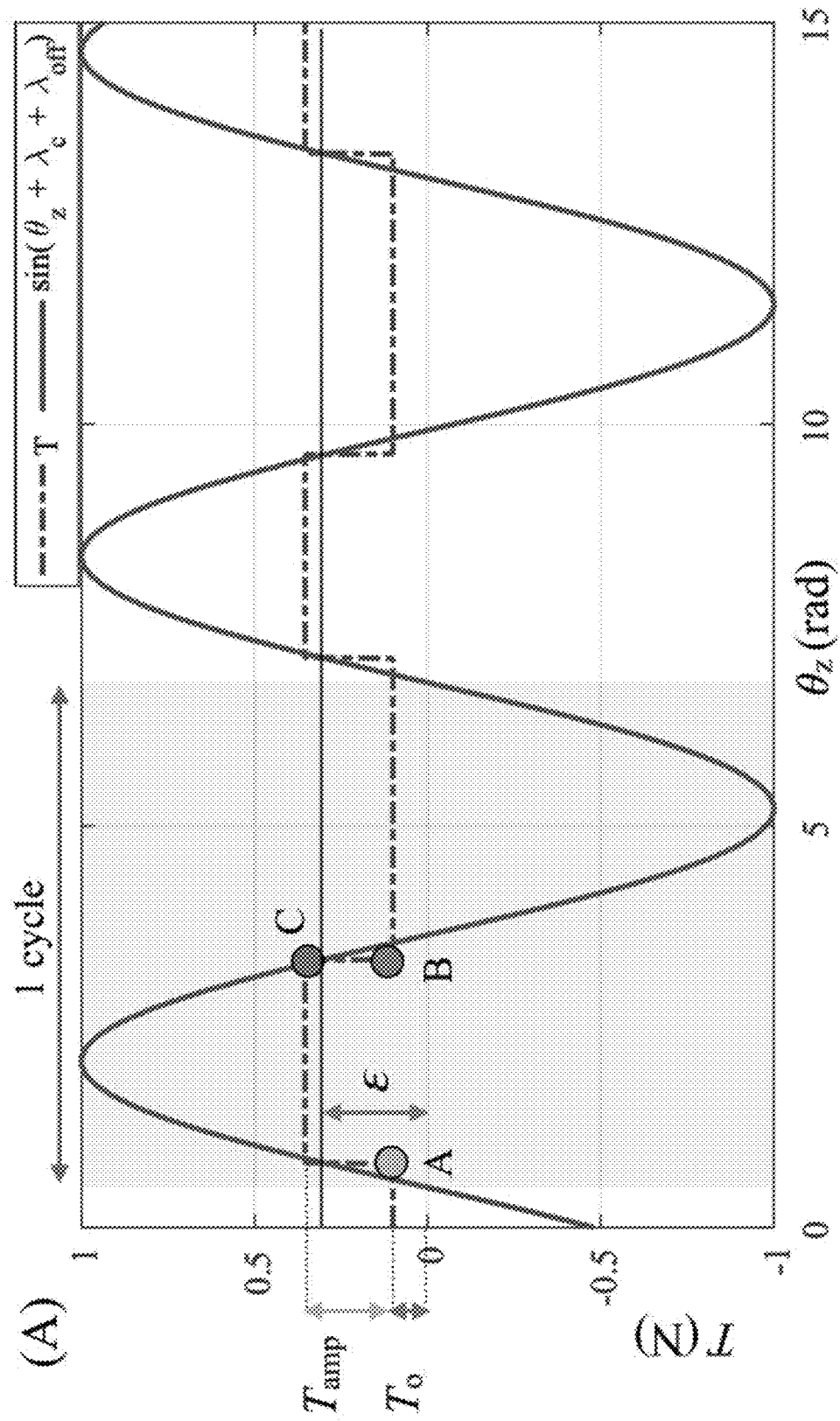
FIGS. 28A-28B show an example square cyclic control with definitions of various parameters according to various example embodiments.
Figure 28B:
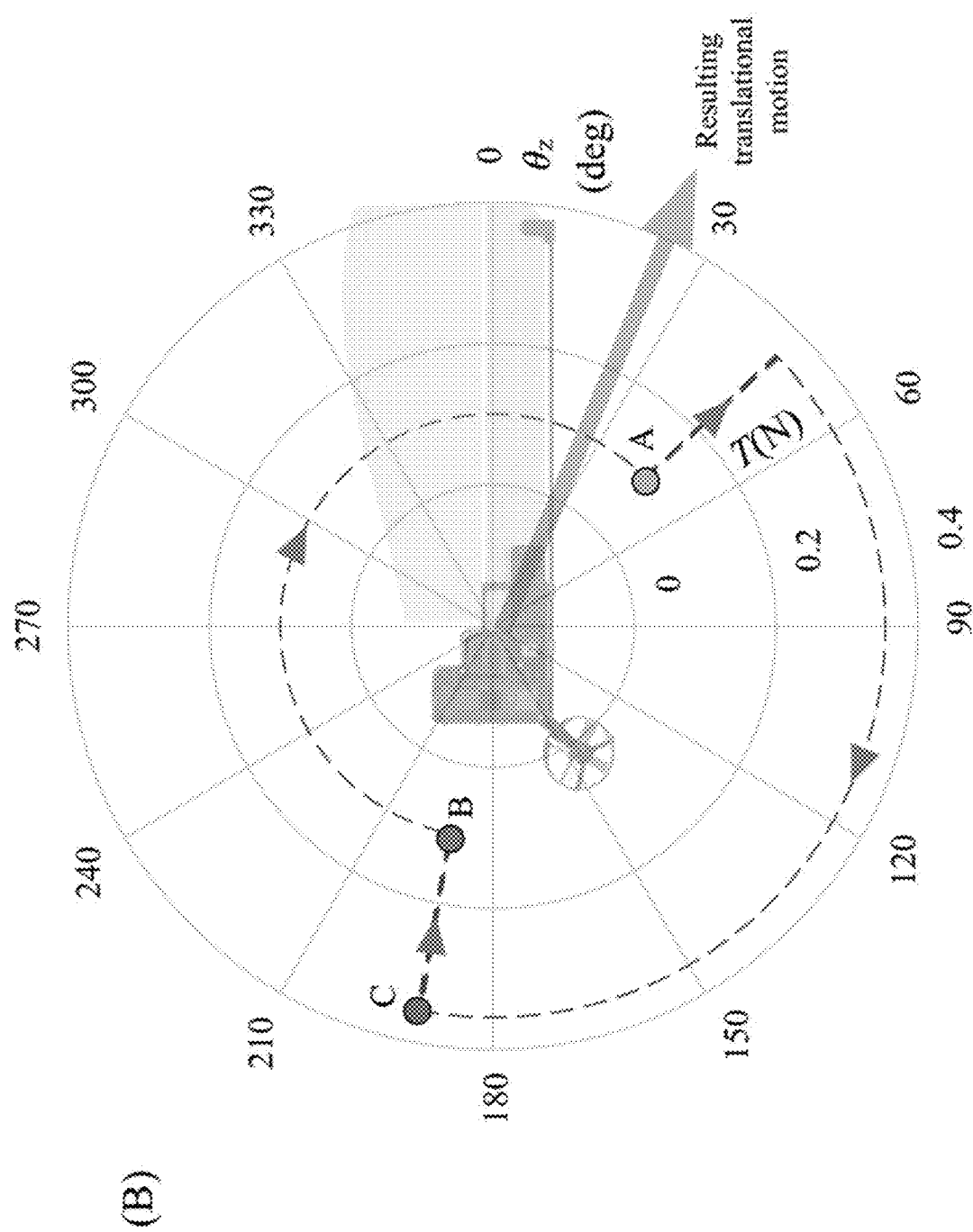

FIGS. 28A-28B show an example square cyclic control with definitions of all parameters defined in Equation (20). More particularly, cyclic control strategy for thruster mounted near the seed portion, pointed upwards, shown in FIG. 28A as cartesian plot and in FIG. 28B as polar plot. Points A, B and C indicate the corresponding points for both plots. By increasing thrust for a short period within a cycle of rotation, it increases the pitch angle of the wing, therefore increasing lift generated in the corresponding portion. Gyroscopic precession is considered for the resulting translational motion.

Concurrent Optimization of Mechanical Design and Control

With a single thruster unit, an optimized configuration whereby the thrust and torque generated are applied most efficiently for the best glide slope needs to be determined. For rotary-winged crafts and especially the crafts which rotate their entire bodies for flight (such as the monocopter and the Samara Autorotating Wing), a poor physical configuration leads to an unstable flight whereby the craft progressively pitches and rolls to fly in a precession circle. This phenomenon can be measured effectively by oscillations in $\omega_X$ and $\omega_Y$.

In the simulation, it is targeted to reach a rotation rate $\omega_Z$ of about 50 rad/s since in preliminary drop tests, a prototype of similar weight, shape and size autorotated at this speed. The shape of the wing planform and the angle of attack of the trailing edge are optimized for a slow and stable autorotation descent.

Figure 29:
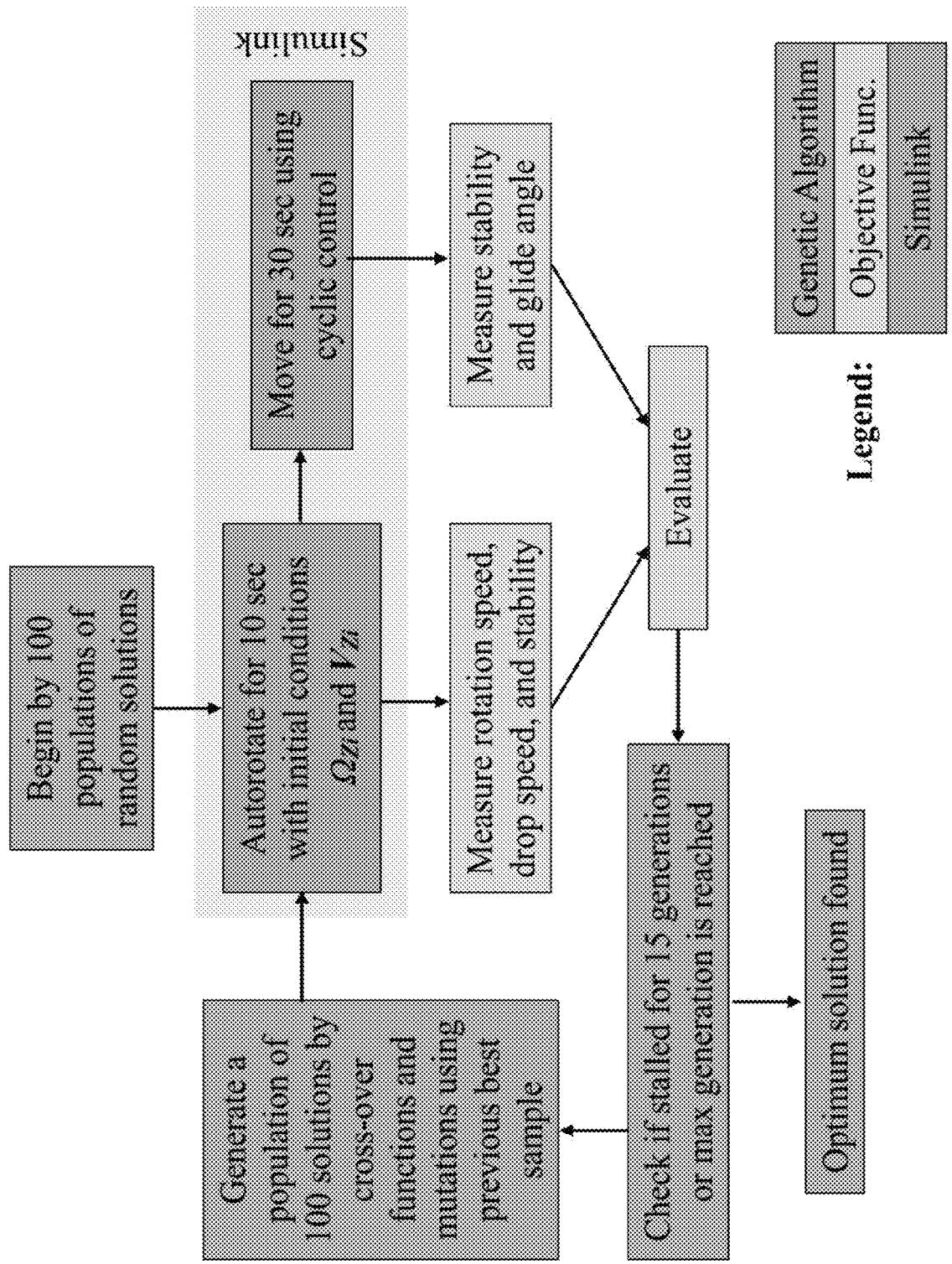
FIG. 29 shows a flowchart demonstrating the usage of genetic algorithm and Simulink on MATLAB according to various example embodiments.

FIG. 29 describes the iterative process of using genetic algorithm and Simulink together within MATLAB. More particularly, FIG. 29 shows a flowchart demonstrating the usage of genetic algorithm and Simulink on MATLAB. The benefit of using genetic algorithm is that it searches parallel for the optimal solution from a population of points. Therefore, it can avoid being trapped in a local optimum unlike traditional methods, which search from a single point.

Formulation

Figure 37:
FIG. 37 shows the drop trajectory of mSAW prototype during cyclic control in autorotation according to various example embodiments.

In various example embodiments, the optimum configuration (e.g., best location and orientation) of the single thruster unit and control parameters $T_o$, $T_{amp}$ and $\epsilon$ may be determined to achieve the following objectives:

minimum drop speed (Equation (21))
rotation rate of about 50 rad/s (Equation (22))
minimum unwanted oscillations in $\Omega_X$ and $\Omega_Y$ before cyclic control (Equation (23))
minimum unwanted oscillations in $\Omega_X$ and $\Omega_Y$ during cyclic control (Equation (24))
minimum glide slope (Equation (25)) (definition of glide slope, GS, is given in FIG. 37)

The mechanical design and control parameters to be optimized can be expressed in a single concatenated vector $\Gamma = [P_x, P_y, \Theta, T_o, T_{amp}, \epsilon]^T$ which comprises three variables for mechanical design (FIGS. 30A-30B) (integers) and three variables for control parameters (real numbers). These variables can be summarized as per Table 5 which also indicates the lower and upper bounds.

TABLE 5

| Table of variables to optimize | | | |
|---|---|---|---|
| | Parameter | Lower Bound | Upper Bound |
| Mech Design | $P_x$ | 0 | 380 |
| | $P_y$ | 0 | 10 |
| | $\Theta$ | 0 | 150 |
| Control | $T_o$ | 0.00 | 0.10 |
| | $T_{amp}$ | 0.01 | 0.50 |
| | $\epsilon$ | −0.99 | 0.99 |

Figure 30B:
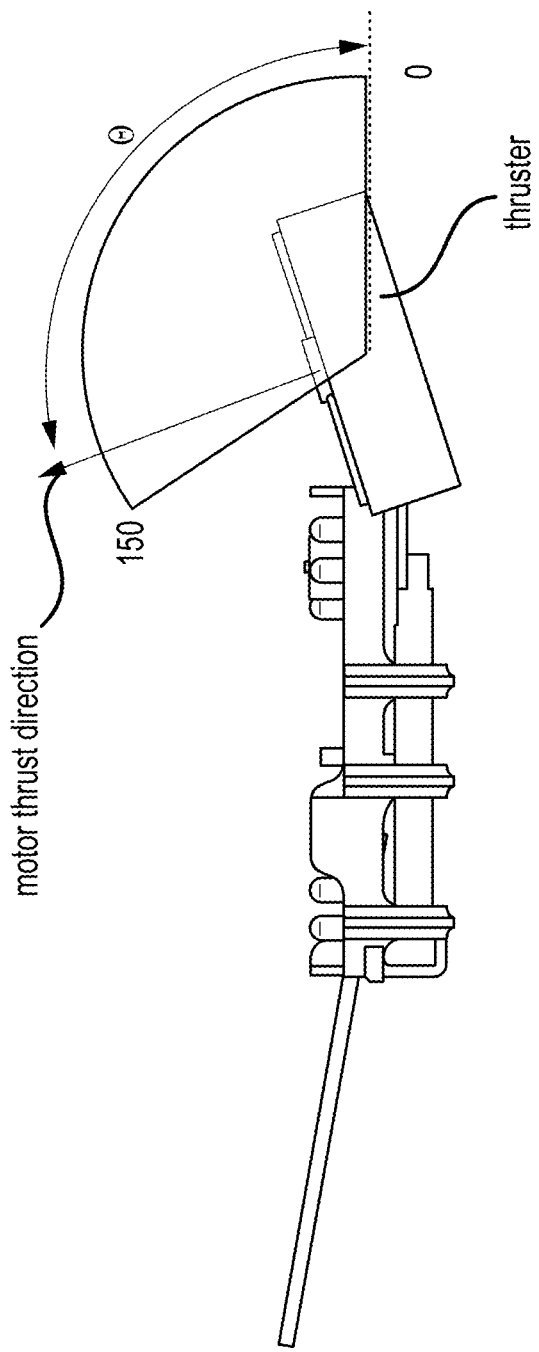
FIG. 30B shows a side view showing a variable and its range according to various example embodiments.

FIG. 30A shows a top view of simulated mSAW, depicting a blade element designation and variables for optimization ($P_x$, $P_y$) and its range. FIG. 30B shows a side view showing variable $\Theta$ and its range.

The main objective function comprises sub-objective functions: $F_1$, $F_2$, $F_3$, $F_4$ and $F_5$. $F_1$ is the sub-objective function for average drop speed during autorotation which is defined as follows:

$$F_1 = -\frac{\sum_{i=n_1}^{n_2} V_Z(t_i)}{n_2 - n_1} \quad \text{Equation (21)}$$

where $V_Z$ is a negative value since the craft is traveling downwards.

$F_2$ is the sub-objective function for rotation speed which is defined as follows:

$$F_2 = \left(\frac{\sum_{i=n_1}^{n_2} \Omega_Z(t_i)}{n_2 - n_1} + 50\right)^2 \quad \text{Equation (22)}$$

where $\Omega_Z(t_i)$ is a negative value and 50 rad/s is the target rotation speed.

$F_3$ is the sub-objective penalty function for undesired oscillations before cyclic control and is defined as follows:

$$F_3 = \frac{\sum_{i=n_3}^{n_2} \left(\Omega_X(t_i)^2 + \Omega_Y(t_i)^2\right)}{n_2 - n_3} \quad \text{Equation (23)}$$

where $\Omega_X$ and $\Omega_Y$ are angular velocities in the X and Y-axes respectively.

$F_4$ is the sub-objective penalty function for undesired oscillations during cyclic control and is defined as follows:

$$F_4 = \frac{\sum_{i=n_4}^{n_5}(\Omega_X(t_i)^2 + \Omega_Y(t_i)^2)}{n_5 - n_4} \quad \text{Equation (24)}$$

The last sub-objective function is for glide angle. Here, we have formulated it such that it is the dropped distance over travelled distance, as follows:

$$F_5 = -\frac{\text{abs}(d_Z(t_s) - d_Z(t_f))}{\sqrt{(d_X(t_s) - d_X(t_f))^2 + (d_Y(t_s) - d_Y(t_f))^2}} \quad \text{Equation (25)}$$

where $d_Z$ is the distance along Z-axis with respect to the origin in the world frame. $t_s$ and $t_f$ denote the starting time when control is applied and final time of the simulation, respectively.

The general optimization formulation can be summarized as follows:

$$\min_{\Gamma} \kappa_1 F_1 + \kappa_2 F_2 + \kappa_3 F_3 + \kappa_4 F_4 + \kappa_5 F_5 \quad \text{Equation (26)}$$

where $\kappa_1$, $\kappa_2$, $\kappa_3$, $\kappa_4$ and $\kappa_5$ are the weightage coefficients of each sub-objective function.

Optimization Results

The optimization is performed using MATLAB's genetic algorithm function which runs possible generations of solutions on Simulink. The population size for each generation is set at 100. The algorithm uses principles of biological evolution and natural selection to generate each population. After each generation, the program selects the best individuals and evolves them using crossover and mutation functions to generate a new group of population. This process is stopped when either maximum of 60 generations is reached or a better solution cannot be found for more than 15 generations. The final result is assumed to be the optimized solution within the given constraints for the weighted objective function.

Each simulation within the genetic algorithm starts with identical initial conditions given in Table 6 as shown in FIG. 31, is run for a duration of 40 seconds, with a fixed step size of 0.001 s, through the process described by FIG. 29.

In various example embodiments, the optimum solution is found at 48 generations, after stalling at a solution for 15 generations. The best penalty reduces very gradually but a sharp decline can be seen initially for mean penalty. This indicates that the population as a whole was improving rapidly at first. The small average distance between individuals for several generations also serves as an evidence of reaching an optimum solution.

The results of the genetic algorithm indicates that the optimum solution for the objective function formulated above is the vector $\Gamma=[25, 5, 106, 0.0761, 0.3104, -0.0087]^T$ which yields the objective function score of 1226.56.

Simulation

Using the optimized variables described in Table 6 in FIG. 31, the dynamic model is simulated to drop for 40 seconds, where the first 10 seconds is normal autorotation and the remaining duration is under cyclic control input. The mSAW model oscillated slightly before control is applied while maintaining $\Omega_Z$ of about −50 rad/s and $V_Z$ at −3.01 m/s.

Figure 32:
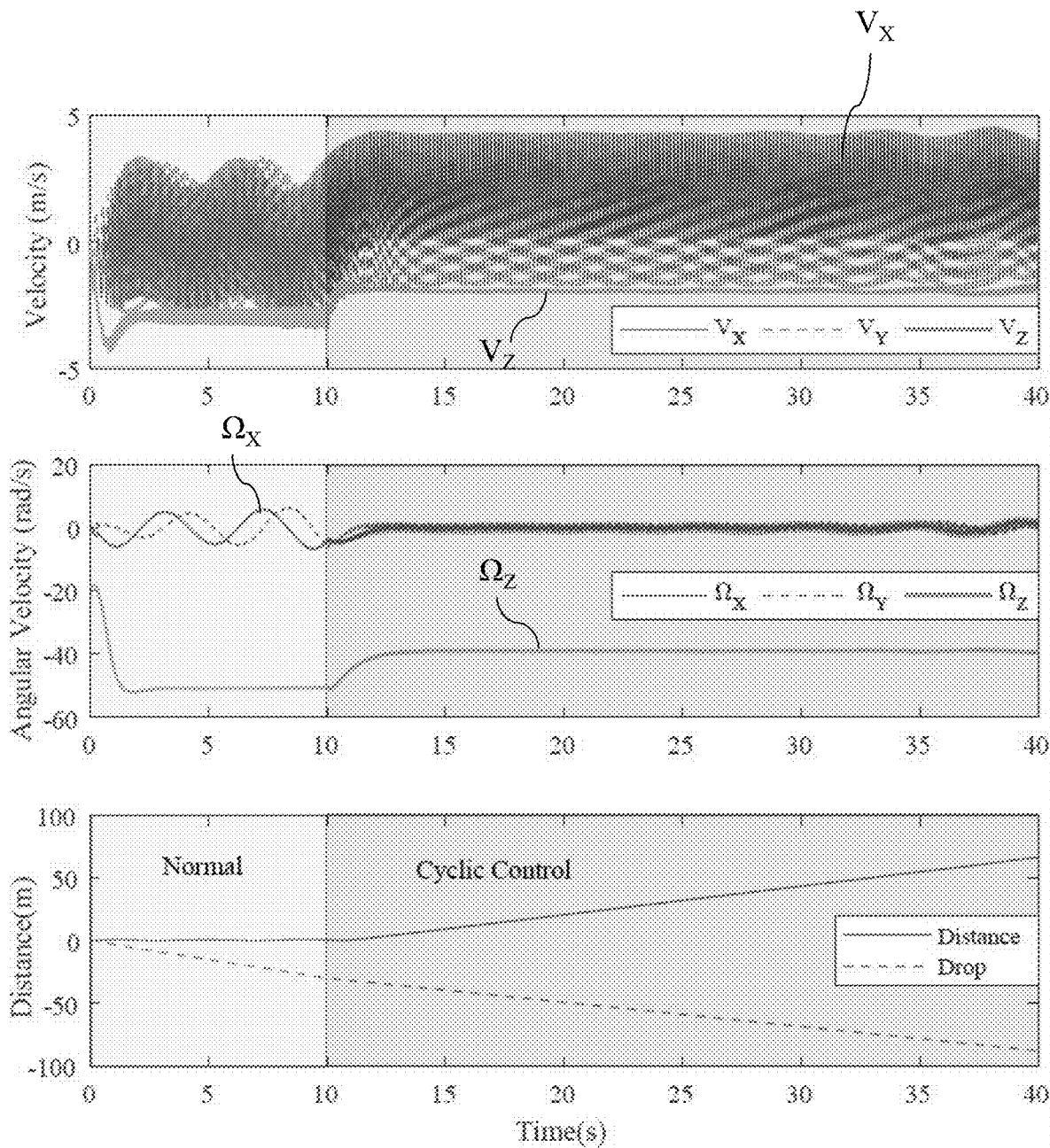
FIG. 32 shows linear velocities and angular velocities during a simulated drop according to various example embodiments.

Once cyclic control is applied, it began moving in a single direction. It is also noted that $\Omega_Z$ and $V_Z$ decreased significantly after cyclic control is applied, as shown in FIG. 32. This indicates that the angle of attack of the wing increased during the times the thruster is turned on, creating more lift and leading to slower $\Omega_Z$ and $V_Z$. More particularly, FIG. 32 shows linear velocities and angular velocities for during the simulated drop. Lateral distance and drop distance are also plotted. Throughout the period of cyclic control with optimized values of $T_o$, $T_{amp}$ and $\epsilon$, the simulated mSAW model achieved a glide angle of 40.9°.

Towards the end of the simulation period, small oscillations can be seen to develop slowly. This indicates that the thrust applied may be close to causing instability in the flight. The thrust amplitude $T_{amp}$ is optimized for the best glide slope and the simulation indicates that it is the max amplitude of thrust the craft can handle as it begins to enter instability.

Figures 33, 34A:
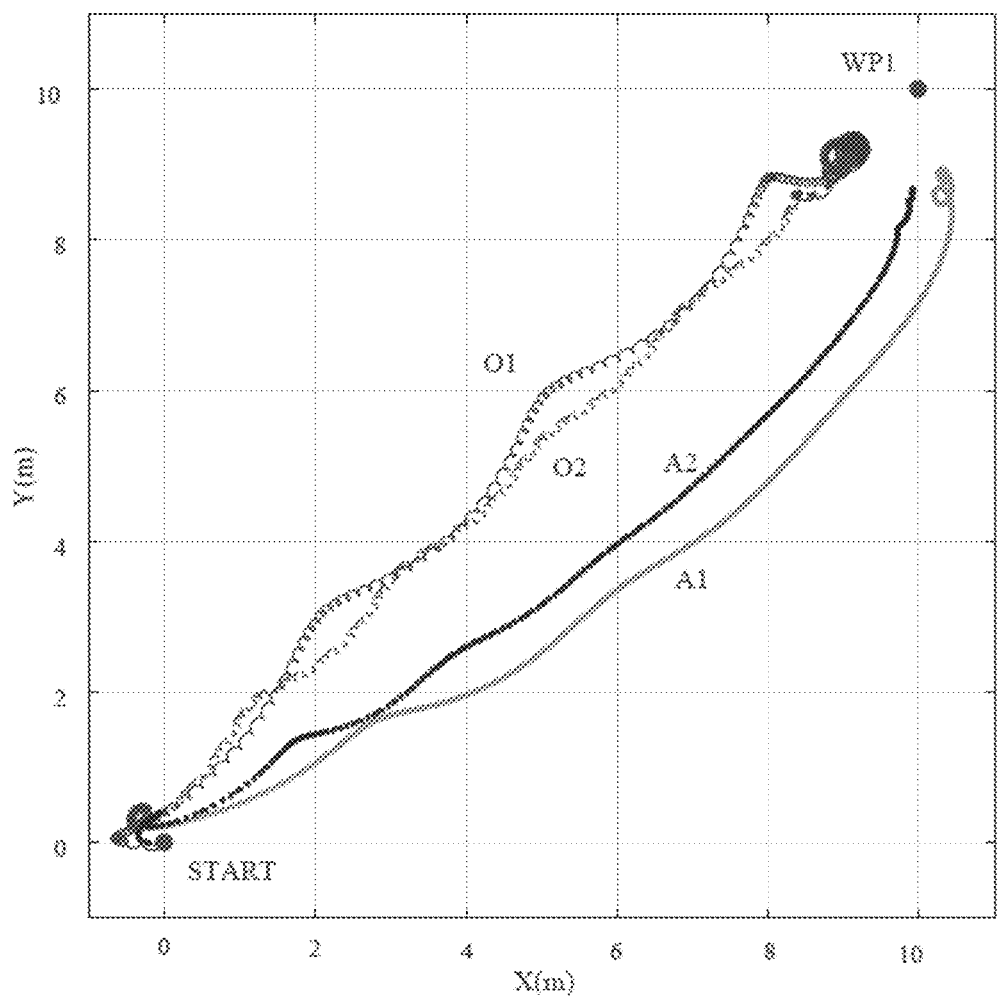
FIG. 33 shows the comparison of glide slope and settling time to a waypoint according to various example embodiments.
FIG. 34A shows trajectories under a waypoint step command.
Figure 34B:
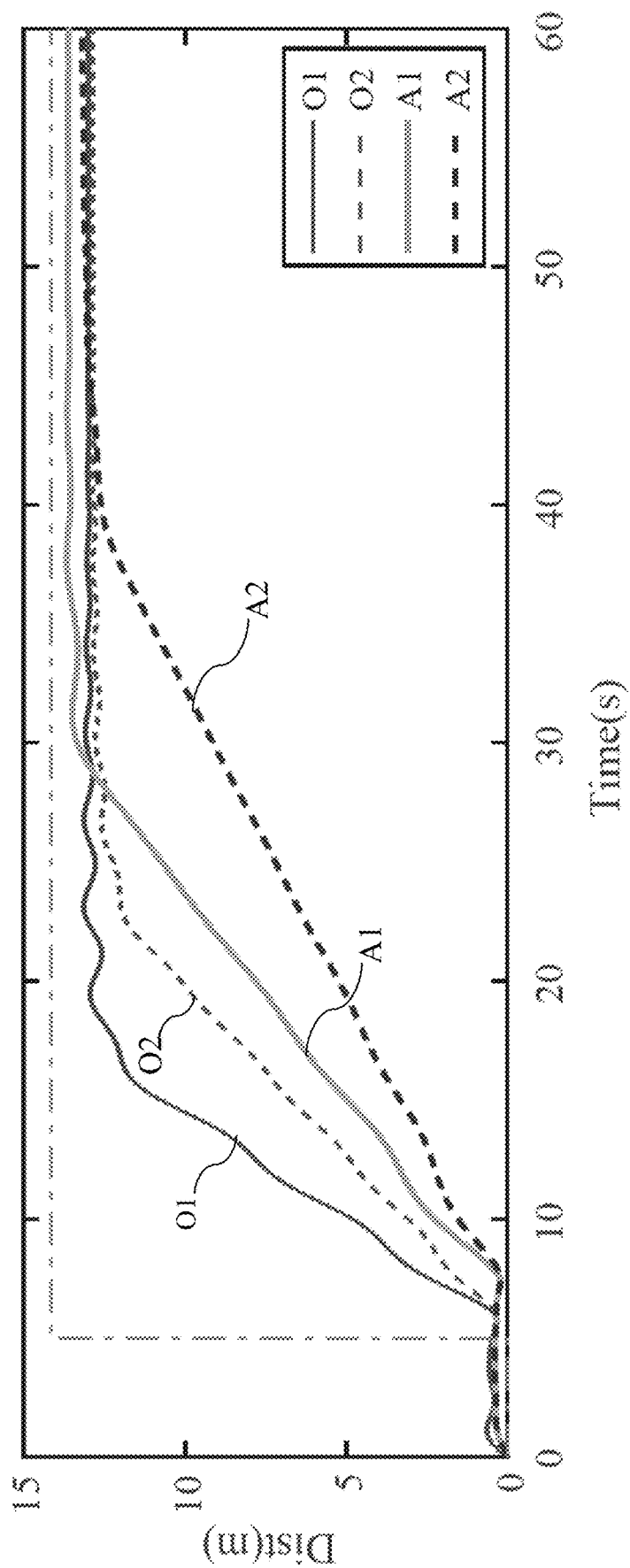
FIG. 34B illustrates distance from starting position shows the time response of the four simulated models according to various example embodiments.

To evaluate the optimized design and control parameters, the optimized model (denoted by O) is compared to a model with arbitrary thruster configuration (denoted by A), using both square cyclic control (denoted by 1) and sine cyclic controls (denoted by 2) using optimized control parameters. The different models are named O1, O2, A1, and A2 as per FIG. 33. More particularly, FIG. 33 shows the comparison of glide slope GS and settling time to waypoint $t_s$ for different configurations of mSAW. Mechanical parameters are given in the form $[P_x, P_y, \Theta]$. The arbitrary configuration is set at $P_x=360$ mm, $P_y=0$ mm, and $\Theta=0°$. First, the glide slope GS is measured. Next, the models are tasked to approach a waypoint 'WP1' which is at X'Y' coordinate [10 m, 10 m]. A simple P gain control based on position error is applied to the models for approaching WP1. The cyclic signals are capped at optimum value Tamp to prevent instability. In FIGS. 34A-34B, some oscillations can be seen for optimized configurations O1 and O2, although they are able to reach the waypoint faster. More particularly, FIG. 34A shows trajectories of O1, O2, A1 and A2 under a waypoint step command, and FIG. 34B illustrates distance from starting position shows the time response of the four simulated models. Steady-state error can be observed due to the P gain control. From the simulated comparison, it is clear that the optimized thruster configuration with square cyclic control according to various example embodiments has the best performance with lowest GS and $t_s$ with slight oscillations observed.

Experimental Investigations

Figure 35:
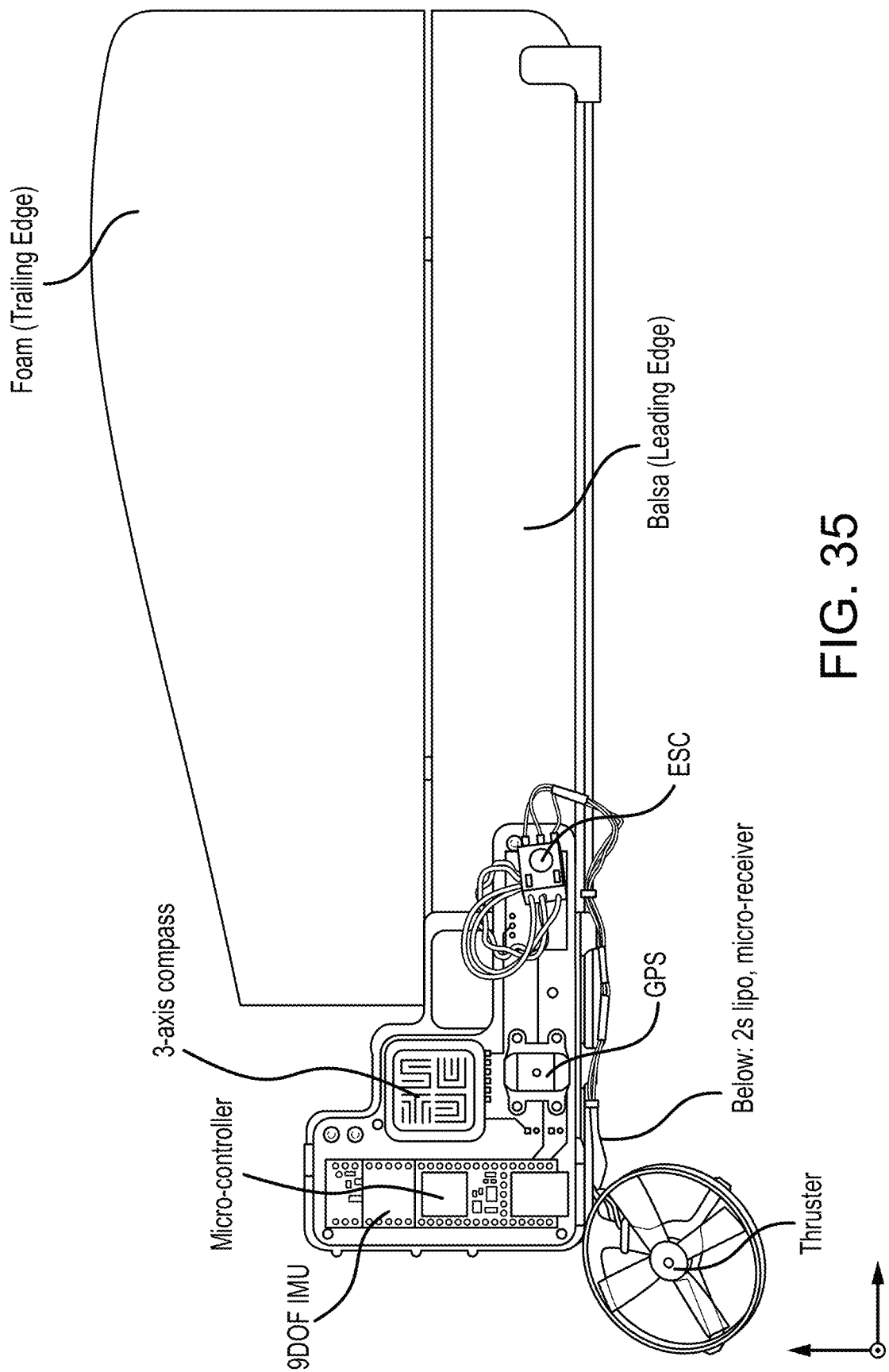
FIG. 35 shows an exemplary mSAW device with an optimized thruster configuration according to various example embodiments.

In various example experiments, a device mSAW, shown in FIG. 35, is built using the optimized design variables and the following electronic components: a Teensy 3.5 (PJRC), a 3-axis magnetometer (PNI RM3100), a GPS (OriginGPS ORG1510), a 9 DOF IMU (EM7180 SENtral), a micro-receiver (FrSky), a 5V regulator (Pololu), a 2 s 260 mAh lithium-polymer battery (BetaFPV), a 1103 brushless motor (11000 kV, BetaFPV), an electronic speed controller (7A brushless) and a 4-bladed propeller (1735, BetaFPV). More particularly, FIG. 35 shows an exemplary mSAW device with an optimized thruster configuration. Physical dimensions are given in Table 6 shown in FIG. 31. The device weighs 68 g.

A printed circuit board (PCB) is used as the main structure of the seed portion (corresponding to the housing member). This PCB houses and connects all the electronics, while serving also as the mechanical structure providing the required rigidity. The use of PCB helps to streamline the manufacturing process and lowers the cost for mass production. A thin 3D-printed rim may be used to surround the PCB to protect it from hard impact landings during the testing stage, and also used for holding the battery and wing attachment (wing member).

The prototype was dropped by hand from about 30 m within the university campus. The drop area is surrounded completely by a building and is assumed to have no wind. Shortly after being dropped, it entered autorotation almost instantly. The steady state rotation speed $\Omega_Z$ was about −8.01 Hz and drop speed $V_Z$ was about −2.7 m/s. This matched closely with simulated steady-state $\Omega_Z$ at −8.10 Hz and $V_Z$ at −3.01 m/s.

Figure 36:
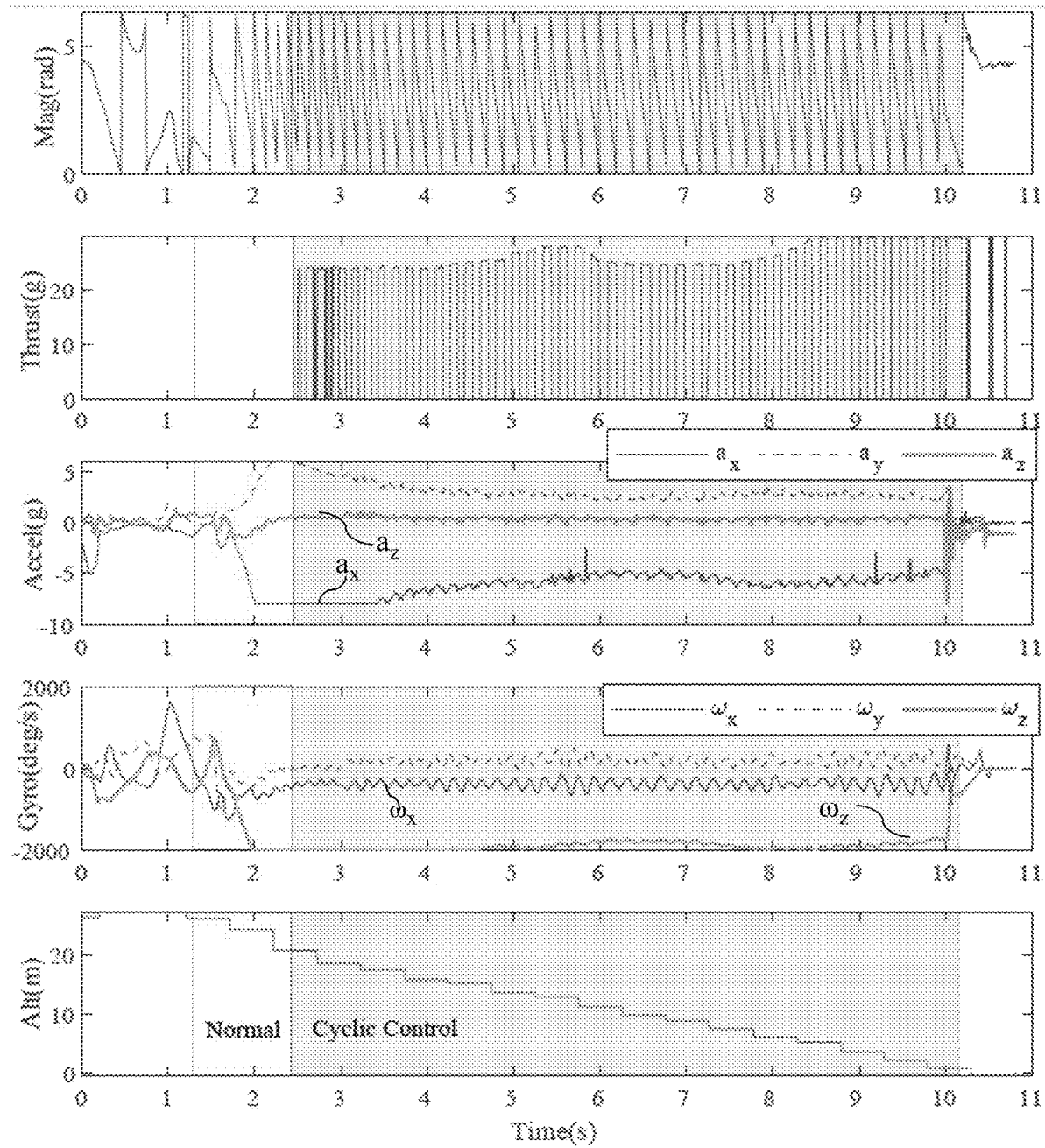
FIG. 36 shows the data from the magnetometer, thrust input command and IMU of mSAW according to various example embodiments.

Once it is in steady autorotation, cyclic control was manually commanded at varying amplitudes, with maximum amplitude reaching 30 g of thrust force. During cyclic control, $\Omega_Z$ dropped to 5.56 Hz and $V_Z$ decreased to 2.45 m/s (simulated values were $\Omega_Z$=−6.25 Hz and $V_Z$=−1.99 m/s). The values of on-board magnetometer, IMU and control signals were recorded and shown in FIG. 36. More particularly, FIG. 36 shows the data from the magnetometer, thrust input command and IMU of mSAW as it was hand-launched from 30 m, with cyclic control applied after stable autorotation was achieved.

The glide slope was visually measured by placing a camera orthogonal to the flight path, as shown in FIG. 37, and was found to be at 47.9° (simulated value was 40.9°). More particularly, FIG. 37 shows the drop trajectory of mSAW prototype during cyclic control in autorotation. Each frame was captured 67 ms apart. The maximum glide slope GS is about 47.9° (GS is measured between horizontal and drop trajectory).

The low inertia of the motor setup allows us to take advantage of it by rapidly increasing and decreasing its thrust using square cyclic control. Pulsing at such high frequencies may not be possible with larger motors. Comparing square cyclic control to sine cyclic control, the former is seen to provide a more 'punchy' response for directional control.

Accordingly, an autorotating (samara-inspired) aerial robot with a thrust unit as single actuator is presented. The best glide slope is found by optimizing the configuration of the thrust unit and its control signals, for a given wing shape. The simulation results and experiment results match closely for steady state autorotation and relatively close for cyclic controlled descent. This may be due to the motor's response rate to control input which was not considered in the simulation. In various example embodiments, the autorotating aerial device may incorporate the GPS into the software for a GPS-guided landing.

While embodiments have been particularly shown and described with reference to exemplary embodiments, it should be understood by those skilled in the art that various changes in form and detail may be made therein without departing from the scope of the disclosure. The scope of the invention is thus indicated by the appended claims and all changes which come within the meaning and range of equivalency of the claims are therefore intended to be embraced.

What is claimed is:

1. An autorotating aerial device comprising:
a housing member having disposed thereon an actuator and a controller configured to control the actuator; and
a wing member coupled to the actuator, the wing member comprising a main wing portion and a flap portion adjustable with respect to the main wing portion,
wherein the main wing portion comprises a leading edge and a trailing edge, and the flap portion is arranged along at least substantially an entire length of the trailing edge of the main wing portion,
wherein the controller is configured to control the actuator to switch the autorotating aerial device between a diving mode of operation and an autorotating mode of operation based on adjusting an angle of attack of the flap portion, by adjusting the angle of attack of the flap portion beyond a critical angle of attack for the diving mode of operation and adjusting the angle of attack of the flap portion below the critical angle of attack for the autorotating mode of operation, the angle of attack being with respect to a lateral axis along the main wing portion, and
wherein the controller is further configured to control the actuator to adjust the angle of attack of the flap portion to an angle in a range of about 70° to about 90° for a positive angle with respect to the lateral axis along the main wing portion or in a range of about −60° to about −90° for a negative angle with respect to the lateral axis along the main wing portion to initiate the diving mode of operation of the autorotating aerial device.

2. The autorotating aerial device of claim 1, wherein the critical angle of attack is about 70° for a positive angle with respect to the lateral axis along the main wing portion and about −60° for a negative angle with respect to the lateral axis along the main wing portion.

3. The autorotating aerial device of claim 1, wherein in the autorotating mode of operation, the controller is further configured to control the actuator to control a pitch angle of the flap portion based on a square cyclic control.

4. The autorotating aerial device of claim 1, wherein the main wing portion is formed of wood and the flap portion is formed of a solid foam material.

5. The autorotating aerial device of claim 1, wherein the actuator is a servo configured to adjust the angle of attack of the flap portion with respect to a lateral axis along the main wing portion.

6. The autorotating aerial device of claim 1, wherein the actuator is further configured to be removably coupled to a coupling hub, wherein the coupling hub is configured to couple respective housing members of two or more autorotating aerial devices for collaborative autorotation.

7. The autorotating aerial device of claim 1, wherein the housing member further has disposed thereon a magnetometer, a global positioning system, a receiver, a voltage regulator, an inertial measurement unit and a battery.

8. The autorotating aerial device of claim 1, wherein the housing member further comprises a memory, and the controller is communicatively coupled to the memory and configured to control the actuator to switch the autorotating aerial device between the diving mode of operation and the autorotating mode of operation based on adjusting the angle of attack of the flap portion.

9. An autorotating aerial system, the system comprising:
two or more autorotating aerial devices, each autorotating aerial device coupled together at a coupling hub and comprises:
a housing member having disposed thereon an actuator and a controller configured to control the actuator; and
a wing member coupled to the actuator, the wing member comprising a main wing portion and a flap portion adjustable with respect to the main wing portion,
wherein the controller is configured to control the actuator to switch the autorotating aerial device between a diving mode of operation and an autorotating mode of operation based on adjusting an angle of attack of the flap portion, the angle of attack being with respect to a lateral axis along the main wing portion,
wherein for said each autorotating aerial device, the actuator of the autorotating aerial device is configured to release the autorotating aerial device from the coupling hub in response to a trigger.

10. The autorotating aerial system of claim 9, wherein the actuator is configured to release the two or more autorotating aerial devices from the coupling hub simultaneously.

11. The autorotating aerial system of claim 9, wherein the coupling hub comprises a spring loaded mechanism disposed on the housing member of said each autorotating aerial device, respectively, for interlocking corresponding housing members of the two or more autorotating aerial devices.

12. A method of forming an autorotating aerial device, the method comprising:
providing a housing member having disposed thereon an actuator and a controller configured to control the actuator;
providing a wing member comprising a main wing portion and a flap portion adjustable with respect to the main wing portion, wherein the main wing portion comprises a leading edge and a trailing edge, and the flap portion is arranged along at least substantially an entire length of the trailing edge of the main wing portion; and
coupling the wing member to the actuator, wherein the controller is configured to control the actuator to switch the autorotating aerial device between a diving mode of operation and an autorotating mode of operation based on adjusting an angle of attack of the flap portion, by adjusting the angle of attack of the flap portion beyond a critical angle of attack for the diving mode of operation and adjusting the angle of attack of the flap portion below the critical angle of attack for the autorotating mode of operation, the angle of attack being with respect to a lateral axis along the main wing portion, and
wherein the controller is further configured to control the actuator to adjust the angle of attack of the flap portion to an angle in a range of about 70° to about 90° for a positive angle with respect to the lateral axis along the main wing portion or in a range of about −60° to about −90° for a negative angle with respect to the lateral axis along the main wing portion to initiate the diving mode of operation of the autorotating aerial device.

13. The method of claim 12, wherein said providing a wing member comprises:
decomposing the flap portion into a plurality of blade elements;
determining, for each blade element of the plurality of blade elements, an optimized chord length, optimized chord width and optimized flap angle based on a multi-component objective optimization function including a plurality of components relating to a drop speed of the autorotating aerial device, a rotation rate of the autorotating aerial device and undesired oscillations of the autorotating aerial device and using genetic algorithm optimization; and
forming the flap portion based on the optimized chord length and optimized chord width of each blade element and the optimized flap angle.

14. The method of claim 13, wherein the plurality of components of the multi-component objective optimization function comprise a first component relating to the rotation rate of the autorotating aerial device, a second component relating to the drop speed of the autorotating aerial device, a third component relating to a penalty function for the undesired oscillations of the autorotating aerial device, and a fourth component relating to a distance deviation of the autorotating aerial device in a time interval.

15. The method of claim 12, wherein the critical angle of attack is about 70° for a positive angle with respect to the lateral axis along the main wing portion and about −60° for a negative angle with respect to the lateral axis along the main wing portion.

16. The method of claim 12, wherein in the autorotating mode of operation, the controller is further configured to control the actuator to control a pitch angle of the flap portion based on a square cyclic control.

* * * * *